United States Patent
Park et al.

(10) Patent No.: US 10,637,630 B2
(45) Date of Patent: Apr. 28, 2020

(54) METHOD FOR TRANSMITTING AND RECEIVING UPLINK/DOWNLINK DATA IN WIRELESS COMMUNICATION SYSTEM AND APPARATUS THEREFOR

(71) Applicant: LG ELECTRONICS INC., Seoul (KR)

(72) Inventors: Jonghyun Park, Seoul (KR); Hanbyul Seo, Seoul (KR); Suckchel Yang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/083,301

(22) PCT Filed: Mar. 7, 2017

(86) PCT No.: PCT/KR2017/002471
§ 371 (c)(1),
(2) Date: Sep. 7, 2018

(87) PCT Pub. No.: WO2017/155290
PCT Pub. Date: Sep. 14, 2017

(65) Prior Publication Data
US 2019/0103951 A1    Apr. 4, 2019

Related U.S. Application Data

(60) Provisional application No. 62/304,903, filed on Mar. 7, 2016, provisional application No. 62/327,409, filed (Continued)

(51) Int. Cl.
*H04L 5/00* (2006.01)
*H04W 72/04* (2009.01)
(Continued)

(52) U.S. Cl.
CPC .......... *H04L 5/0055* (2013.01); *H04B 7/024* (2013.01); *H04L 1/0026* (2013.01);
(Continued)

(58) Field of Classification Search
CPC .......... H04W 72/042; H04W 72/0453; H04W 72/0446; H04W 72/12; H04W 72/14;
(Continued)

(56) References Cited

U.S. PATENT DOCUMENTS

2011/0243088 A1*  10/2011  Ahn ................ H04L 1/0091
                                                           370/329
2012/0039279 A1*   2/2012  Chen ............... H04L 1/1861
                                                           370/329
(Continued)

FOREIGN PATENT DOCUMENTS

WO    2013183943    12/2013
WO    2014171754    10/2014

OTHER PUBLICATIONS

PCT International Application No. PCT/KR2017/002471, International Search Report dated May 23, 2017, 4 pages.

*Primary Examiner* — Gary Mui
(74) *Attorney, Agent, or Firm* — Lee Hong Degerman Kang Waimey

(57) ABSTRACT

Disclosed are a method for transmitting and receiving uplink/downlink data in a wireless communication system, and an apparatus therefor. Specifically, a method for receiving downlink data from multiple transmission points (TPs) by a terminal in a wireless communication system may comprise the steps of: receiving downlink scheduling information from one or more of a first TP and a second TP; receiving first downlink data from the first TP and second downlink data from the second TP, on the basis of the downlink scheduling information; and transmitting, to the first TP and the second TP, a first acknowledgment/non-
(Continued)

acknowledgment (ACK/NACK) response to the first downlink data and a second ACK/NACK response to the second downlink data, respectively.

11 Claims, 21 Drawing Sheets

Related U.S. Application Data on Apr. 25, 2016, provisional application No. 62/357,341, filed on Jun. 30, 2016.

(51) Int. Cl.
| | | |
|---|---|---|
| *H04W 72/14* | (2009.01) | |
| *H04B 7/024* | (2017.01) | |
| *H04W 76/11* | (2018.01) | |
| *H04L 1/00* | (2006.01) | |
| *H04L 25/02* | (2006.01) | |
| *H04W 28/02* | (2009.01) | |
| *H04L 1/18* | (2006.01) | |
| *H04L 1/16* | (2006.01) | |
| *H04W 72/12* | (2009.01) | |
| *H04L 27/26* | (2006.01) | |
| *H04L 1/12* | (2006.01) | |
| *H04W 76/15* | (2018.01) | |

(52) U.S. Cl.
CPC .......... *H04L 1/0061* (2013.01); *H04L 1/1664* (2013.01); *H04L 1/1812* (2013.01); *H04L 1/1861* (2013.01); *H04L 5/0035* (2013.01); *H04L 25/0226* (2013.01); *H04W 28/0278* (2013.01); *H04W 72/042* (2013.01); *H04W 72/0446* (2013.01); *H04W 72/0453* (2013.01); *H04W 72/12* (2013.01); *H04W 72/14* (2013.01); *H04W 76/11* (2018.02); *H04L 5/001* (2013.01); *H04L 5/0044* (2013.01); *H04L 5/0048* (2013.01); *H04L 5/0094* (2013.01); *H04L 27/2607* (2013.01); *H04L 27/2613* (2013.01); *H04L 2001/125* (2013.01); *H04W 76/15* (2018.02)

(58) Field of Classification Search
CPC ..... H04L 5/001; H04L 5/0035; H04L 5/0055; H04B 7/0024
See application file for complete search history.

(56) References Cited

U.S. PATENT DOCUMENTS

| | | | | |
|---|---|---|---|---|
| 2012/0044871 | A1* | 2/2012 | Li | H04L 1/1854 370/328 |
| 2012/0320782 | A1* | 12/2012 | Seo | H04L 1/1854 370/252 |
| 2013/0021969 | A1* | 1/2013 | Ho | H04L 1/1819 370/328 |
| 2013/0039349 | A1 | 2/2013 | Mahalleh et al. | |
| 2013/0088960 | A1* | 4/2013 | Bi | H04L 47/34 370/235 |
| 2013/0229931 | A1* | 9/2013 | Kim | H04W 24/10 370/252 |
| 2013/0250925 | A1* | 9/2013 | Lohr | H04W 72/0446 370/336 |
| 2014/0161060 | A1* | 6/2014 | Nam | H04L 5/0055 370/329 |
| 2014/0286295 | A1* | 9/2014 | Liu | H04W 72/10 370/329 |
| 2014/0307643 | A1* | 10/2014 | Froberg Olsson | H04L 5/0053 370/329 |
| 2015/0099501 | A1* | 4/2015 | Kim | H04W 52/0216 455/418 |
| 2015/0229456 | A1* | 8/2015 | Wild | H04B 7/024 375/295 |
| 2016/0057585 | A1* | 2/2016 | Horn | H04W 80/02 370/312 |
| 2016/0057759 | A1 | 2/2016 | Seo et al. | |
| 2016/0057768 | A1 | 2/2016 | Sun et al. | |
| 2016/0150510 | A1* | 5/2016 | Shao | H04L 1/1893 370/329 |
| 2019/0028918 | A1* | 1/2019 | Zhu | H04W 28/02 |

* cited by examiner

--PRIOR ART--

(a) Single CC    (b) Multiple CC

Fig. 18
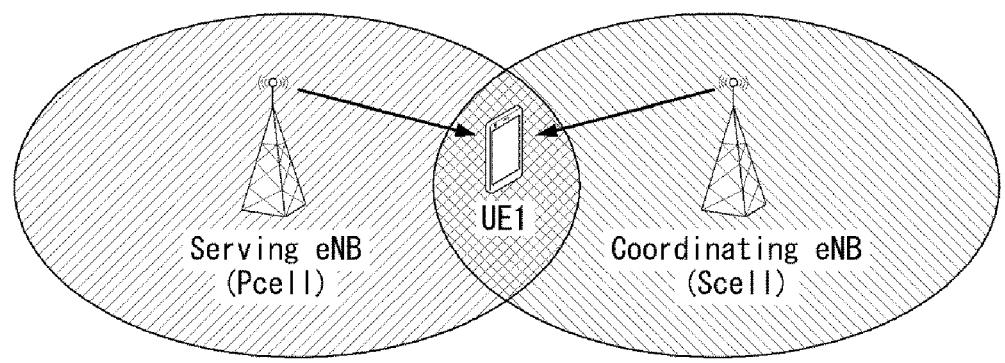
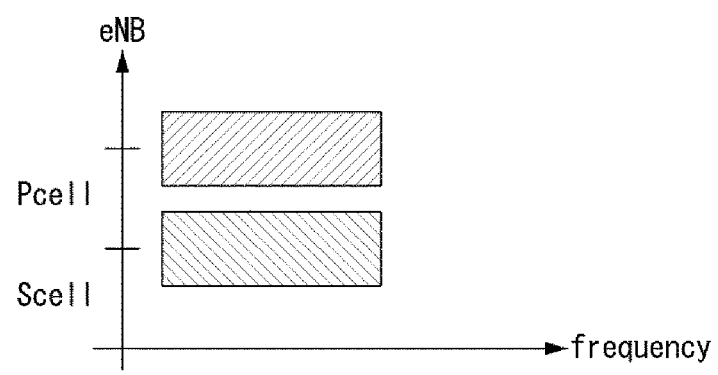

METHOD FOR TRANSMITTING AND RECEIVING UPLINK/DOWNLINK DATA IN WIRELESS COMMUNICATION SYSTEM AND APPARATUS THEREFOR

CROSS-REFERENCE TO RELATED APPLICATIONS

This application is the National Stage filing under 35 U.S.C. 371 of International Application No. PCT/KR2017/002471, filed on Mar. 7, 2017, which claims the benefit of U.S. Provisional Application Nos. 62/304,903, filed on Mar. 7, 2016, 62/327,409, filed on Apr. 25, 2016 and 62/357,341, filed on Jun. 30, 2016, the contents of which are all hereby incorporated by reference herein in their entirety.

TECHNICAL FIELD

The present invention relates to a wireless communication system and, more particularly, to a method of transmitting and receiving uplink/downlink data between a user equipment and a multi-cell or a multi-transmission point/reception point in a wireless communication system and an apparatus supporting the same.

BACKGROUND ART

A mobile communication system has been developed to provide a voice service while guaranteeing user mobility. However, the mobile communication system has been extended a service range to a data service as well as a voice, and nowadays, a resource shortage phenomenon occurs due to explosive traffic increase and users request a higher speed service and thus a more enhanced mobile communication system is required.

A next generation mobile communication system should be able to support acceptance of explosive data traffic, epochal increase of a transmission rate per user, acceptance of the largely increased connection device number, very low end-to-end latency, and high energy efficiency. For this reason, various technologies such as dual connectivity, Massive Multiple Input Multiple Output (Massive MIMO), In-band Full Duplex, Non-Orthogonal Multiple Access (NOMA), Super wideband support, and Device Networking have been researched.

DISCLOSURE

Technical Problem

An object of the present invention is to propose a method of transmitting and receiving uplink/downlink data between a user equipment and a multi-cell or a multi-transmission point/reception point in a wireless communication system.

Technical objects to be achieved in the present invention are not limited to the aforementioned technical objects, and other technical objects not described above may be evidently understood by a person having ordinary skill in the art to which the present invention pertains from the following description.

Technical Solution

In an aspect of the present invention, a method for a user equipment to receive downlink data from a multi-transmission point (TP) in a wireless communication system may include receiving downlink scheduling information from one or more of a first TP and a second TP, receiving first downlink data from the first TP and second downlink data from the second TP based on the downlink scheduling information, and transmitting a first acknowledgment/non-acknowledgement (ACK/NACK) response for the first downlink data and a second ACK/NACK response for the second downlink data to the first TP and the second TP.

In another aspect of the present invention, a user equipment receiving downlink data from a multi-transmission point (TP) in a wireless communication system includes a radio frequency (RF) unit for transmitting and receiving radio signals and a processor controlling the RF unit. The processor may be configured to receive downlink scheduling information from one or more of a first TP and a second TP, receive first downlink data from the first TP and receiving second downlink data from the second TP based on the downlink scheduling information, and transmit a first acknowledgment/non-acknowledgement (ACK/NACK) response for the first downlink data and a second ACK/NACK response for the second downlink data to the first TP and the second TP.

Preferably, the first downlink data and the second downlink data may be the same data or different data.

Preferably, the user equipment may receive downlink scheduling information about the first downlink data and the second downlink data from the first TP and the second TP.

Preferably, the user equipment may receive first downlink scheduling information about the first downlink data from the first TP and second downlink scheduling information about the second downlink data from the second TP.

Preferably, the first downlink data and the second downlink data may be indicated within the first downlink scheduling information and the second downlink scheduling information so that the user equipment can identify that the first downlink data and the second downlink data may be the same data.

Preferably, the first downlink data and the second downlink data may be indicated to be the same data if the first downlink scheduling information and the second downlink scheduling information may be masked with an identical radio network temporary identifier (RNTI).

Preferably, the first downlink scheduling information and the second downlink scheduling information may include a first packet identifier for the first downlink data and a second packet identifier for the second downlink data, respectively. The first downlink data and the second downlink data may be indicated to be the same data if the first packet identifier and the second packet identifier are the same.

Preferably, if the first downlink data and the second downlink data are the same data, when any one of the first downlink data and the second downlink data is successfully received, both the first ACK/NACK response and the second ACK/NACK response may correspond to ACK.

Preferably, if the first downlink data and the second downlink data are the same data, when both the first downlink data and the second downlink data is successfully received, both the first ACK/NACK response and the second ACK/NACK response may correspond to ACK.

Preferably, the first ACK/NACK and the second ACK/NACK may be subjected to joint encoding and transmitted on the same resource.

Preferably, the first ACK/NACK and the second ACK/NACK may be individually transmitted on independent resources.

Preferably, quasi co-located (QCL) may be assumed between an antenna port in which the first downlink data is transmitted and the antenna port of a reference signal transmitted from the first TP. Quasi co-located (QCL) may be assumed between an antenna port in which the second downlink data is transmitted and the antenna port of a reference signal transmitted from the second TP.

Preferably, if the first downlink data is transmitted within a first cell, the second downlink data is transmitted within a second cell, and different redundancy versions (RVs) are applied to the first downlink data and the second downlink data, the retransmission of the first downlink data and the second downlink data may be associated with a hybrid automatic repeat request (HARQ) process of a reference cell of any one of the first cell and the second cell.

Preferably, the reference cell may be indicated by high layer signaling.

Preferably, a cell in which downlink data to which an RV having a highest priority is applied based on priority previously assigned to an RV is transmitted may be determined as the reference cell.

Preferably, a value set in the reference cell may be applied to a soft channel bit stored in the user equipment regardless of a cell on which the retransmission of the first downlink data or the second downlink data is performed.

Advantageous Effects

In accordance with an embodiment of the present invention, uplink/downlink data can be efficiently transmitted and received between a UE and a multi-cell or a multi-transmission point/reception point in a wireless communication system.

In accordance with an embodiment of the present invention, reliability for the transmission of uplink/downlink data can be improved.

In accordance with an embodiment of the present invention, low latency for the transmission of uplink/downlink data can be achieved.

Effects which may be obtained in the present invention are not limited to the aforementioned effects, and other technical effects not described above may be evidently understood by a person having ordinary skill in the art to which the present invention pertains from the following description.

DESCRIPTION OF DRAWINGS

The accompany drawings, which are included to provide a further understanding of the present invention and are incorporated on and constitute a part of this specification illustrate embodiments of the present invention and together with the description serve to explain the principles of the present invention.

FIG. 18 is a diagram illustrating a carrier aggregation-based CoMP system in a wireless communication system to which the present invention may be applied.

MODE FOR INVENTION

Figure 1:
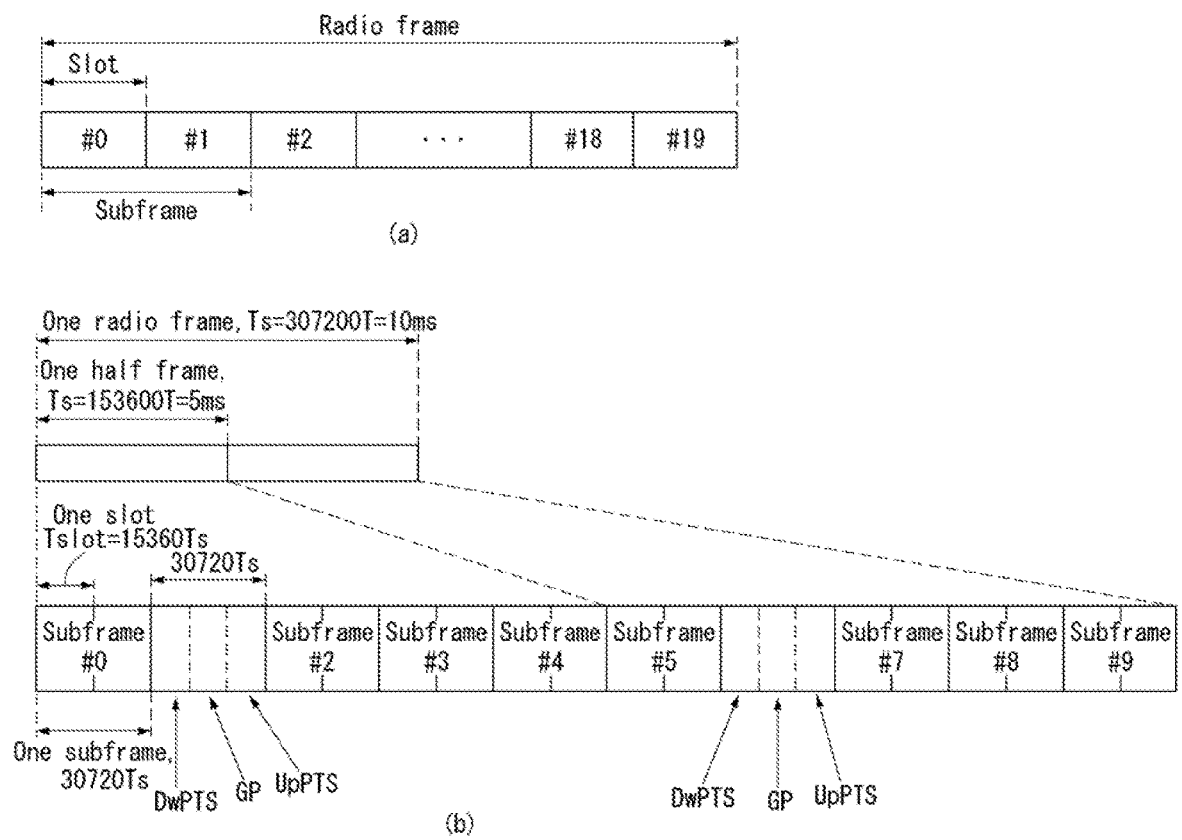
FIG. 1 illustrates the structure of a radio frame in a wireless communication system to which the present invention may be applied.

Hereinafter, preferred embodiments of the present invention will be described in detail with reference to the accompanying drawings. A detailed description to be disclosed herein together with the accompanying drawing is to describe embodiments of the present invention and not to describe a unique embodiment for carrying out the present invention. The detailed description below includes details in order to provide a complete understanding. However, those skilled in the art know that the present invention can be carried out without the details.

In some cases, in order to prevent a concept of the present invention from being ambiguous, known structures and devices may be omitted or may be illustrated in a block diagram format based on core function of each structure and device.

In the specification, a base station means a terminal node of a network directly performing communication with a terminal. In the present document, specific operations described to be performed by the base station may be performed by an upper node of the base station in some cases. That is, it is apparent that in the network constituted by multiple network nodes including the base station, various operations performed for communication with the terminal may be performed by the base station or other network nodes other than the base station. A base station (BS) may be generally substituted with terms such as a fixed station, Node B, evolved-NodeB (eNB), a base transceiver system (BTS), an access point (AP), and the like. Further, a 'terminal' may be fixed or movable and be substituted with terms such as user equipment (UE), a mobile station (MS), a user terminal (UT), a mobile subscriber station (MSS), a subscriber station (SS), an advanced mobile station (AMS), a wireless terminal (WT), a Machine-Type Communication (MTC) device, a Machine-to-Machine (M2M) device, a Device-to-Device (D2D) device, and the like.

Hereinafter, a downlink means communication from the base station to the terminal and an uplink means communication from the terminal to the base station. In the downlink, a transmitter may be a part of the base station and a receiver may be a part of the terminal. In the uplink, the transmitter may be a part of the terminal and the receiver may be a part of the base station.

Specific terms used in the following description are provided to help appreciating the present invention and the use of the specific terms may be modified into other forms within the scope without departing from the technical spirit of the present invention.

The following technology may be used in various wireless access systems, such as code division multiple access (CDMA), frequency division multiple access (FDMA), time division multiple access (TDMA), orthogonal frequency division multiple access (OFDMA), single carrier-FDMA (SC-FDMA), non-orthogonal multiple access (NOMA), and the like. CDMA may be implemented by radio technology universal terrestrial radio access (UTRA) or CDMA2000. TDMA may be implemented by radio technology such as Global System for Mobile communications (GSM)/General Packet Radio Service (GPRS)/Enhanced Data Rates for GSM Evolution (EDGE). The OFDMA may be implemented as radio technology such as IEEE 802.11 (Wi-Fi), IEEE 802.16 (WiMAX), IEEE 802-20, E-UTRA (Evolved UTRA), and the like. The UTRA is a part of a universal mobile telecommunication system (UMTS). 3rd generation partnership project (3GPP) long term evolution (LTE) as a part of an evolved UMTS (E-UMTS) using evolved-UMTS terrestrial radio access (E-UTRA) adopts the OFDMA in a downlink and the SC-FDMA in an uplink. LTE-advanced (A) is an evolution of the 3GPP LTE.

The embodiments of the present invention may be based on standard documents disclosed in at least one of IEEE 802, 3GPP, and 3GPP2 which are the wireless access systems. That is, steps or parts which are not described to definitely show the technical spirit of the present invention among the embodiments of the present invention may be based on the documents. Further, all terms disclosed in the document may be described by the standard document.

3GPP LTE/LTE-A is primarily described for clear description, but technical features of the present invention are not limited thereto.

General System

FIG. 1 illustrates a structure a radio frame in a wireless communication system to which the present invention can be applied.

In 3GPP LTE/LTE-A, radio frame structure type 1 may be applied to frequency division duplex (FDD) and radio frame structure type 2 may be applied to time division duplex (TDD) are supported.

FIG. 1(a) exemplifies radio frame structure type 1. The radio frame is constituted by 10 subframes. One subframe is constituted by 2 slots in a time domain. A time required to transmit one subframe is referred to as a transmissions time interval (TTI). For example, the length of one subframe may be 1 ms and the length of one slot may be 0.5 ms.

One slot includes a plurality of orthogonal frequency division multiplexing (OFDM) symbols in the time domain and includes multiple resource blocks (RBs) in a frequency domain. In 3GPP LTE, since OFDMA is used in downlink, the OFDM symbol is used to express one symbol period. The OFDM symbol may be one SC-FDMA symbol or symbol period. The resource block is a resource allocation wise and includes a plurality of consecutive subcarriers in one slot.

FIG. 1(b) illustrates frame structure type 2. Radio frame type 2 is constituted by 2 half frames, each half frame is constituted by 5 subframes, a downlink pilot time slot (DwPTS), a guard period (GP), and an uplink pilot time slot (UpPTS), and one subframe among them is constituted by 2 slots. The DwPTS is used for initial cell discovery, synchronization, or channel estimation in a terminal. The UpPTS is used for channel estimation in a base station and to match uplink transmission synchronization of the terminal. The guard period is a period for removing interference which occurs in uplink due to multi-path delay of a downlink signal between the uplink and the downlink.

In frame structure type 2 of a TDD system, an uplink-downlink configuration is a rule indicating whether the uplink and the downlink are allocated (alternatively, reserved) with respect to all subframes. Table 1 shows the uplink-downlink configuration.

TABLE 1

| Uplink-Downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Referring to Table 1, for each sub frame of the radio frame, 'D' represents a subframe for downlink transmission, 'U' represents a subframe for uplink transmission, and 'S' represents a special subframe constituted by three fields such as the DwPTS, the GP, and the UpPTS. The uplink-downlink configuration may be divided into 7 configurations and the positions and/or the numbers of the downlink subframe, the special subframe, and the uplink subframe may vary for each configuration.

A time when the downlink is switched to the uplink or a time when the uplink is switched to the downlink is referred to as a switching point. Switch-point periodicity means a period in which an aspect of the uplink subframe and the downlink subframe are switched is similarly repeated and both 5 ms or 10 ms are supported. When the period of the downlink-uplink switching point is 5 ms, the special subframe S is present for each half-frame and when the period of the downlink-uplink switching point is 5 ms, the special subframe S is present only in a first half-frame.

In all configurations, subframes #0 and #5 and the DwPTS are intervals only the downlink transmission. The UpPTS and a subframe just subsequently to the subframe are continuously intervals for the uplink transmission.

The uplink-downlink configuration may be known by both the base station and the terminal as system information. The base station transmits only an index of configuration information whenever the uplink-downlink configuration information is changed to announce a change of an uplink-downlink allocation state of the radio frame to the terminal. Further, the configuration information as a kind of downlink control information may be transmitted through a physical downlink control channel (PDCCH) similarly to other scheduling information and may be commonly transmitted to all terminals in a cell through a broadcast channel as broadcasting information.

Table 2 illustrates the configuration (the length of DwPTS/GP/UpPTS) of a special subframe.

OFDM symbols and one resource block includes 12 sub-carriers in the frequency domain, but the present invention is not limited thereto.

Each element on the resource grid is referred to as a resource element and one resource block includes 12×7 resource elements. The number of resource blocks included in the downlink slot, $N^{DL}$ is subordinated to a downlink transmission bandwidth.

A structure of the uplink slot may be the same as that of the downlink slot.

Figure 3:
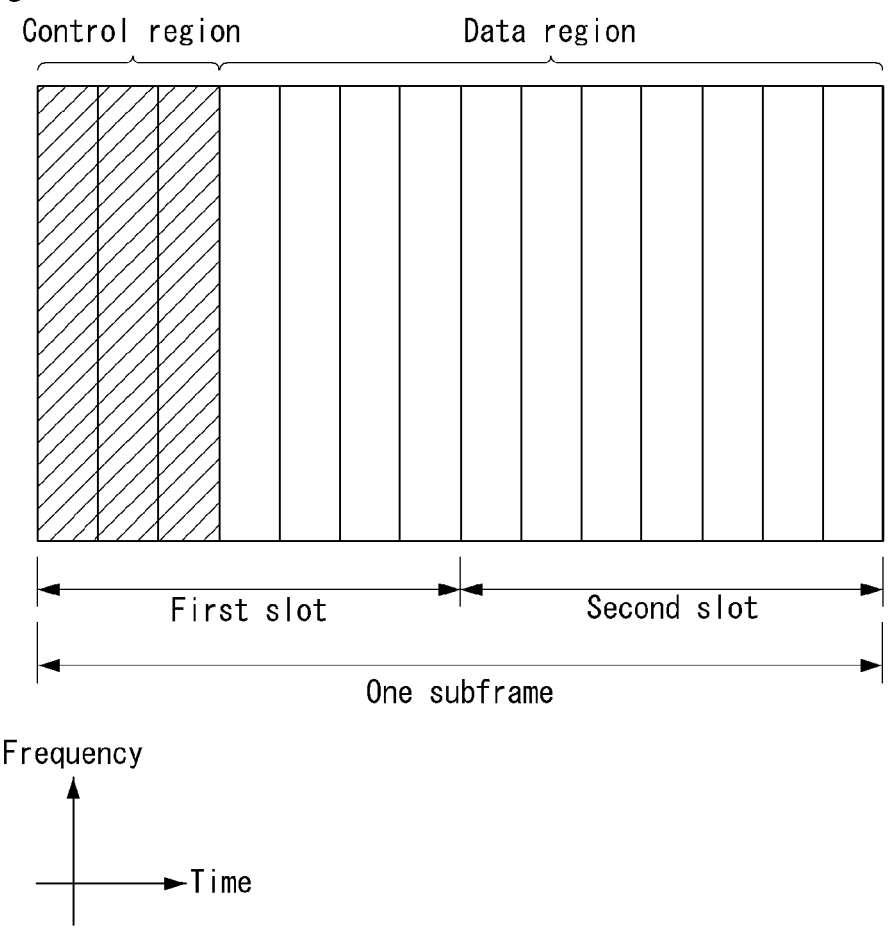
FIG. 3 illustrates a structure of downlink subframe in a wireless communication system to which the present invention may be applied.

FIG. 3 illustrates a structure of a downlink subframe in the wireless communication system to which the present invention can be applied.

Referring to FIG. 3, a maximum of former three OFDM symbols in the first slot of the sub frame is a control region to which control channels are allocated and residual OFDM symbols is a data region to which a physical downlink shared channel (PDSCH) is allocated. Examples of the downlink control channel used in the 3GPP LTE include a Physical Control Format Indicator Channel (PCFICH), a Physical Downlink Control Channel (PDCCH), a Physical Hybrid-ARQ Indicator Channel (PHICH), and the like.

The PFCICH is transmitted in the first OFDM symbol of the subframe and transports information on the number (that is, the size of the control region) of OFDM symbols used for transmitting the control channels in the subframe. The PHICH which is a response channel to the uplink transports an Acknowledgement (ACK)/Not-Acknowledgement (NACK) signal for a hybrid automatic repeat request (HARQ). Control information transmitted through a PDCCH is referred to as downlink control information (DCI). The downlink control information includes uplink resource allocation information, downlink resource allocation information, or an uplink transmission (Tx) power control command for a predetermined terminal group.

The PDCCH may transport A resource allocation and transmission format (also referred to as a downlink grant) of

TABLE 2

| Special subframe configuration | Normal cyclic prefix in downlink | | | Extended cyclic prefix in downlink | | |
| --- | --- | --- | --- | --- | --- | --- |
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

The structure of the radio frame is just one example and the number subcarriers included in the radio frame or the number of slots included in the subframe and the number of OFDM symbols included in the slot may be variously changed.

Figure 2:
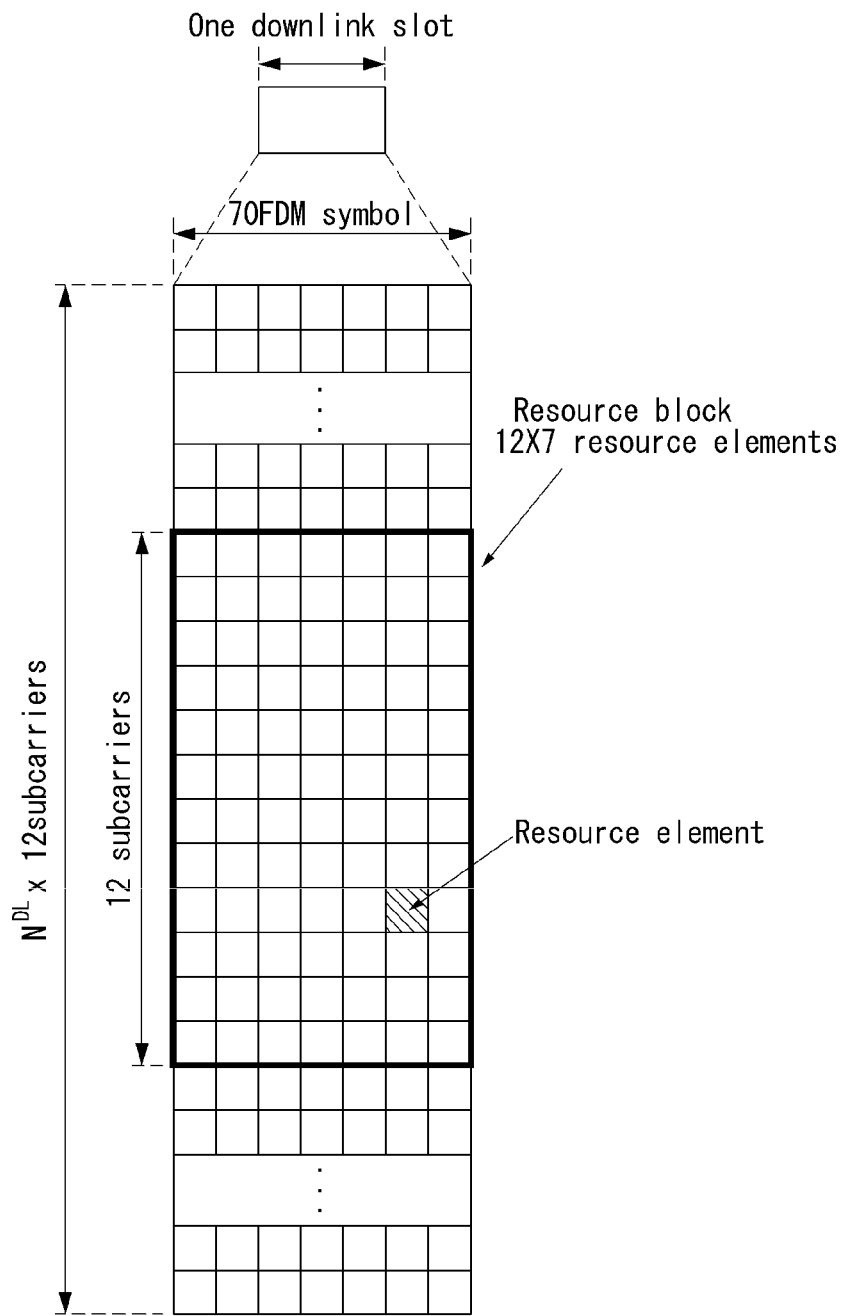
FIG. 2 is a diagram illustrating a resource grid for a downlink slot in a wireless communication system to which the present invention may be applied.

FIG. 2 is a diagram illustrating a resource grid for one downlink slot in the wireless communication system to which the present invention can be applied.

Referring to FIG. 2, one downlink slot includes the plurality of OFDM symbols in the time domain. Herein, it is exemplarily described that one downlink slot includes 7 a downlink shared channel (DL-SCH), resource allocation information (also referred to as an uplink grant) of an uplink shared channel (UL-SCH), paging information in a paging channel (PCH), system information in the DL-SCH, resource allocation for an upper-layer control message such as a random access response transmitted in the PDSCH, an aggregate of transmission power control commands for individual terminals in the predetermined terminal group, a voice over IP (VoIP). A plurality of PDCCHs may be transmitted in the control region and the terminal may monitor the plurality of PDCCHs. The PDCCH is constituted by one or an aggregate of a plurality of continuous control channel elements (CCEs). The CCE is a logical allocation wise used to provide a coding rate depending on a state of a radio channel to the PDCCH. The CCEs correspond to a plurality of resource element groups. A format of the PDCCH and a bit number of usable PDCCH are determined according to an association between the number of CCEs and the coding rate provided by the CCEs.

The base station determines the PDCCH format according to the DCI to be transmitted and attaches the control information to a cyclic redundancy check (CRC) to the control information. The CRC is masked with a unique identifier (referred to as a radio network temporary identifier (RNTI)) according to an owner or a purpose of the PDCCH. In the case of a PDCCH for a specific terminal, the unique identifier of the terminal, for example, a cell-RNTI (C-RNTI) may be masked with the CRC. Alternatively, in the case of a PDCCH for the paging message, a paging indication identifier, for example, the CRC may be masked with a paging-RNTI (P-RNTI). In the case of a PDCCH for the system information, in more detail, a system information block (SIB), the CRC may be masked with a system information identifier, that is, a system information (SI)-RNTI. The CRC may be masked with a random access (RA)-RNTI in order to indicate the random access response which is a response to transmission of a random access preamble.

Figure 4:
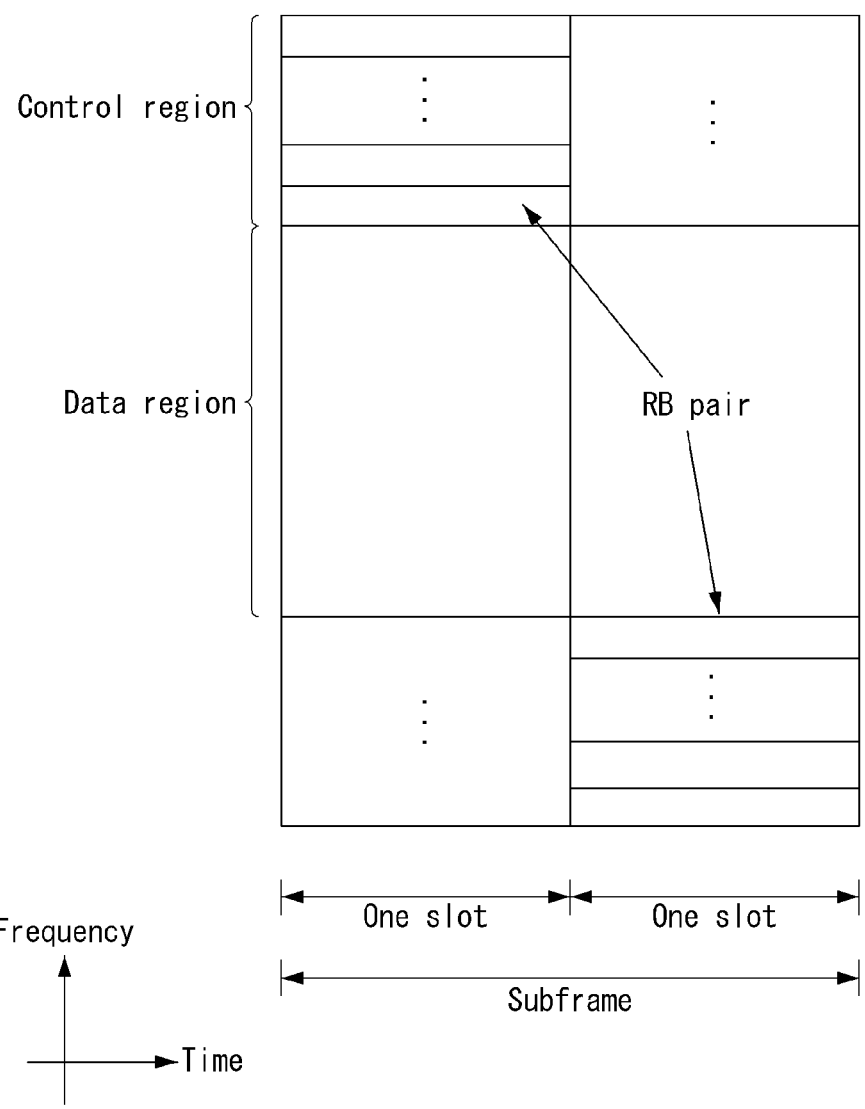
FIG. 4 illustrates a structure of uplink subframe in a wireless communication system to which the present invention may be applied.

FIG. 4 illustrates a structure of an uplink subframe in the wireless communication system to which the present invention can be applied.

Referring to FIG. 4, the uplink subframe may be divided into the control region and the data region in a frequency domain. A physical uplink control channel (PUCCH) transporting uplink control information is allocated to the control region. A physical uplink shared channel (PUSCH) transporting user data is allocated to the data region. One terminal does not simultaneously transmit the PUCCH and the PUSCH in order to maintain a single carrier characteristic.

A resource block (RB) pair in the subframe is allocated to the PUCCH for one terminal. RBs included in the RB pair occupy different subcarriers in two slots, respectively. The RB pair allocated to the PUCCH frequency-hops in a slot boundary.

Physical Uplink Control Channel (PUCCH)

Uplink control information (UCI) transmitted through a PUCCH may include the following scheduling request (SR), HARQ ACK/NACK information, and downlink channel measurement information.

Scheduling Request (SR): The SR is information used for requesting an uplink UL-SCH resource. The SR is transmitted using an On-off Keying (OOK) method.

HARQ ACK/NACK: The HARQ ACK/NACK is a response signal to a downlink data packet on a PDSCH. The HARQ ACK/NACK represents whether a downlink data packet is successfully received. ACK/NACK 1 bit is transmitted in response to a single downlink codeword, and ACK/NACK 2 bits are transmitted in response to two downlink codewords.

Channel State Information (CSI): The CSI is feedback information about a downlink channel. CSI may include at least one of a Channel Quality Indicator (CQI), a rank indicator (RI), a precoding matrix indicator (PMI), and a Precoding Type Indicator (PTI). 20 bits are used per subframe.

The HARQ ACK/NACK information may be generated according to a downlink data packet on the PDSCH is successfully decoded. In the existing wireless communication system, 1 bit is transmitted as ACK/NACK information with respect to downlink single codeword transmission and 2 bits are transmitted as the ACK/NACK information with respect to downlink 2-codeword transmission.

The channel measurement information which designates feedback information associated with a multiple input multiple output (MIMO) technique may include a channel quality indicator (CQI), a precoding matrix index (PMI), and a rank indicator (RI). The channel measurement information may also be collectively expressed as the CQI.

20 bits may be used per subframe for transmitting the CQI.

The PUCCH may be modulated by using binary phase shift keying (BPSK) and quadrature phase shift keying (QPSK) techniques. Control information of a plurality of terminals may be transmitted through the PUCCH and when code division multiplexing (CDM) is performed to distinguish signals of the respective terminals, a constant amplitude zero autocorrelation (CAZAC) sequence having a length of 12 is primary used. Since the CAZAC sequence has a characteristic to maintain a predetermined amplitude in the time domain and the frequency domain, the CAZAC sequence has a property suitable for increasing coverage by decreasing a peak-to-average power ratio (PAPR) or cubic metric (CM) of the terminal. Further, the ACK/NACK information for downlink data transmission performed through the PUCCH is covered by using an orthogonal sequence or an orthogonal cover (OC).

Further, the control information transmitted on the PUCCH may be distinguished by using a cyclically shifted sequence having different cyclic shift (CS) values. The cyclically shifted sequence may be generated by cyclically shifting a base sequence by a specific cyclic shift (CS) amount. The specific CS amount is indicated by the cyclic shift (CS) index. The number of usable cyclic shifts may vary depending on delay spread of the channel. Various types of sequences may be used as the base sequence the CAZAC sequence is one example of the corresponding sequence.

Further, the amount of control information which the terminal may transmit in one subframe may be determined according to the number (that is, SC-FDMA symbols other an SC-FDMA symbol used for transmitting a reference signal (RS) for coherent detection of the PUCCH) of SC-FDMA symbols which are usable for transmitting the control information.

In the 3GPP LTE system, the PUCCH is defined as a total of 7 different formats according to the transmitted control information, a modulation technique, the amount of control information, and the like and an attribute of the uplink control information (UCI) transmitted according to each PUCCH format may be summarized as shown in Table 3 given below.

TABLE 3

| PUCCH Format | Uplink Control Information(UCI) |
|---|---|
| Format 1 | Scheduling Request(SR)(unmodulated waveform) |
| Format 1a | 1-bit HARQ ACK/NACK with/without SR |
| Format 1b | 2-bit HARQ ACK/NACK with/without SR |
| Format 2 | CQI (20 coded bits) |
| Format 2 | CQI and 1- or 2-bit HARQ ACK/NACK (20 bits) for extended CP only |
| Format 2a | CQI and 1-bit HARQ ACK/NACK (20 + 1 coded bits) |
| Format 2b | CQI and 2-bit HARQ ACK/NACK (20 + 2 coded bits) |
| Format 3 | HARQ ACK/NACK, SR, CSI (48 coded bits) |

PUCCH format 1 is used for transmitting only the SR. A waveform which is not modulated is adopted in the case of transmitting only the SR and this will be described below in detail.

PUCCH format 1a or 1b is used for transmitting the HARQ ACK/NACK. PUCCH format 1a or 1b may be used when only the HARQ ACK/NACK is transmitted in a predetermined subframe. Alternatively, the HARQ ACK/NACK and the SR may be transmitted in the same subframe by using PUCCH format 1a or 1b.

PUCCH format 2 is used for transmitting the CQI and PUCCH format 2a or 2b is used for transmitting the CQI and the HARQ ACK/NACK. In the case of an extended CP, PUCCH format 2 may be transmitted for transmitting the CQI and the HARQ ACK/NACK.

PUCCH format 3 is used for carrying encoded UCI of 48 bits. The PUCCH format 3 may carry HARQ ACK/NACK of a plurality of serving cells, SR (when existing), and CSI report of one serving cell.

Figure 5:
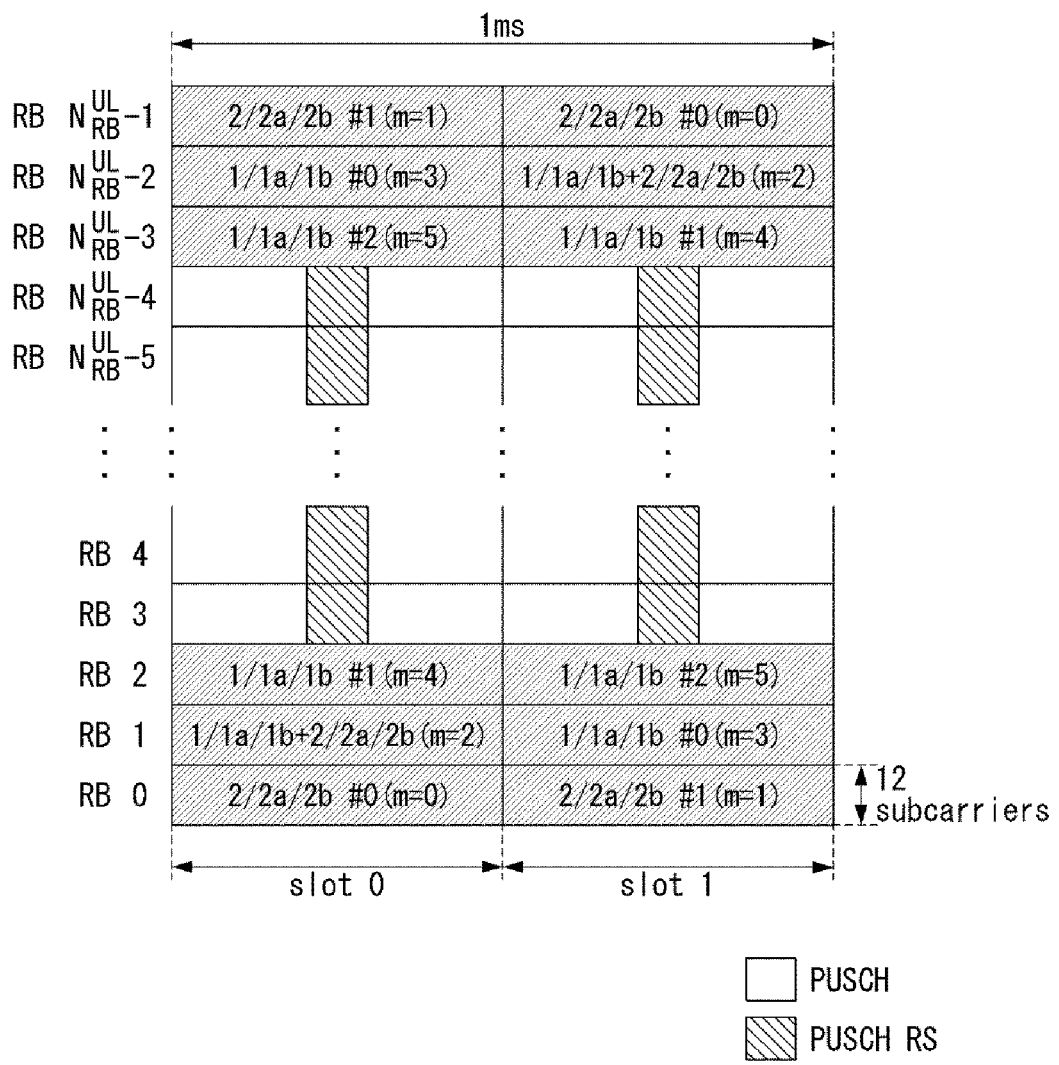
FIG. 5 illustrates an example of the shape in which PUCCH formats are mapped to the PUCCH region of uplink physical resource block in a wireless communication system to which the present invention may be applied.

FIG. 5 illustrates one example of a type in which PUCCH formats are mapped to a PUCCH region of an uplink physical resource block in the wireless communication system to which the present invention can be applied.

In FIG. 5, $N_{RB}^{UL}$ represents the number of resource blocks in the uplink and $0, 1, \ldots, N_{RB}^{UL}-1$ mean numbers of physical resource blocks. Basically, the PUCCH is mapped to both edges of an uplink frequency block. As illustrated in FIG. 5, PUCCH format 2/2a/2b is mapped to a PUCCH region expressed as m=0, 1 and this may be expressed in such a manner that PUCCH format 2/2a/2b is mapped to resource blocks positioned at a band edge. Further, both PUCCH format 2/2a/2b and PUCCH format 1/1a/1b may be mixed and mapped to a PUCCH region expressed as m=2. Next, PUCCH format 1/1a/1b may be mapped to a PUCCH region expressed as m=3, 4, and 5. The number ($N_{RB}^{(2)}$) of PUCCH RBs which are usable by PUCCH format 2/2a/2b may be indicated to terminals in the cell by broadcasting signaling.

PUCCH format 2/2a/2b is described. PUCCH format 2/2a/2b is a control channel for transmitting channel measurement feedback (CQI, PMI, and RI).

A reporting period of the channel measurement feedbacks (hereinafter, collectively expressed as CQI information) and a frequency wise (alternatively, a frequency resolution) to be measured may be controlled by the base station. In the time domain, periodic and aperiodic CQI reporting may be supported. PUCCH format 2 may be used for only the periodic reporting and the PUSCH may be used for aperiodic reporting. In the case of the aperiodic reporting, the base station may instruct the terminal to transmit a scheduling resource loaded with individual CQI reporting for the uplink data transmission.

Figure 6:
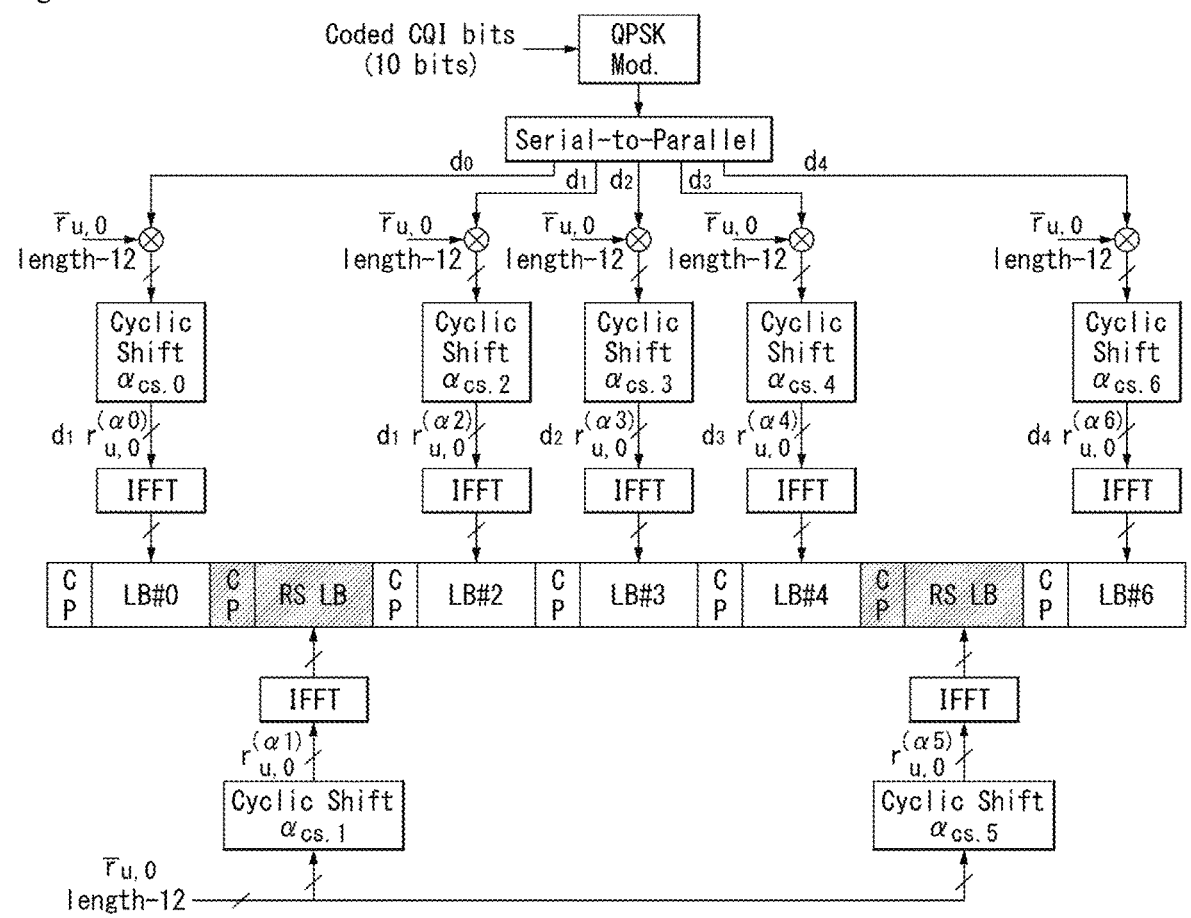
FIG. 6 illustrates a structure of CQI channel in the case of normal CP in a wireless communication system to which the present invention may be applied.

FIG. 6 illustrates a structure of a CQI channel in the case of a general CP in the wireless communication system to which the present invention can be applied.

In SC-FDMA symbols 0 to 6 of one slot, SC-FDMA symbols 1 and 5 (second and sixth symbols) may be used for transmitting a demodulation reference signal and the CQI information may be transmitted in the residual SC-FDMA symbols. Meanwhile, in the case of the extended CP, one SC-FDMA symbol (SC-FDMA symbol 3) is used for transmitting the DMRS.

In PUCCH format 2/2a/2b, modulation by the CAZAC sequence is supported and the CAZAC sequence having the length of 12 is multiplied by a QPSK-modulated symbol.

The cyclic shift (CS) of the sequence is changed between the symbol and the slot. The orthogonal covering is used with respect to the DMRS.

The reference signal (DMRS) is loaded on two SC-FDMA symbols separated from each other by 3 SC-FDMA symbols among 7 SC-FDMA symbols included in one slot and the CQI information is loaded on 5 residual SC-FDMA symbols. Two RSs are used in one slot in order to support a high-speed terminal. Further, the respective terminals are distinguished by using the CS sequence. CQI information symbols are modulated and transferred to all SC-FDMA symbols and the SC-FDMA symbol is constituted by one sequence. That is, the terminal modulates and transmits the CQI to each sequence.

The number of symbols which may be transmitted to one TTI is 10 and modulation of the CQI information is determined up to QPSK. When QPSK mapping is used for the SC-FDMA symbol, since a CQI value of 2 bits may be loaded, a CQI value of 10 bits may be loaded on one slot. Therefore, a CQI value of a maximum of 20 bits may be loaded on one subframe. A frequency domain spread code is used for spreading the CQI information in the frequency domain.

The CAZAC sequence (for example, ZC sequence) having the length of 12 may be used as the frequency domain spread code. CAZAC sequences having different CS values may be applied to the respective control channels to be distinguished from each other. IFFT is performed with respect to the CQI information in which the frequency domain is spread.

12 different terminals may be orthogonally multiplexed on the same PUCCH RB by a cyclic shift having 12 equivalent intervals. In the case of a general CP, a DMRS sequence on SC-FDMA symbol 1 and 5 (on SC-FDMA symbol 3 in the case of the extended CP) is similar to a CQI signal sequence on the frequency domain, but the modulation of the CQI information is not adopted.

The terminal may be semi-statically configured by upper-layer signaling so as to periodically report different CQI, PMI, and RI types on PUCCH resources indicated as PUCCH resource indexes ($n_{PUCCH}^{(1,\tilde{p})}$, $n_{PUCCH}^{(2,\tilde{p})}$, and $n_{PUCCH}^{(3,\tilde{p})}$). Herein, the PUCCH resource index ($n_{PUCCH}^{(2,\tilde{p})}$) is information indicating the PUCCH region used for PUCCH format 2/2a/2b and a CS value to be used.

Hereinafter, PUCCH formats 1a and 1b will be described.

In the PUCCH format 1a/1b, a symbol modulated using a BPSK or QPSK modulation method is multiplied with a CAZAC sequence of a length 12. For example, a result in which a CAZAC sequence r (n) (n=0, 1, 2, ..., N−1) of a length N is multiplied to a modulation symbol d(0) becomes y(0), y(1), y(2), ..., y(N−1). y(0), y(1), y(2), ..., y(N−1) symbols may be referred to as a block of symbol. After a CAZAC sequence is multiplied to a modulation symbol, block-wise diffusion using an orthogonal sequence is applied.

A Hadamard sequence of a length 4 is used for general ACK/NACK information, and a Discrete Fourier Transform (DFT) sequence of a length 3 is used for shortened ACK/NACK information and a reference signal.

A Hadamard sequence of a length 2 is used for a reference signal of an extended CP.

Figure 7:
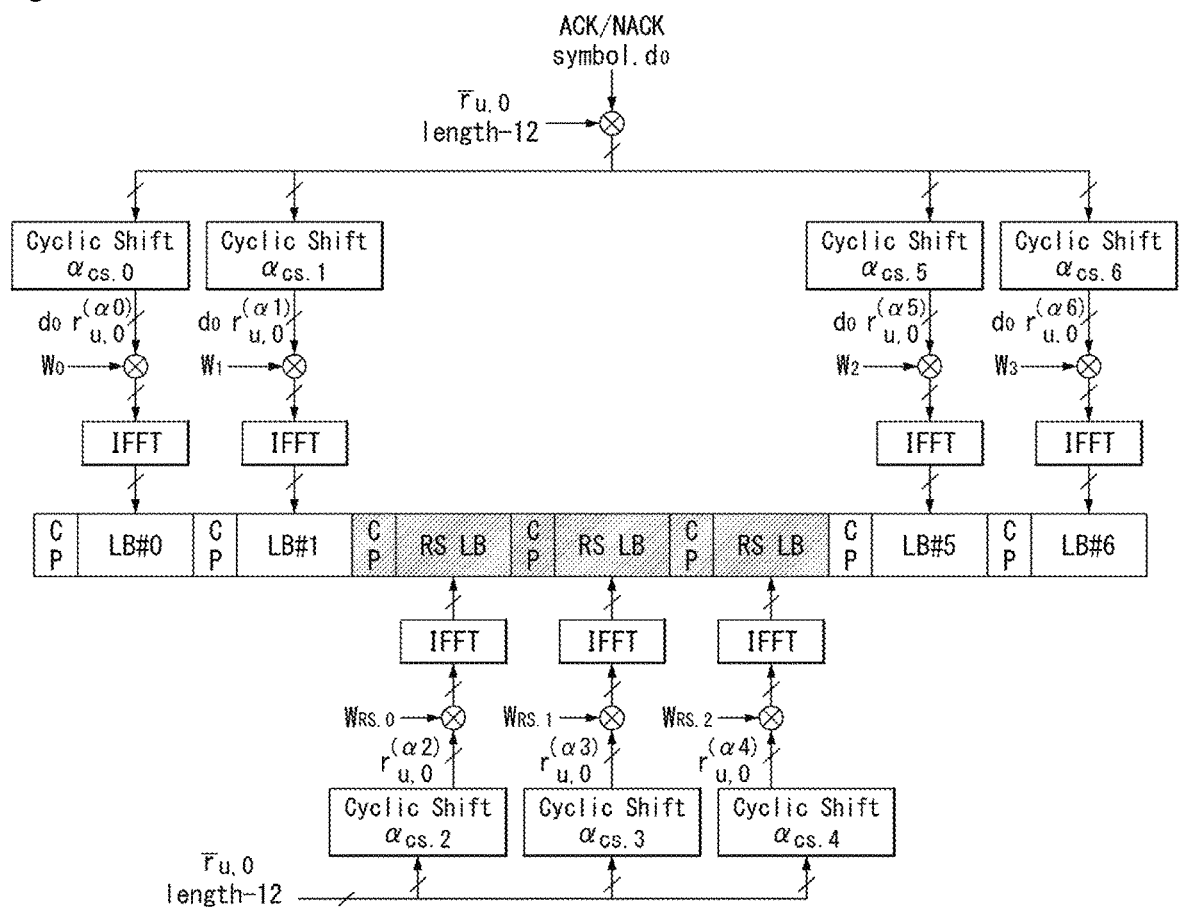
FIG. 7 illustrates a structure of ACK/NACK channel in the case of normal CP in a wireless communication system to which the present invention may be applied.

FIG. 7 illustrates a structure of an ACK/NACK channel in the case of a general CP in the wireless communication system to which the present invention can be applied.

In FIG. 7, a PUCCH channel structure for transmitting the HARQ ACK/NACK without the CQI is exemplarily illustrated.

The reference signal (DMRS) is loaded on three consecutive SC-FDMA symbols in a middle part among 7 SC-FDMA symbols and the ACK/NACK signal is loaded on 4 residual SC-FDMA symbols.

Meanwhile, in the case of the extended CP, the RS may be loaded on two consecutive symbols in the middle part. The number of and the positions of symbols used in the RS may vary depending on the control channel and the numbers and the positions of symbols used in the ACK/NACK signal associated with the positions of symbols used in the RS may also correspondingly vary depending on the control channel.

Acknowledgment response information (not scrambled status) of 1 bit and 2 bits may be expressed as one HARQ ACK/NACK modulated symbol by using the BPSK and QPSK modulation techniques, respectively. A positive acknowledgement response (ACK) may be encoded as '1' and a negative acknowledgment response (NACK) may be encoded as '0'.

When a control signal is transmitted in an allocated band, 2-dimensional (D) spread is adopted in order to increase a multiplexing capacity. That is, frequency domain spread and time domain spread are simultaneously adopted in order to increase the number of terminals or control channels which may be multiplexed.

A frequency domain sequence is used as the base sequence in order to spread the ACK/NACK signal in the frequency domain. A Zadoff-Chu (ZC) sequence which is one of the CAZAC sequences may be used as the frequency domain sequence. For example, different CSs are applied to the ZC sequence which is the base sequence, and as a result, multiplexing different terminals or different control channels may be applied. The number of CS resources supported in an SC-FDMA symbol for PUCCH RBs for HARQ ACK/NACK transmission is set by a cell-specific upper-layer signaling parameter ($\Delta_{shift}^{PUCCH}$).

The ACK/NACK signal which is frequency-domain spread is spread in the time domain by using an orthogonal spreading code. As the orthogonal spreading code, a Walsh-Hadamard sequence or DFT sequence may be used. For example, the ACK/NACK signal may be spread by using an orthogonal sequence (w0, w1, w2, and w3) having the length of 4 with respect to 4 symbols. Further, the RS is also spread through an orthogonal sequence having the length of 3 or 2. This is referred to as orthogonal covering (OC).

Multiple terminals may be multiplexed by a code division multiplexing (CDM) scheme by using the CS resources in the frequency domain and the OC resources in the time domain described above. That is, ACK/NACK information and RSs of a lot of terminals may be multiplexed on the same PUCCH RB.

In respect to the time-domain spread CDM, the number of spreading codes supported with respect to the ACK/NACK information is limited by the number of RS symbols. That is, since the number of RS transmitting SC-FDMA symbols is smaller than that of ACK/NACK information transmitting SC-FDMA symbols, the multiplexing capacity of the RS is smaller than that of the ACK/NACK information.

For example, in the case of the general CP, the ACK/NACK information may be transmitted in four symbols and not 4 but 3 orthogonal spreading codes are used for the ACK/NACK information and the reason is that the number of RS transmitting symbols is limited to 3 to use only 3 orthogonal spreading codes for the RS.

In the case of the subframe of the general CP, when 3 symbols are used for transmitting the RS and 4 symbols are used for transmitting the ACK/NACK information in one slot, for example, if 6 CSs in the frequency domain and 3 orthogonal cover (OC) resources may be used, HARQ acknowledgement responses from a total of 18 different terminals may be multiplexed in one PUCCH RB. In the case of the subframe of the extended CP, when 2 symbols are used for transmitting the RS and 4 symbols are used for transmitting the ACK/NACK information in one slot, for example, if 6 CSs in the frequency domain and 2 orthogonal cover (OC) resources may be used, the HARQ acknowledgement responses from a total of 12 different terminals may be multiplexed in one PUCCH RB.

Next, PUCCH format 1 is described. The scheduling request (SR) is transmitted by a scheme in which the terminal requests scheduling or does not request the scheduling. An SR channel reuses an ACK/NACK channel structure in PUCCH format 1a/1b and is configured by an on-off keying (OOK) scheme based on an ACK/NACK channel design. In the SR channel, the reference signal is not transmitted. Therefore, in the case of the general CP, a sequence having a length of 7 is used and in the case of the extended CP, a sequence having a length of 6 is used. Different cyclic shifts (CSs) or orthogonal covers (OCs) may be allocated to the SR and the ACK/NACK. That is, the terminal transmits the HARQ ACK/NACK through a resource allocated for the SR in order to transmit a positive SR. The terminal transmits the HARQ ACK/NACK through a resource allocated for the ACK/NACK in order to transmit a negative SR.

ACK/NACK Multiplexing Method

In the situation in which a UE has to transmit multiple ACK/NACKs corresponding to multiple data units received from an eNB at the same time, an ACK/NACK multiplexing method based on PUCCH resource selection may be taken into consideration in order to maintain the single-frequency characteristic of an ACK/NACK signal and reduce ACK/NACK transmission power.

The content of ACK/NACK responses to multiple data units along with ACK/NACK multiplexing is identified by a combination of a PUCCH resource actually used for ACK/NACK transmission and the resources of QPSK modulation symbols.

For example, if one PUCCH resource transmits 4 bits and a maximum of 4 data units may be transmitted, ACK/NACK results may be identified in an eNB as in Table 4.

TABLE 4

| HARQ-ACK(0), HARQ-ACK(1), HARQ-ACK(2), HARQ-ACK(3) | $n_{PUCCH}^{(1)}$ | b(0), b(1) |
|---|---|---|
| ACK, ACK, ACK, ACK | $n_{PUCCH,1}^{(1)}$ | 1, 1 |
| ACK, ACK, ACK, NACK/DTX | $n_{PUCCH,1}^{(1)}$ | 1, 0 |
| NACK/DTX, NACK/DTX, NACK, DTX | $n_{PUCCH,2}^{(1)}$ | 1, 1 |
| ACK, ACK, NACK/DTX, ACK | $n_{PUCCH,1}^{(1)}$ | 1, 0 |
| NACK, DTX, DTX, DTX | $n_{PUCCH,0}^{(1)}$ | 1, 0 |
| ACK, ACK, NACK/DTX, NACK/DTX | $n_{PUCCH,1}^{(1)}$ | 1, 0 |
| ACK, NACK/DTX, ACK, ACK | $n_{PUCCH,3}^{(1)}$ | 0, 1 |
| NACK/DTX, NACK/DTX, NACK/DTX, NACK | $n_{PUCCH,3}^{(1)}$ | 1, 1 |
| ACK, NACK/DTX, ACK, NACK/DTX | $n_{PUCCH,2}^{(1)}$ | 0, 1 |
| ACK, NACK/DTX, NACK/DTX, ACK | $n_{PUCCH,0}^{(1)}$ | 0, 1 |
| ACK, NACK/DTX, NACK/DTX, NACK/DTX | $n_{PUCCH,0}^{(1)}$ | 1, 1 |
| NACK/DTX, ACK, ACK, ACK | $n_{PUCCH,3}^{(1)}$ | 0, 1 |
| NACK/DTX, NACK, DTX, DTX | $n_{PUCCH,1}^{(1)}$ | 0, 0 |
| NACK/DTX, ACK, ACK, NACK/DTX | $n_{PUCCH,2}^{(1)}$ | 1, 0 |
| NACK/DTX, ACK, NACK/DTX, ACK | $n_{PUCCH,3}^{(1)}$ | 1, 0 |
| NACK/DTX, ACK, NACK/DTX, NACK/DTX | $n_{PUCCH,1}^{(1)}$ | 0, 1 |
| NACK/DTX, NACK/DTX, ACK, ACK | $n_{PUCCH,3}^{(1)}$ | 0, 1 |
| NACK/DTX, NACK/DTX, ACK, NACK/DTX | $n_{PUCCH,2}^{(1)}$ | 0, 0 |
| NACK/DTX, NACK/DTX, NACK/DTX, ACK | $n_{PUCCH,3}^{(1)}$ | 0, 0 |
| DTX, DTX, DTX, DTX | N/A | N/A |

In Table 6, HARQ-ACK(i) indicates ACK/NACK results of an i-th data unit. In Table 3, discontinuous transmission (DTX) means that a data unit to be transmitted for corresponding HARQ-ACK(i) is not present or a UE does not detect a data unit corresponding to HARQ-ACK(i).

According to Table 6, a maximum of 4 PUCCH resources are present, and b(0), b(1) are 2 bits transmitted using a selected PUCCH.

For example, when a UE successfully receives all of 4 data units, the UE transmits 2 bits (1,1) using n_(PUCCH, 1)^(1).

If the UE fails in decoding in the first and the third data units and succeeds in decoding in the second and the fourth data units, the UE transmits bits (1,0) using n_(PUCCH, 1)^(3).

In ACK/NACK channel selection, if at least one ACK is present, NACK and DTX are coupled. The reason for this is that all of ACK/NACK states cannot be expressed by a combination of a reserved PUCCH resource and a QPSK symbol. However, if ACK is not present, DTX is decoupled from NACK.

In this case, a PUCCH resource linked to a data unit corresponding to one clear NACK may also be reserved to transmit the signal of multiple ACK/NACKs.

In the LTE-A system, to transmit a plurality of ACK/NACK information/signals for a plurality of PDSCHs, transmitted through a plurality of downlink component carriers (DL CCs), through a specific uplink component carrier (UL CC) is taken into consideration.

To this end, unlike in ACK/NACK transmission using the PUCCH format 1a/1b in the existing Rel-8 LTE, to transmit a plurality of ACK/NACK information/signals using a PUCCH format 2 or a new PUCCH format (i.e., E-PUCCH format) of the following block-spreading-based modified form after the channel coding (e.g., Reed-Muller code, tail-biting convolutional code) of a plurality of pieces of ACK/NACK information may be taken into consideration.

Figure 8:
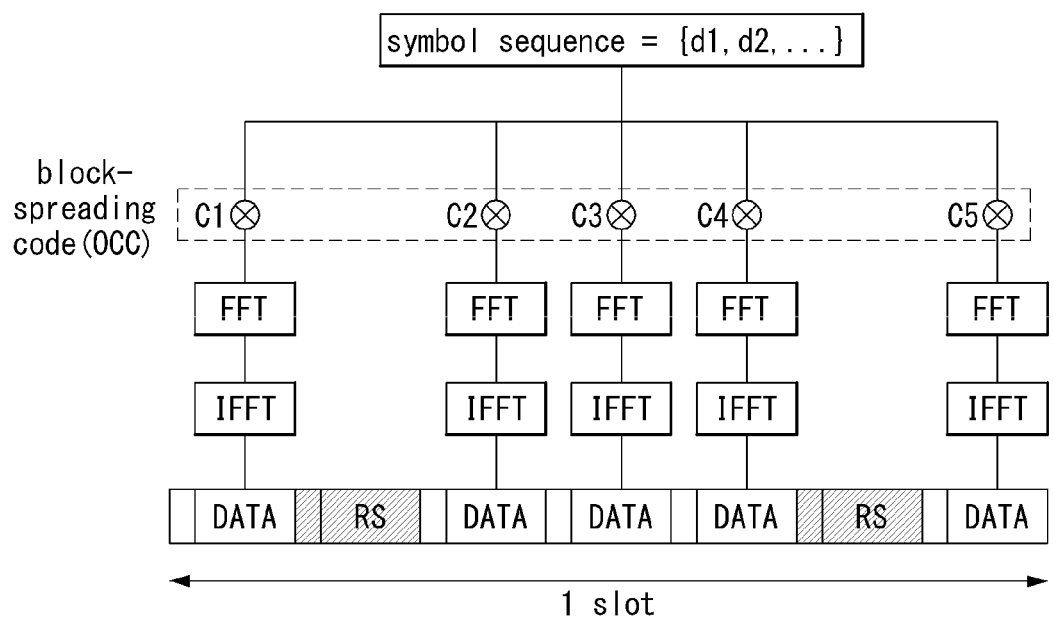
FIG. 8 illustrates an example of generating and transmitting five SC-FDMA symbols during a slot in a wireless communication system to which the present invention may be applied.

The block spreading technique is a scheme that modulates transmission of the control signal by using the SC-FDMA scheme unlike the existing PUCCH format 1 series or 2 series. As illustrated in FIG. 8, a symbol sequence may be spread and transmitted on the time domain by using an orthogonal cover code (OCC). The control signals of the plurality of terminals may be multiplexed on the same RB by using the OCC. In the case of PUCCH format 2 described above, one symbol sequence is transmitted throughout the time domain and the control signals of the plurality of terminals are multiplexed by using the cyclic shift (CS) of the CAZAC sequence, while in the case of a block spreading based on PUCCH format (for example, PUCCH format 3), one symbol sequence is transmitted throughout the frequency domain and the control signals of the plurality of terminals are multiplexed by using the time domain spreading using the OCC.

FIG. 8 illustrates one example of generating and transmitting 5 SC-FDMA symbols during one slot in the wireless communication system to which the present invention can be applied.

In FIG. 8, an example of generating and transmitting 5 SC-FDMA symbols (that is, data part) by using an OCC having the length of 5 (alternatively, SF=5) in one symbol sequence during one slot. In this case, two RS symbols may be used during one slot.

In the example of FIG. 8, the RS symbol may be generated from a CAZAC sequence to which a specific cyclic shift value is applied and transmitted in a type in which a predetermined OCC is applied (alternatively, multiplied) throughout a plurality of RS symbols. Further, in the example of FIG. 8, when it is assumed that 12 modulated symbols are used for each OFDM symbol (alternatively, SC-FDMA symbol) and the respective modulated symbols are generated by QPSK, the maximum bit number which may be transmitted in one slot becomes 24 bits (=12×2). Accordingly, the bit number which is transmittable by two slots becomes a total of 48 bits. When a PUCCH channel structure of the block spreading scheme is used, control information having an extended size may be transmitted as compared with the existing PUCCH format 1 series and 2 series.

For convenience of description, such a channel coding-based multi-ACK/NACK transmission method using the PUCCH format 2 or E-PUCCH format is called a "multi-bit ACK/NACK coding" transmission method. The method is a method of transmitting an ACK/NACK-coded block generated by channel-coding ACK/NACK or DTX information (means that a PDCCH is not received/detected) for the PDSCH of a plurality of DL CCs. For example, if a UE operates in the SU-MIMO mode in a DL CC and receives 2 codewords (CW), it may transmit a total of 4 feedback states of ACK/ACK, ACK/NACK, NACK/ACK, NACK/NACK for each CW with respect to the DL CC or may have a maximum of 5 feedback states even including DTX. Furthermore, if a UE receives a single CW, it may have a maximum of 3 states of ACK, NACK, and DTX (if NACK is processed identically with DTX, the UE may have a total of 2 states of ACK and NACK/DTX). Accordingly, if a UE aggregates a maximum of 5 DL CCs and operates in the SU-MIMO mode in all the CCs, it may have a maximum of 55 feedback states. An ACK/NACK payload size for expressing the maximum of 55 feedback states is a total of 12 bits (if DTX is processed identically with NACK, the number of feedback state is 45, and an ACK/NACK payload size for expressing it is a total of 10 bits).

In the above ACK/NACK multiplexing (i.e., ACK/NACK selection) method applied to the existing Rel-8 TDD system, an implicit ACK/NACK selection method using an implicit PUCCH resource corresponding to a PDCCH (i.e., linked to the lowest CCE index) and scheduling each PDSCH of a corresponding UE in order to secure the PUCCH resource of each UE is basically taken into consideration. Meanwhile, in the LTE-A FDD system, multiple ACK/NACK transmission for a plurality of PDSCHs, transmitted through a plurality of DL CCs, through one specific UL CC configured in a UE-specific manner is basically taken into consideration. To this end, an "ACK/NACK selection" method using an implicit PUCCH resource linked to a PDCCH (i.e., linked to the lowest CCE index n_CCE or linked to n_CCE and n_CCE+1) that schedules a specific DL CC or some or all of DL CCs or a combination of the corresponding implicit PUCCH resource and an explicit PUCCH resource previously reserved for each UE through RRC signaling is taken into consideration.

Meanwhile, even in the LTE-A TDD system, a situation in which a plurality of CC has been carrier-aggregated (CA) may be taken into consideration. Accordingly, to transmit a plurality of ACK/NACK information/signals for a plurality of PDSCHs, transmitted through a plurality of DL subframes and a plurality of CCs, through a specific CC (i.e., A/N CC) in an UL subframe corresponding to the plurality of corresponding DL subframes is taken into consideration. In this case, unlike in the above LTE-A FDD, a method of transmitting a plurality of ACK/NACK corresponding to a maximum CW number that may be transmitted through all of CCs allocated to a UE with respect to all of a plurality of DL subframes (i.e., SF) (i.e., all of ACK/NACKs) may be taken into consideration or a method of reducing and transmitting a total transmission ACK/NACK number by applying ACK/NACK bundling to a CW and/or a CC and/or an SF domain (i.e., bundled ACK/NACK) may be taken into consideration (in this case, CW bundling means that ACK/NACK bundling is applied to a CW for each CC with respect to each DL SF. CC bundling means that ACK/NACK bundling is applied to all or some of CCs with respect to each DL SF. SF bundling means that ACK/NACK bundling is applied to all of or some DL SFs with respect to each CC. Characteristically, as an SF bundling method an "ACK-counter" method of providing notification of a total ACK number (or, the number of some ACKs) for each CC with respect to all of PDSCHs or DL grant PDCCHs received for each CC may be taken into consideration). In this case, an ACK/NACK transmission scheme based on the "multi-bit ACK/NACK coding" or the "ACK/NACK selection" may be configurably applied depending on the size of ACK/NACK payload for each UE, that is, ACK/NACK payload for all of or bundled ACK/NACK transmission configured for each UE.

General Carrier Aggregation

A communication environment considered in embodiments of the present invention includes multi-carrier supporting environments. That is, a multi-carrier system or a carrier aggregation system used in the present invention means a system that aggregates and uses one or more component carriers (CCs) having a smaller bandwidth smaller than a target band at the time of configuring a target wideband in order to support a wideband.

In the present invention, multi-carriers mean aggregation of (alternatively, carrier aggregation of) carriers and in this case, the aggregation of the carriers means both aggregation between continuous carriers and aggregation between non-contiguous carriers. Further, the number of component carriers aggregated between the downlink and the uplink may be differently set. A case in which the number of downlink component carriers (hereinafter, referred to as 'DL CC') and the number of uplink component carriers (hereinafter, referred to as 'UL CC') are the same as each other is referred to as symmetric aggregation and a case in which the number of downlink component carriers and the number of uplink component carriers are different from each other is referred to as asymmetric aggregation. The carrier aggregation may be used mixedly with a term such as the carrier aggregation, the bandwidth aggregation, spectrum aggregation, or the like.

The carrier aggregation configured by combining two or more component carriers aims at supporting up to a bandwidth of 100 MHz in the LTE-A system. When one or more carriers having the bandwidth than the target band are combined, the bandwidth of the carriers to be combined may be limited to a bandwidth used in the existing system in order to maintain backward compatibility with the existing IMT system. For example, the existing 3GPP LTE system supports bandwidths of 1.4, 3, 5, 10, 15, and 20 MHz and a 3GPP LTE-advanced system (that is, LTE-A) may be configured to support a bandwidth larger than 20 MHz by using on the bandwidth for compatibility with the existing system. Further, the carrier aggregation system used in the preset invention may be configured to support the carrier aggregation by defining a new bandwidth regardless of the bandwidth used in the existing system.

The LTE-A system uses a concept of the cell in order to manage a radio resource.

The carrier aggregation environment may be called a multi-cell environment. The cell is defined as a combination of a pair of a downlink resource (DL CC) and an uplink resource (UL CC), but the uplink resource is not required. Therefore, the cell may be constituted by only the downlink resource or both the downlink resource and the uplink resource. When a specific terminal has only one configured serving cell, the cell may have one DL CC and one UL CC, but when the specific terminal has two or more configured serving cells, the cell has DL CCs as many as the cells and the number of UL CCs may be equal to or smaller than the number of DL CCs.

Alternatively, contrary to this, the DL CC and the UL CC may be configured. That is, when the specific terminal has multiple configured serving cells, a carrier aggregation environment having UL CCs more than DL CCs may also be supported. That is, the carrier aggregation may be appreciated as aggregation of two or more cells having different carrier frequencies (center frequencies). Herein, the described 'cell' needs to be distinguished from a cell as an area covered by the base station which is generally used.

The cell used in the LTE-A system includes a primary cell (PCell) and a secondary cell (SCell. The P cell and the S cell may be used as the serving cell. In a terminal which is in an RRC_CONNECTED state, but does not have the configured carrier aggregation or does not support the carrier aggregation, only one serving constituted by only the P cell is present. On the contrary, in a terminal which is in the RRC_CONNECTED state and has the configured carrier aggregation, one or more serving cells may be present and the P cell and one or more S cells are included in all serving cells.

The serving cell (P cell and S cell) may be configured through an RRC parameter. PhysCellId as a physical layer identifier of the cell has integer values of 0 to 503. SCellIndex as a short identifier used to identify the S cell has integer values of 1 to 7. ServCellIndex as a short identifier used to identify the serving cell (P cell or S cell) has the integer values of 0 to 7. The value of 0 is applied to the P cell and SCellIndex is previously granted for application to the S cell. That is, a cell having a smallest cell ID (alternatively, cell index) in ServCellIndex becomes the P cell.

The P cell means a cell that operates on a primary frequency (alternatively, primary CC). The terminal may be used to perform an initial connection establishment process or a connection re-establishment process and may be designated as a cell indicated during a handover process. Further, the P cell means a cell which becomes the center of control associated communication among serving cells configured in the carrier aggregation environment. That is, the terminal may be allocated with and transmit the PUCCH only in the P cell thereof and use only the P cell to acquire the system information or change a monitoring procedure. An evolved universal terrestrial radio access (E-UTRAN) may change only the P cell for the handover procedure to the terminal supporting the carrier aggregation environment by using an RRC connection reconfiguration message (RRC-ConnectionReconfigutaion) message of an upper layer including mobile control information (mobilityControlInfo).

The S cell means a cell that operates on a secondary frequency (alternatively, secondary CC). Only one P cell may be allocated to a specific terminal and one or more S cells may be allocated to the specific terminal. The S cell may be configured after RRC connection establishment is achieved and used for providing an additional radio resource. The PUCCH is not present in residual cells other than the P cell, that is, the S cells among the serving cells configured in the carrier aggregation environment. The E-UTRAN may provide all system information associated with a related cell which is in an RRC_CONNECTED state through a dedicated signal at the time of adding the S cells to the terminal that supports the carrier aggregation environment. A change of the system information may be controlled by releasing and adding the related S cell and in this case, the RRC connection reconfiguration (RRCConnectionReconfigutaion) message of the upper layer may be used. The E-UTRAN may perform having different parameters for each terminal rather than broadcasting in the related S cell.

After an initial security activation process starts, the E-UTRAN adds the S cells to the P cell initially configured during the connection establishment process to configure a network including one or more S cells. In the carrier aggregation environment, the P cell and the S cell may operate as the respective component carriers. In an embodiment described below, the primary component carrier (PCC) may be used as the same meaning as the P cell and the secondary component carrier (SCC) may be used as the same meaning as the S cell.

Figure 9:
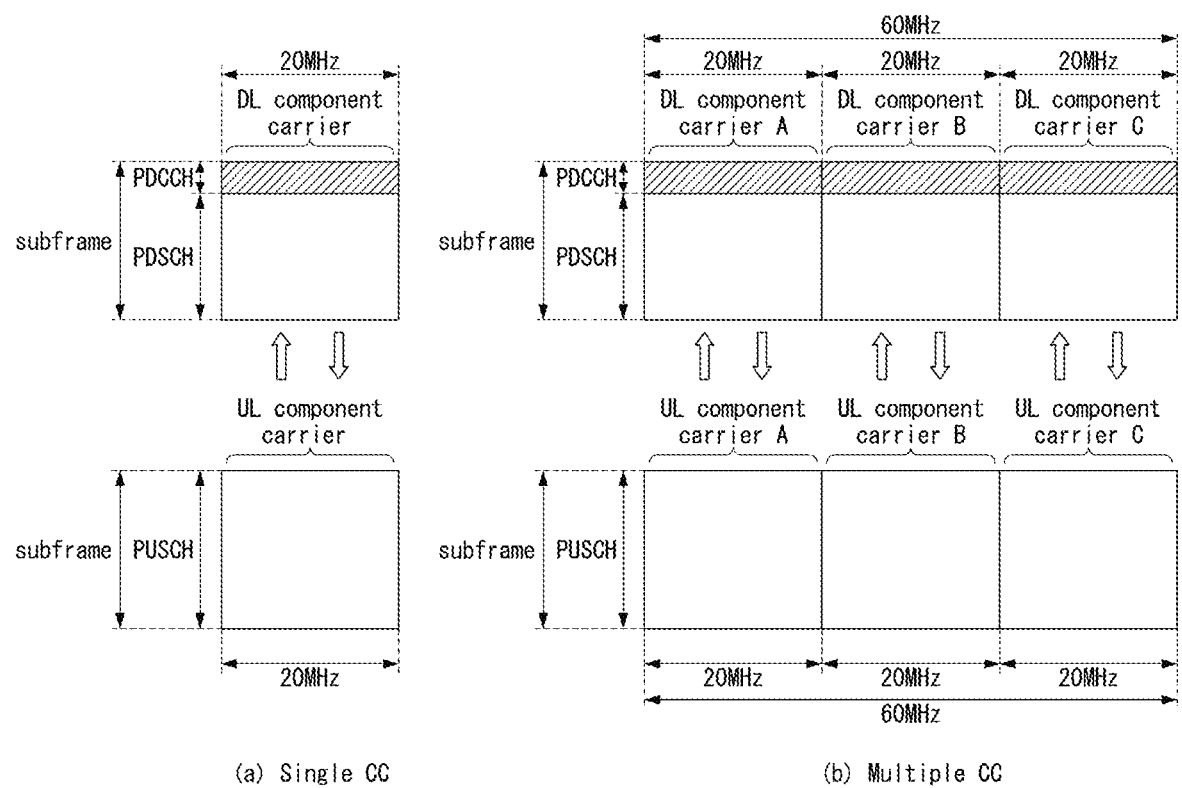
FIG. 9 illustrates an example of component carrier and carrier aggregation in a wireless communication system to which the present invention may be applied.

FIG. 9 illustrates examples of a component carrier and carrier aggregation in the wireless communication system to which the present invention can be applied.

FIG. 9 (a) illustrates a single carrier structure used in an LTE system. The component carrier includes the DL CC and the UL CC. One component carrier may have a frequency range of 20 MHz.

FIG. 9 (b) illustrates a carrier aggregation structure used in the LTE system. In the case of FIG. 9 (b), a case is illustrated, in which three component carriers having a frequency magnitude of 20 MHz are combined. Each of three DL CCs and three UL CCs is provided, but the number of DL CCs and the number of UL CCs are not limited. In the case of carrier aggregation, the terminal may simultaneously monitor three CCs, and receive downlink signal/data and transmit uplink signal/data.

When N DL CCs are managed in a specific cell, the network may allocate M (M≤N) DL CCs to the terminal. In this case, the terminal may monitor only M limited DL CCs and receive the DL signal. Further, the network gives L (L≤M≤N) DL CCs to allocate a primary DL CC to the terminal and in this case, UE needs to particularly monitor L DL CCs. Such a scheme may be similarly applied even to uplink transmission.

A linkage between a carrier frequency (alternatively, DL CC) of the downlink resource and a carrier frequency (alternatively, UL CC) of the uplink resource may be indicated by an upper-layer message such as the RRC message or the system information. For example, a combination of the DL resource and the UL resource may be configured by a linkage defined by system information block type 2 (SIB2). In detail, the linkage may mean a mapping relationship between the DL CC in which the PDCCH transporting a UL grant and a UL CC using the UL grant and mean a mapping relationship between the DL CC (alternatively, UL CC) in which data for the HARQ is transmitted and the UL CC (alternatively, DL CC) in which the HARQ ACK/NACK signal is transmitted.

Cross Carrier Scheduling

In the carrier aggregation system, in terms of scheduling for the carrier or the serving cell, two types of a self-scheduling method and a cross carrier scheduling method are provided. The cross carrier scheduling may be called cross component carrier scheduling or cross cell scheduling.

The cross carrier scheduling means transmitting the PDCCH (DL grant) and the PDSCH to different respective DL CCs or transmitting the PUSCH transmitted according to the PDCCH (UL grant) transmitted in the DL CC through other UL CC other than a UL CC linked with the DL CC receiving the UL grant.

Whether to perform the cross carrier scheduling may be UE-specifically activated or deactivated and semi-statically known for each terminal through the upper-layer signaling (for example, RRC signaling).

When the cross carrier scheduling is activated, a carrier indicator field (CIF) indicating through which DL/UL CC the PDSCH/PUSCH the PDSCH/PUSCH indicated by the corresponding PDCCH is transmitted is required. For example, the PDCCH may allocate the PDSCH resource or the PUSCH resource to one of multiple component carriers by using the CIF. That is, the CIF is set when the PDSCH or PUSCH resource is allocated to one of DL/UL CCs in which the PDCCH on the DL CC is multiply aggregated. In this case, a DCI format of LTE-A Release-8 may extend according to the CIF In this case, the set CIF may be fixed to a 3-bit field and the position of the set CIF may be fixed regardless of the size of the DCI format. Further, a PDCCH structure (the same coding and the same CCE based resource mapping) of the LTE-A Release-8 may be reused.

On the contrary, when the PDCCH on the DL CC allocates the PDSCH resource on the same DL CC or allocates the PUSCH resource on a UL CC which is singly linked, the CIF is not set. In this case, the same PDCCH structure (the same coding and the same CCE based resource mapping) and DCI format as the LTE-A Release-8 may be used.

When the cross carrier scheduling is possible, the terminal needs to monitor PDCCHs for a plurality of DCIs in a control region of a monitoring CC according to a transmission mode and/or a bandwidth for each CC. Therefore, a configuration and PDCCH monitoring of a search space which may support monitoring the PDCCHs for the plurality of DCIs are required.

In the carrier aggregation system, a terminal DL CC aggregate represents an aggregate of DL CCs in which the terminal is scheduled to receive the PDSCH and a terminal UL CC aggregate represents an aggregate of UL CCs in which the terminal is scheduled to transmit the PUSCH. Further, a PDCCH monitoring set represents a set of one or more DL CCs that perform the PDCCH monitoring. The PDCCH monitoring set may be the same as the terminal DL CC set or a subset of the terminal DL CC set. The PDCCH monitoring set may include at least any one of DL CCs in the terminal DL CC set. Alternatively, the PDCCH monitoring set may be defined separately regardless of the terminal DL CC set. The DL CCs included in the PDCCH monitoring set may be configured in such a manner that self-scheduling for the linked UL CC is continuously available. The terminal DL CC set, the terminal UL CC set, and the PDCCH monitoring set may be configured UE-specifically, UE group-specifically, or cell-specifically.

When the cross carrier scheduling is deactivated, the deactivation of the cross carrier scheduling means that the PDCCH monitoring set continuously means the terminal DL CC set and in this case, an indication such as separate signaling for the PDCCH monitoring set is not required. However, when the cross carrier scheduling is activated, the PDCCH monitoring set is preferably defined in the terminal DL CC set. That is, the base station transmits the PDCCH through only the PDCCH monitoring set in order to schedule the PDSCH or PUSCH for the terminal.

Figure 10:
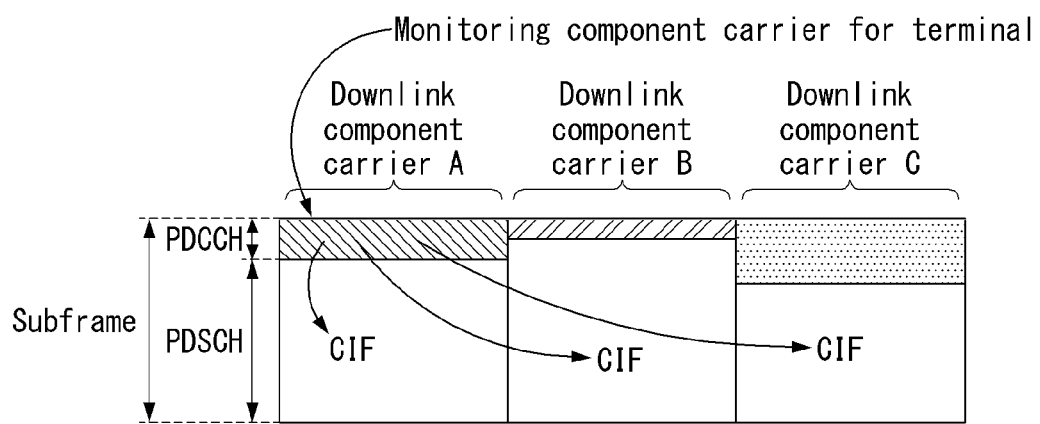
FIG. 10 illustrates an example of subframe structure according to cross carrier scheduling in a wireless communication system to which the present invention may be applied.

FIG. 10 illustrates one example of a subframe structure depending on cross carrier scheduling in the wireless communication system to which the present invention can be applied.

Referring to FIG. 10, a case is illustrated, in which three DL CCs are associated with a DL subframe for an LTE-A terminal and DL CC 'A' is configured as a PDCCH monitoring DL CC. When the CIF is not used, each DL CC may transmit the PDCCH scheduling the PDSCH thereof without the CIF. On the contrary, when the CIF is used through the upper-layer signaling, only one DL CC 'A' may transmit the PDCCH scheduling the PDSCH thereof or the PDSCH of another CC by using the CIF. In this case, DL CC 'B' and 'C' in which the PDCCH monitoring DL CC is not configured does not transmit the PDCCH.

PUCCH Piggybacking

Figure 11:
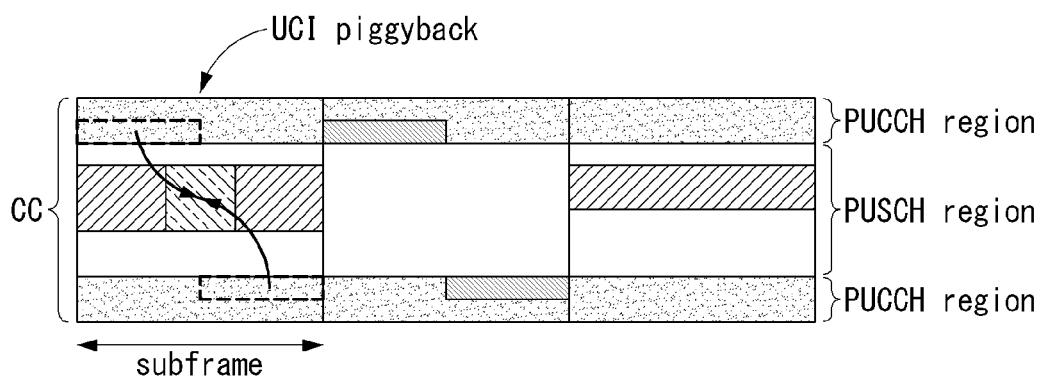
FIG. 11 illustrates an example of transmission channel processing of UL-SCH in a wireless communication system to which the present invention may be applied.

FIG. 11 illustrates one example of transport channel processing of a UL-SCH in the wireless communication system to which the present invention can be applied.

In a 3GPP LTE system (=E-UTRA, Rel. 8), in the case of the UL, single carrier transmission having an excellent peak-to-average power ratio (PAPR) or cubic metric (CM) characteristic which influences the performance of a power amplifier is maintained for efficient utilization of the power amplifier of the terminal. That is, in the case of transmitting the PUSCH of the existing LTE system, data to be transmitted may maintain the single carrier characteristic through DFT-precoding and in the case of transmitting the PUCCH, information is transmitted while being loaded on a sequence having the single carrier characteristic to maintain the single carrier characteristic. However, when the data to be DFT-precoded is non-contiguously allocated to a frequency axis or the PUSCH and the PUCCH are simultaneously transmitted, the single carrier characteristic deteriorates. Therefore, when the PUSCH is transmitted in the same subframe as the transmission of the PUCCH as illustrated in FIG. 11, uplink control information (UCI) to be transmitted to the PUCCH is transmitted (piggyback) together with data through the PUSCH.

Since the PUCCH and the PUSCH may not be simultaneously transmitted as described above, the existing LTE terminal uses a method that multiplexes uplink control information (UCI) (CQI/PMI, HARQ-ACK, RI, and the like) to the PUSCH region in a subframe in which the PUSCH is transmitted.

As one example, when the channel quality indicator (CQI) and/or precoding matrix indicator (PMI) needs to be transmitted in a subframe allocated to transmit the PUSCH, UL-SCH data and the CQI/PMI are multiplexed after DFT-spreading to transmit both control information and data. In this case, the UL-SCH data is rate-matched by considering a CQI/PMI resource. Further, a scheme is used, in which the control information such as the HARQ ACK, the RI, and the like punctures the UL-SCH data to be multiplexed to the PUSCH region.

Figure 12:
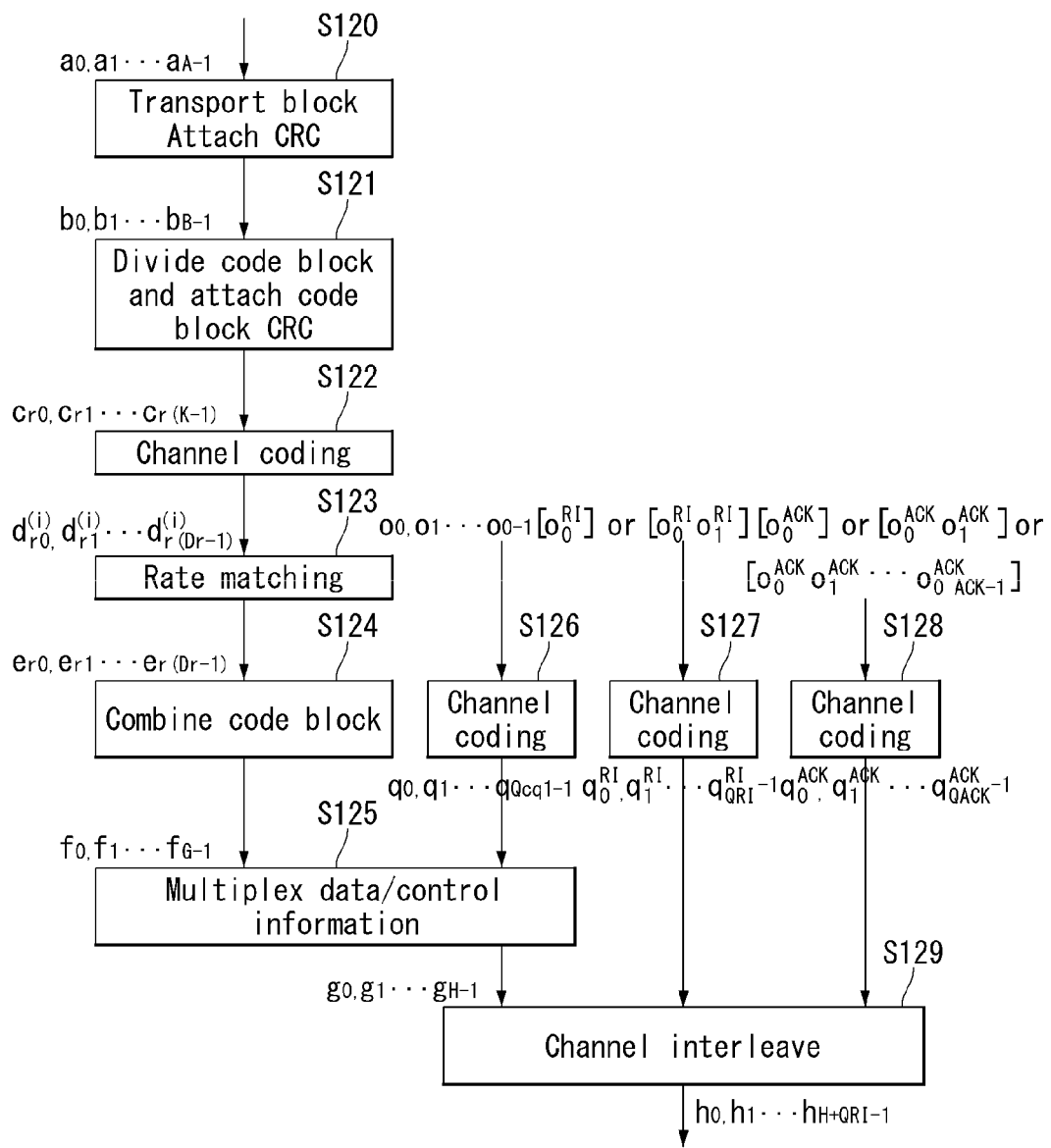
FIG. 12 illustrates an example of signal processing process of uplink shared channel which is a transport channel in a wireless communication system to which the present invention may be applied.

FIG. 12 illustrates one example of a signal processing process of an uplink share channel of a transport channel in the wireless communication system to which the present invention can be applied.

Herein, the signal processing process of the uplink share channel (hereinafter, referred to as "UL-SCH") may be applied to one or more transport channels or control information types.

Referring to FIG. 12, the UL-SCH transfers data to a coding unit in the form of a transport block (TB) once every a transmission time interval (TTI).

CRC parity bits $P\_0 \sim P\_L-1$ are attached to the bits $a\_0 \sim a\_A-1$ of a transport block received from an upper layer (S120). In this case, A is the size of the transport block, and L is the number of parity bits. Input bits to which CRC has been attached are $b\_0 \sim b\_B-1$. In this case, B indicates the number of bits of the transport block including CRC.

$b\_0 \sim b\_B-1$ are segmented into multiple code blocks (CB) based on a TB size, and CRC is attached to the segmented multiple CBs (S121). The code block segmentation and the bits after the CRC attachment are $c\_r0 \sim c\_r(Kr-1)$. In this case, r is a code block number (r=0, ..., C-1), and Kr is the number of bits according to the code block r. Furthermore, C indicates a total number of code blocks.

Next, channel coding is performed (S122). Output bits after the channel coding are $d\_r0\char`\^(i) \sim d\_r(Dr-1)\char`\^(i)$. In this case, i is a coded stream index and may have a 0, 1 or 2 value. Dr indicates the number of bits if an i-th coded stream for the code block r. r is a code block number(r=0, ..., C-1), and C indicates a total number of code blocks. Each code block may be coded by each turbo coding.

Next, rate matching is performed (S123). Bits after the rate matching are $e\_r0 \sim e\_r(Er-1)$. In this case, r is a code block number (r=0, ..., C-1), and C is a total number of code blocks. Er indicates the number of rate-matched bits of a r-th code block.

Next, concatenation between code blocks is performed (S124). Bits after the concatenation between code blocks is performed are $f\_0 \sim f\_G-1$. In this case, G indicates a total number of coded bits for transmission. When control information is multiplexed with UL-SCH transmission, the number of bits used for control information transmission is not included.

Meanwhile, when control information is transmitted in a PUSCH, channel coding is independently performed on CQI/PMI, RI, and ACK/NACK, that is, control information (S126, S127, and S128). Each of the pieces of control information has a different coding rate because a different coded symbol is assigned for the transmission of the control information.

In time division duplex (TDD), an ACK/NACK feedback mode supports two ACK/NACK bundling and ACK/NACK multiplexing modes by an upper layer configuration. For ACK/NACK bundling, ACK/NACK information bits include 1 bit or 2 bits. For ACK/NACK multiplexing, ACK/NACK information bits include 1 bit to 4 bits.

At step S124, after the concatenation step between code blocks, the multiplexing of coded bits $f\_0 \sim f\_G-1$ of UL-SCH data and coded bits $q\_0 \sim q\_(N\_L*Q\_CQI-1)$ of a CQI/PMI is performed (S125). The results of the multiplexing of the data and CQI/PMI are $g\_0 \sim g\_H'-1$. In this case, $g\_i(i=0 \sim H'-1)$ indicates a column vector having a $(Q\_m*N\_L)$ length. $H=(G+N\_L*Q\_CQI)$, and $H'=H/(N\_L*Q\_m)$. N_L indicates the number of layers to which an UL-SCH transport block has been mapped. H indicates a total number of coded bits allocated for UL-SCH data and CQI/PMI information in N_L transmission layers to which a transport block has been mapped.

Next, the multiplexed data and CQI/PMI, and separately channel-coded RI and ACK/NACK are channel-interleaved to generate an output signal (S129).

Hybrid-Automatic Repeat and Request (HARQ)

In a mobile communication system, one eNB transmits and receives data to and from multiple UEs through a radio channel environment in one cell/sector.

In a system operating using multiple carriers and a form similar to the multiple carriers, an eNB receives packet traffic from a wired Internet, and transmits the received packet traffic to each UE using a predetermined communication method. In this case, what the eNB determines to transmit data to which UE using which frequency region at which timing is downlink scheduling.

Furthermore, the eNB receives and demodulates data received from the UE using a predetermined form of a communication method and transmits packet traffic through the wired Internet What an eNB determines to transmit uplink data to which UE using which frequency band at which timing is uplink scheduling. In general, a UE having a good channel state transmits and receives data using more time and many frequency resources.

Figure 13:
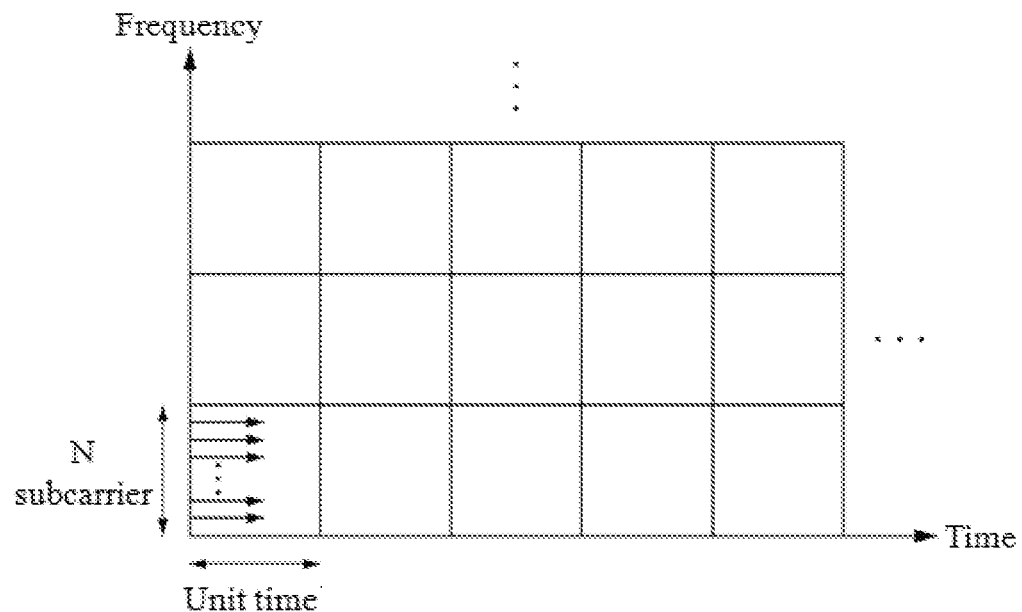
FIG. 13 is a diagram illustrating a time-frequency resource block in a time frequency domain in a wireless communication system to which the present invention may be applied.

FIG. 13 is a diagram illustrating a time-frequency resource block in a time frequency domain in a wireless communication system to which the present invention may be applied.

Resources in a system operating using multiple carriers and a form similar to multiple carriers may be basically divided into a time domain and a frequency domain. The resource may be defined as a resource block, and includes specific N subcarriers and specific M subframes or a predetermined time unit. In this case, N and M may be 1.

In FIG. 13, one square means one resource block, and one resource block has multiple subcarriers as one axis and a predetermined time unit as the other axis. In the downlink, an eNB schedules one or more resource blocks for a selected UE based on a predetermined scheduling rule. The eNB transmits data to the UE using the allocated resource blocks. In the uplink, an eNB schedules one or more resource blocks for a selected UE based on a predetermined scheduling rule. The UE transmits data in the uplink using the allocated resources.

An error control method if a frame is lost or damaged after data is transmitted after scheduling includes an automatic repeat request (ARQ) method and a hybrid ARQ (HARQ) method of a more advanced form.

Basically, in the ARQ method, the reception of an acknowledgement message (ACK) waits after one frame transmission. The receiving side transmits an acknowledgement message (ACK) only when a frame is properly received. If an error occurs in the frame, the receiving side transmits a negative-ACK (NACK) message and deletes corresponding information about a received frame having the error from a receiving stage buffer. A transmitting side transmits a subsequent frame when it receives an ACK signal, but retransmits the frame when it receives an NACK message.

Unlike in the ARQ method, in the HARQ method, if a received frame cannot be demodulated, a receiving stage transmits a NACK message to a transmitting stage, but stores an already received frame in a buffer for a specific time and combines the already received from and a frame when the frame is retransmitted, thereby increasing a reception success ratio.

Recently, the HARQ method more efficient than the basic ARQ method is widely used. The HARQ method includes multiple types, and it may be basically divided into a synchronous HARQ and an asynchronous HARQ depending on retransmission timing and may be divided into a channel-adaptive method and a channel-non-adaptive method depending on whether a channel state is incorporated with respect to the amount of resources used upon retransmission.

The synchronous HARQ method is a method for a system to perform subsequent retransmission at predetermined timing when initial transmission fails. That is, assuming that timing when retransmission is performed is performed every fourth time unit after an initial transmission failure, it is not necessary to additionally provide notification of the timing because the timing has already been agreed between an eNB and a UE. In this case, if a data transmitting side has received a NACK message, it retransmits a frame every fourth time unit until it receives an ACK message.

In contrast, in the asynchronous HARQ method, retransmission timing may be newly scheduled or performed through additional signaling. Timing when the retransmission of a previously failed frame is performed is changed by multiple factors, such as a channel state.

The channel non-adaptive HARQ method is a method of performing the modulation of a frame or the number of used resource blocks and adaptive modulation and coding (AMC) as they have been predetermined when performing retransmission. In contrast, the channel-adaptive HARQ method is a method of changing them depending on the state of a channel. For example, in the channel non-adaptive HARQ method, a transmitting side has transmitted data using 6 resource blocks upon subsequent initial transmission, and performs retransmission using 6 resource blocks identically even in subsequent retransmission. In contrast, a method of performing retransmission using resource blocks greater than or smaller than the 6 resource blocks depending on a channel state although transmission has been initially performed using 6 resource blocks is a channel-adaptive HARQ method.

Four HARQ combinations may be performed based on such a classification, but chiefly used HARQ methods include an asynchronous and channel-adaptive HARQ method and a synchronous and channel non-adaptive HARQ method.

The asynchronous and channel-adaptive HARQ method can maximize retransmission efficiency by adaptively making different retransmission timing and the amount of used resources depending on the state of a channel, but is not generally taken into consideration for the uplink because it has a disadvantage in that overhead increases.

Meanwhile, the synchronous and channel non-adaptive HARQ method has an advantage in that it rarely has overhead for timing for retransmission and resource allocation because they have been agreed within a system, but has a disadvantage in that retransmission efficiency is very low if this method is used in a severely changing channel state.

Figure 14:
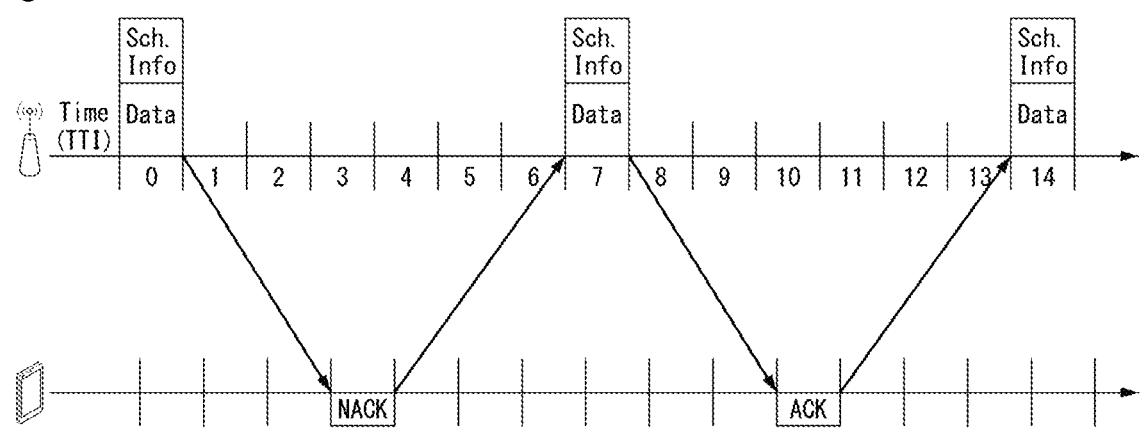
FIG. 14 is a diagram illustrating a resource allocation and retransmission process of an asynchronous HARQ method in a wireless communication system to which the present invention may be applied.

FIG. 14 is a diagram illustrating a resource allocation and retransmission process of an asynchronous HARQ method in a wireless communication system to which the present invention may be applied.

Meanwhile, for example, in the case of the downlink, after scheduling is performed and data is transmitted, ACK/NACK information is received from a UE. Time delay occurs as in FIG. 14 until next data is transmitted. This corresponds to channel propagation delay and delay occurring due to the time taken for data decoding and data coding.

For data transmission not having an empty space during such a delay section, a method of transmitting data using an independent HARQ process is used. For example, if the shortest period between next data transmission and subsequent data transmission is 7 subframes, data transmission can be performed without an empty space if 7 independent processes are placed. In LTE, a maximum of 8 processes has been designed to be allocated if a system does not operate in MIMO.

Reference Signal (RS)

In a wireless communication system, a signal may be distorted during transmission because data is transmitted through a radio channel. In order for a receiving stage to precisely receive a distorted signal, the distortion of the received signal needs to be corrected using channel information. In order to detect channel information, a signal transmission method known to both a transmitting side and the receiving side and a method of detecting channel information using the degree that a signal has been distorted when the signal is transmitted through a channel are chiefly used. The aforementioned signal is called a pilot signal or a reference signal (RS).

Furthermore, recently, most of mobile communication systems use a method capable of improving transmission/reception data efficiency by adopting multiple transmission antennas and multiple reception antennas instead of using one transmission antenna and one reception antenna used so far when they transmit packets. When data is transmitted/received using multiple input/output antennas, a channel state between a transmission antenna and a reception antenna needs to be detected in order to precisely receive a signal. Accordingly, each transmission antenna needs to have an individual reference signal.

In a mobile communication system, an RS may be basically divided into two types depending on its object. The two types include an RS of an object for channel information acquisition and an RS used for data demodulation. The former has an object for a UE to acquire channel information toward the downlink and needs to be transmitted in a wide band. Even a UE that does not receive downlink data in a specific subframe must be able to receive and measure a corresponding RS. Furthermore, this is also used for the measurement of handover. The latter is an RS also transmitted in a corresponding resource when an eNB transmits downlink. A UE can perform channel estimation by receiving a corresponding RS and thus can demodulate data. This RS needs to be transmitted in a region in which data is transmitted.

5 type of downlink reference signals are defined.
Cell-specific reference signal (CRS)
Multicast-broadcast single-frequency network reference signal (MBSFN RS)
UE-specific reference signal or demodulation reference signal (DM-RS)
Positioning reference signal (PRS)
Channel state information reference signal (CSI-RS)

One reference signal is transmitted for each downlink antenna port.

A CRS is transmitted in all of downlink subframes within a cell supporting PDSCH transmission. The CRS is transmitted in one or more of the antenna ports 0-3. The CRS is defined only in Δf=15 kHz.

An MBSFN RS is transmitted in the MBSFN region of an MBSFN subframe only when a physical multicast channel (PMCH) is transmitted. The MBSFN RS is transmitted in the antenna port 4. The MBSFN RS is defined only in an extended CP.

A DM-RS is supported for the transmission of a PDSCH and is transmitted in the antenna ports p=5, p=7, p=8 or p=7, 8, . . . , υ+6. In this case, υ is the number of layers used for PDSCH transmission. The DM-RS is present and valid for PDSCH demodulation only when PDSCH transmission is associated in a corresponding antenna port. The DM-RS is transmitted only in a resource block (RB) to which a corresponding PDSCH is mapped.

If any one of a physical channel and a physical signal is transmitted using the resource element (RE) of the same index pair (k,l) as an RE in which a DM-RS is transmitted in addition to the DM-RS regardless of an antenna port (p), the DM-RS is not transmitted in the RE of the corresponding index pair (k,l).

A PRS is transmitted only in a resource block within a downlink subframe configured to PRS transmission.

If both a common subframe and an MBSFN subframe are configured as positioning subframes within one cell, OFDM symbols within an MBSFN subframe configured for PRS transmission use the same CP as a subframe #0. If only an MBSFN subframe is configured as a positioning subframe within one cell, OFDM symbols configured for a PRS within the MBSFN region of the corresponding subframe use an extended CP.

The start points of all of OFDM symbols configured for PRS transmission are the same as the start point of a subframe having the same CP length as an OFDM symbol configured for PRS transmission within a subframe configured for PRS transmission.

A PRS is transmitted in the antenna port 6.

A PRS is not mapped to a physical broadcast channel (PBCH) and an RE (k,l) allocated to a PSS or SSS regardless of an antenna port (p).

A PRS is defined only in Δf=15 kHz.

A CSI-RS is transmitted in the 1, 2 4 or 8 antenna port using p=15, p=15, 16, p=15, . . . , 18 and p=15, . . . , 22.

A CSI-RS is defined only in Δf=15 kHz.

A reference signal is described more specifically.

A CRS is a reference signal for the acquisition of information about a channel state shared by all of UEs within a cell and the measurement of handover. A DM-RS is used for data demodulation for only a specific UE. Information for demodulation and channel measurement may be provided using such reference signals. That is, the DM-RS is used for only data demodulation, and the CRS is used for the two objects of channel information acquisition and data demodulation.

A receiving side (i.e., UE) measures a channel state based on a CRS, and feeds indicators related to channel quality, such as a channel quality indicator (CQI), a precoding matrix index (PMI) and/or a rank indicator (RI), back to a transmitting side (i.e., eNB). The CRS is also called a cell-specific reference signal (cell-specific RS). In contrast, a reference signal related to the feedback of channel state information (CSI) may be defined as a CSI-RS.

A DRS may be transmitted through resource elements if data demodulation on a PDSCH is necessary. A UE may receive whether a DRS is present through an upper layer, and is valid only when a corresponding PDSCH is mapped. The DRS may be called a UE-specific reference signal (UE-specific RS) or a demodulation reference signal (DMRS).

Figure 15:
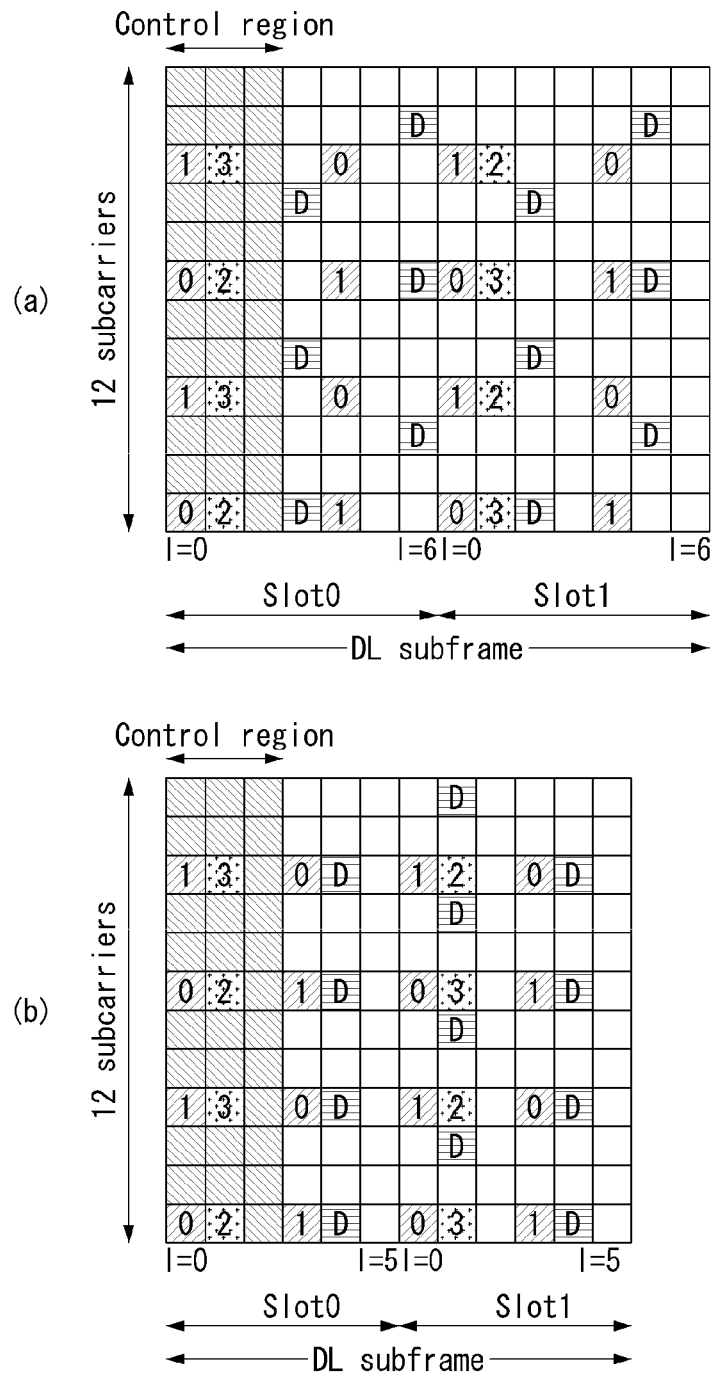
FIG. 15 illustrates a reference signal pattern mapped to a downlink resource block pair in a wireless communication system to which the present invention may be applied.

FIG. 15 illustrates a reference signal pattern mapped to a downlink resource block pair in the wireless communication system to which the present invention can be applied.

Referring to FIG. 15, as a wise in which the reference signal is mapped, the downlink resource block pair may be expressed by one subframe in the timedomain×12 subcarriers in the frequency domain. That is, one resource block pair has a length of 14 OFDM symbols in the case of a normal cyclic prefix (CP) (FIG. 15a) and a length of 12 OFDM symbols in the case of an extended cyclic prefix (CP) (FIG. 15b). Resource elements (REs) represented as '0', '1', '2', and '3' in a resource block lattice mean the positions of the CRSs of antenna port indexes '0', '1', '2', and '3', respectively and resource elements represented as 'D' means the position of the DRS.

Hereinafter, when the CRS is described in more detail, the CRS is used to estimate a channel of a physical antenna and distributed in a whole frequency band as the reference signal which may be commonly received by all terminals positioned in the cell. Further, the CRS may be used to demodulate the channel quality information (CSI) and data.

The CRS is defined as various formats according to an antenna array at the transmitter side (base station). The 3GPP LTE system (for example, release-8) supports various antenna arrays and a downlink signal transmitting side has three types of antenna arrays of three single transmitting antennas, two transmitting antennas, and four transmitting antennas. When the base station uses the single transmitting antenna, a reference signal for a single antenna port is arrayed. When the base station uses two transmitting antennas, reference signals for two transmitting antenna ports are arrayed by using a time division multiplexing (TDM) scheme and/or a frequency division multiplexing (FDM) scheme. That is, different time resources and/or different frequency resources are allocated to the reference signals for two antenna ports which are distinguished from each other.

Moreover, when the base station uses four transmitting antennas, reference signals for four transmitting antenna ports are arrayed by using the TDM and/or FDM scheme. Channel information measured by a downlink signal receiving side (terminal) may be used to demodulate data transmitted by using a transmission scheme such as single transmitting antenna transmission, transmission diversity, closed-loop spatial multiplexing, open-loop spatial multiplexing, or multi-user MIMO.

In the case where the MIMO antenna is supported, when the reference signal is transmitted from a specific antenna port, the reference signal is transmitted to the positions of specific resource elements according to a pattern of the reference signal and not transmitted to the positions of the specific resource elements for another antenna port. That is, reference signals among different antennas are not duplicated with each other.

A rule of mapping the CRS to the resource block is defined as below.

$$k = 6m + (v + v_{shift}) \bmod 6 \quad \text{[Equation 1]}$$

$$l = \begin{cases} 0, N_{symb}^{DL} - 3 & \text{if } p \in \{0, 1\} \\ 1 & \text{if } p \in \{2, 3\} \end{cases}$$

$$m = 0, 1, \ldots, 2 \cdot N_{RB}^{DL} - 1$$

$$m' = m + N_{RB}^{max,DL} - N_{RB}^{DL}$$

$$v = \begin{cases} 0 & \text{if } p = 0 \text{ and } l = 0 \\ 3 & \text{if } p = 0 \text{ and } l \neq 0 \\ 3 & \text{if } p = 1 \text{ and } l = 0 \\ 0 & \text{if } p = 1 \text{ and } l \neq 0 \\ 3(n_s \bmod 2) & \text{if } p = 2 \\ 3 + 3(n_s \bmod 2) & \text{if } p = 3 \end{cases}$$

$$v_{shift} = N_{ID}^{cell} \bmod 6$$

In Equation 1, k and l indicate a subcarrier index and a symbol index, respectively. p indicates an antenna port. N_symb^DL indicates the number of OFDM symbols in one downlink slot, and N_RB^DL indicates the number of radio resources allocated to the downlink. n_s indicates a slot index, and N_ID^cell indicates a cell ID. mod indicates modulo operation. The position of a reference signal varies depending on a v_shift value in the frequency domain. v_shift depends on a cell ID (i.e., a physical cell identity), and thus the position of a reference signal has various frequency shift values depending on the cell.

In more detail, the position of the CRS may be shifted in the frequency domain according to the cell in order to improve channel estimation performance through the CRS. For example, when the reference signal is positioned at an interval of three subcarriers, reference signals in one cell are allocated to a 3 k-th subcarrier and a reference signal in another cell is allocated to a 3 k+1-th subcarrier. In terms of one antenna port, the reference signals are arrayed at an interval of six resource elements in the frequency domain and separated from a reference signal allocated to another antenna port at an interval of three resource elements.

In the time domain, the reference signals are arrayed at a constant interval from symbol index 0 of each slot. The time interval is defined differently according to a cyclic shift length. In the case of the normal cyclic shift, the reference signal is positioned at symbol indexes 0 and 4 of the slot and in the case of the extended CP, the reference signal is positioned at symbol indexes 0 and 3 of the slot. A reference signal for an antenna port having a maximum value between two antenna ports is defined in one OFDM symbol. Therefore, in the case of transmission of four transmitting antennas, reference signals for reference signal antenna ports 0 and 1 are positioned at symbol indexes 0 and 4 (symbol indexes 0 and 3 in the case of the extended CP) and reference signals for antenna ports 2 and 3 are positioned at symbol index 1 of the slot. The positions of the reference signals for antenna ports 2 and 3 in the frequency domain are exchanged with each other in a second slot.

Hereinafter, when the DRS is described in more detail, the DRS is used for demodulating data. A precoding weight used for a specific terminal in the MIMO antenna transmission is used without a change in order to estimate a channel associated with and corresponding to a transmission channel transmitted in each transmitting antenna when the terminal receives the reference signal.

The 3GPP LTE system (for example, release-8) supports a maximum of four transmitting antennas and a DRS for rank 1 beamforming is defined. The DRS for the rank 1 beamforming also means a reference signal for antenna port index 5.

A rule for mapping a DRS to a resource block is defined as follows. Equation 2 shows the case of a normal cyclic prefix, and Equation 3 shows the case of an extended cyclic prefix.

$$k = (k') \bmod N_{sc}^{RB} + N_{sc}^{RB} \cdot n_{PRB} \quad \text{[Equation 2]}$$

$$k' = \begin{cases} 4m' + v_{shift} & \text{if } l \in \{2, 3\} \\ 4m' + (2 + v_{shift}) \bmod 4 & \text{if } l \in \{5, 6\} \end{cases}$$

$$l = \begin{cases} 3 & l' = 0 \\ 6 & l' = 1 \\ 2 & l' = 2 \\ 5 & l' = 3 \end{cases}$$

$$l' = \begin{cases} 0, 1 & \text{if } n_s \bmod 2 = 0 \\ 2, 3 & \text{if } n_s \bmod 2 = 1 \end{cases}$$

$$m' = 0, 1, \ldots, 3N_{RB}^{PDSCH} - 1$$

$$v_{shift} = N_{ID}^{cell} \bmod 3$$

$$k = (k') \bmod N_{sc}^{RB} + N_{sc}^{RB} \cdot n_{PRB} \quad \text{[Equation 3]}$$

$$k' = \begin{cases} 3m' + v_{shift} & \text{if } l = 4 \\ 3m' + (2 + v_{shift}) \bmod 3 & \text{if } l = 1 \end{cases}$$

-continued $$l = \begin{cases} 4 & l' \in \{0, 2\} \\ 1 & l' = 1 \end{cases}$$

$$l' = \begin{cases} 0 & \text{if } n_s \bmod 2 = 0 \\ 1, 2 & \text{if } n_s \bmod 2 = 1 \end{cases}$$

$$m' = 0, 1, \ldots, 4N_{RB}^{PDSCH} - 1$$

$$v_{shift} = N_{ID}^{cell} \bmod 3$$

In Equations 2 and 3, k and l indicate a subcarrier index and a symbol index, respectively. p indicates an antenna port. N_sc^RB indicates a resource block size in the frequency domain and is expressed as the number of subcarriers. n_PRB indicates the number of physical resource blocks. N_RB^PDSCH indicates the frequency band of a resource block for PDSCH transmission. n_s indicates a slot index, and N_ID^cell indicates a cell ID (i.e., a physical cell identity). mod indicates modulo operation. The position of a reference signal varies depending on a v_shift value in the frequency domain. v_shift depends on a cell ID (i.e., a physical cell identity), and thus the position of a reference signal has various frequency shift values depending on the cell.

In Equation 1 to Equation 3, k and p indicate a subcarrier index and an antenna port, respectively. N_RB^DL, ns, and N_ID^Cell indicate the number of RBs allocated to the downlink, the number of slot indices, and the number of cell IDs, respectively. The location of an RS varies depending on a v_shift value in a frequency domain viewpoint.

Sounding Reference Signal (SRS)

The SRS is primarily used for the channel quality measurement in order to perform frequency-selective scheduling and is not associated with transmission of the uplink data and/or control information. However, the SRS is not limited thereto and the SRS may be used for various other purposes for supporting improvement of power control and various start-up functions of terminals which have not been scheduled. One example of the start-up function may include an initial modulation and coding scheme (MCS), initial power control for data transmission, timing advance, and frequency semi-selective scheduling. In this case, the frequency semi-selective scheduling means scheduling that selectively allocates the frequency resource to the first slot of the subframe and allocates the frequency resource by pseudo-randomly hopping to another frequency in the second slot.

Further, the SRS may be used for measuring the downlink channel quality on the assumption that the radio channels between the uplink and the downlink are reciprocal. The assumption is valid particularly in the time division duplex in which the uplink and the downlink share the same frequency spectrum and are divided in the time domain.

Subframes of the SRS transmitted by any terminal in the cell may be expressed by a cell-specific broadcasting signal. A 4-bit cell-specific 'srsSubframeConfiguration' parameter represents 15 available subframe arrays in which the SRS may be transmitted through each radio frame. By the arrays, flexibility for adjustment of the SRS overhead is provided according to a deployment scenario.

A 16-th array among them completely turns off a switch of the SRS in the cell and is suitable primarily for a serving cell that serves high-speed terminals.

Figure 16:
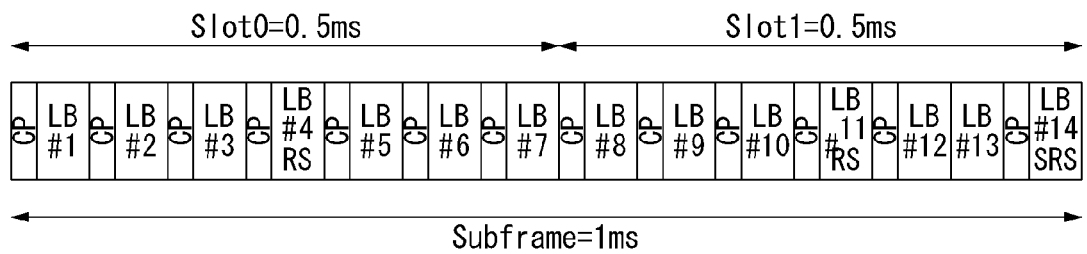
FIG. 16 illustrates an uplink subframe including a sounding reference signal symbol in a wireless communication system to which the present invention may be applied.

FIG. 16 illustrates an uplink subframe including a sounding reference signal symbol in the wireless communication system to which the present invention can be applied.

Referring to FIG. 16, the SRS is continuously transmitted through a last SC FDMA symbol on the arrayed subframes. Therefore, the SRS and the DMRS are positioned at different SC-FDMA symbols.

The PUSCH data transmission is not permitted in a specific SC-FDMA symbol for the SRS transmission and consequently, when sounding overhead is highest, that is, even when the SRS symbol is included in all subframes, the sounding overhead does not exceed approximately 7%.

Each SRS symbol is generated by a base sequence (random sequence or a sequence set based on Zadoff-Ch (ZC)) associated with a given time wise and a given frequency band and all terminals in the same cell use the same base sequence. In this case, SRS transmissions from a plurality of terminals in the same cell in the same frequency band and at the same time are orthogonal to each other by different cyclic shifts of the base sequence to be distinguished from each other.

SRS sequences from different cells may be distinguished from each other by allocating different base sequences to respective cells, but orthogonality among different base sequences is not assured.

Relay Node (RN)

The relay node transfers data transmitted and received between the base station and the terminal through two different links (a backhaul link and an access link). The base station may include a donor cell. The relay node is wirelessly connected to a wireless access network through the donor cell.

Meanwhile, in respect to the use of a band (spectrum) of the relay node, a case in which the backhaul link operates in the same frequency band as the access link is referred to as 'in-band' and a case in which the backhaul link and the access link operate in different frequency bands is referred to as 'out-band'. In both the cases of the in-band and the out-band, a terminal (hereinafter, referred to as a legacy terminal) that operates according to the existing LTE system (for example, release-8) needs to be able to access the donor cell.

The relay node may be classified into a transparent relay node or a non-transparent relay node according to whether the terminal recognizing the relay node. Transparent means a case in which it may not be recognized whether the terminal communicates with the network through the relay node and non-transparent means a case in which it is recognized whether the terminal communicates with the network through the relay node.

In respect to control of the relay node, the relay node may be divided into a relay node which is constituted as a part of the donor cell or a relay node that autonomously controls the cell.

The relay node which is constituted as a part of the donor cell may have a relay node identity (ID), but does not have a cell identity thereof.

When at least a part of radio resource management (RRM) is controlled by a base station to which the donor cell belongs, even though residual parts of the RRM are positioned at the relay node, the relay node is referred to as the relay node which is constituted as a part of the donor cell. Preferably, the relay node may support the legacy terminal. For example, various types including smart repeaters, decode-and-forward relay nodes, L2 (second layer) relay nodes, and the like and a type-2 relay node correspond to the relay node.

In the case of the relay node that autonomously controls the cell, the relay node controls one or a plurality of cells and unique physical layer cell identities are provided to the respective cells controlled by the relay node. Further, the respective cells controlled by the relay node may use the same RRM mechanism. In terms of the terminal, there is no difference between accessing the cell controlled by the relay node and accessing a cell controlled by a general base station. The cell controlled by the relay node may support the legacy terminal. For example, a self-backhauling relay node, an L3 (third layer) relay node, a type-1 relay node, and a type-1a relay node correspond to the relay node.

The type-1 relay node as the in-band relay node controls a plurality of cells and the plurality of respective cells are recognized as separate cells distinguished from the donor cell in terms of the terminal. Further, the plurality of respective cells may have physical cell IDs (they are defined in the LTE release-8) and the relay node may transmit a synchronization channel, the reference signal, and the like thereof. In the case of a single-cell operation, the terminal may receive scheduling information and an HARQ feedback directly from the relay node and transmit control channels (scheduling request (SR), CQI, ACK/NACK, and the like) thereof to the relay node. Further, the type-1 relay node is shown as a legacy base station (a base station that operates according to the LTE release-8 system) to the legacy terminals (terminal that operate according to the LTE release-8 system). That is, the type-1 relay node has the backward compatibility. Meanwhile, the terminals that operate according to the LTE-A system recognize the type-1 relay node as a base station different from the legacy base station to provide performance improvement.

The type-1a relay node has the same features as the type-1 relay node including operating as the out-band The operation of the type-1 a relay node may be configured so that an influence on an L1 (first layer) operation is minimized or is not present.

The type-2 relay node as the in-band relay node does not have a separate physical cell ID, and as a result, a new cell is not formed. The type-2 relay node is transparent with respect to the legacy terminal and the legacy terminal may not recognize the presence of the type-2 relay node. The type-2 relay node may transmit the PDSCH, but at least does not transmit the CRS and the PDCCH.

Meanwhile, in order for the relay node to operate as the in-band, some resources in the time-frequency space needs to be reserved for the backhaul link and the resources may be configured not to be used for the access link. This is referred to as resource partitioning.

A general principle in the resource partitioning in the relay node may be described as below. Backhaul downlink and access downlink may be multiplexed in the time division multiplexing scheme on one carrier frequency (that is, only one of the backhaul downlink and the access downlink is activated at a specific time). Similarly, backhaul uplink and access uplink may be multiplexed in the time division multiplexing scheme on one carrier frequency (that is, only one of the backhaul uplink and the access uplink is activated at a specific time).

In the backhaul link multiplexing in the FDD, backhaul downlink transmission may be performed in a downlink frequency band and backhaul uplink transmission may be performed in an uplink frequency band. In the backhaul link multiplexing in the TDD, THE backhaul downlink transmission may be performed in the downlink subframe of the base station and the relay node and the backhaul uplink transmission may be performed in the uplink subframe of the base station and the relay node.

In the case of the in-band relay node, for example, when both backhaul downlink reception from the base station and access downlink transmission to the terminal are performed in the same frequency band, signal interference may occurs at a receiver side of the relay node by a signal transmitted from a transmitter side of the relay node. That is, the signal interference or RF jamming may occur at an RF front-end of the relay node. Similarly, even when both the backhaul uplink transmission to the base station and the access uplink reception from the terminal are performed in the same frequency band, the signal interference may occur.

Therefore, in order for the relay node to simultaneously transmit and receive the signal in the same frequency band, when sufficient separation (for example, the transmitting antenna and the receiving antenna are installed to be significantly geographically spaced apart from each other like installation on the ground and underground) between a received signal and a transmitted signal is not provided, it is difficult to implement the transmission and reception of the signal.

As one scheme for solving a problem of the signal interference, the relay node operates not transmit the signal to the terminal while receiving the signal from the donor cell. That is, a gap is generated in transmission from the relay node to the terminal and the terminal may be configured not to expect any transmission from the relay node during the gap. The gap may be configured to constitute a multicast broadcast single frequency network (MBSFN) subframe.

Figure 17:
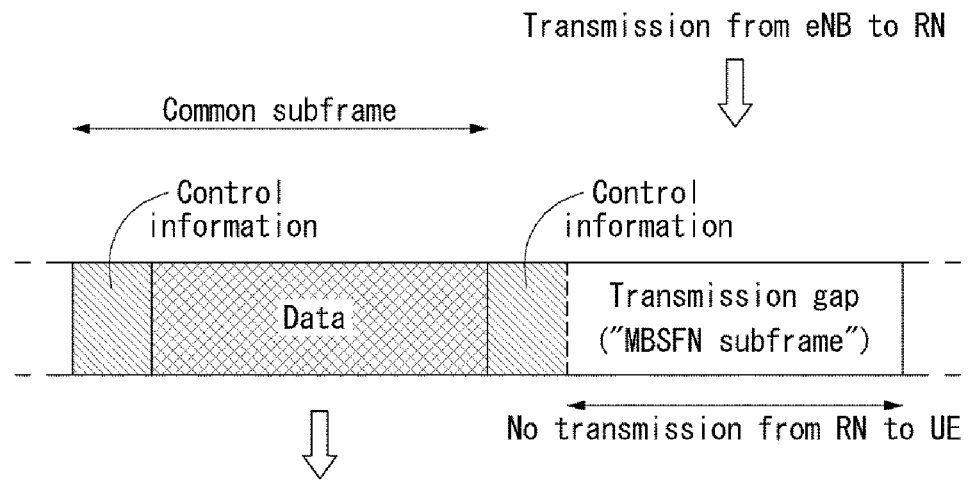
FIG. 17 illustrates a relay node resource partition in a wireless communication system to which the present invention may be applied.

FIG. 17 illustrates a structure of relay resource partitioning in the wireless communication system to which the present invention can be applied.

In FIG. 17, in the case of a first subframe as a general subframe, a downlink (that is, access downlink) control signal and downlink data are transmitted from the relay node and in the case of a second subframe as the MBSFN subframe, the control signal is transmitted from the relay node from the terminal in the control region of the downlink subframe, but no transmission is performed from the relay node to the terminal in residual regions. Herein, since the legacy terminal expects transmission of the PDCCH in all downlink subframes (in other words, since the relay node needs to support legacy terminals in a region thereof to perform a measurement function by receiving the PDCCH every subframe), the PDCCH needs to be transmitted in all downlink subframes for a correct operation of the legacy terminal. Therefore, even on a subframe (second subframe) configured for downlink (that is, backhaul downlink) transmission from the base station to the relay node, the relay does not receive the backhaul downlink but needs to perform the access downlink transmission in first N (N=1, 2, or 3) OFDM symbol intervals of the subframe. In this regard, since the PDCCH is transmitted from the relay node to the terminal in the control region of the second subframe, the backward compatibility to the legacy terminal, which is served by the relay node may be provided. In residual regions of the second subframe, the relay node may receive transmission from the base station while no transmission is performed from the relay node to the terminal. Therefore, through the resource partitioning scheme, the access downlink transmission and the backhaul downlink reception may not be simultaneously performed in the in-band relay node.

The second subframe using the MBSFN subframe will be described in detail. The control region of the second subframe may be referred to as a relay non-hearing interval. The relay non-hearing interval means an interval in which the relay node does not receive the backhaul downlink signal and transmits the access downlink signal. The interval may be configured by the OFDM length of 1, 2, or 3 as described above. In the relay node non-hearing interval, the relay node may perform the access downlink transmission to the terminal and in the residual regions, the relay node may receive the backhaul downlink from the base station. In this case, since the relay node may not simultaneously perform transmission and reception in the same frequency band, It takes a time for the relay node to switch from a transmission mode to a reception mode. Therefore, in a first partial interval of a backhaul downlink receiving region, a guard time (GT) needs to be set so that the relay node switches to the transmission/reception mode. Similarly, even when the relay node operates to receive the backhaul downlink from the base station and transmit the access downlink to the terminal, the guard time for the reception/transmission mode switching of the relay node may be set. The length of the guard time may be given as a value of the time domain and for example, given as a value of k (k≥1) time samples (Ts) or set to the length of one or more OFDM symbols. Alternatively, when the relay node backhaul downlink subframes are consecutively configured or according to a predetermines subframe timing alignment relationship, a guard time of a last part of the subframe may not be defined or set. The guard time may be defined only in the frequency domain configured for the backhaul downlink subframe transmission in order to maintain the backward compatibility (when the guard time is set in the access downlink interval, the legacy terminal may not be supported). In the backhaul downlink reception interval other than the guard time, the relay node may receive the PDCCH and the PDSCH from the base station. This may be expressed as a relay (R)-PDCCH and a relay-PDSCH (R-PDSCH) in a meaning of a relay node dedicated physical channel.

COMP (Coordinated Multi-Point Transmission and Reception)

According to a demand of LTE-advanced, CoMP transmission is proposed in order to improve the performance of the system. The CoMP is also called co-MIMO, collaborative MIMO, network MIMO, and the like. It is anticipated that the CoMP will improves the performance of the terminal positioned at a cell edge and improve an average throughput of the cell (sector).

In general, inter-cell interference decreases the performance and the average cell (sector) efficiency of the terminal positioned at the cell edge in a multi-cell environment in which a frequency reuse index is 1. In order to alleviate the inter-cell interference, the LTE system adopts a simple passive method such as fractional frequency reuse (FFR) in the LTE system so that the terminal positioned at the cell edge has appropriate performance efficiency in an interference-limited environment. However, a method that reuses the inter-cell interference or alleviates the inter-cell interference as a signal (desired signal) which the terminal needs to receive is more preferable instead of reduction of the use of the frequency resource for each cell. The CoMP transmission scheme may be adopted in order to achieve the aforementioned object.

The CoMP scheme which may be applied to the downlink may be classified into a joint processing (JP) scheme and a coordinated scheduling/beamforming (CS/CB) scheme.

In the JP scheme, the data may be used at each point (base station) in a CoMP wise. The CoMP wise means a set of base stations used in the CoMP scheme. The JP scheme may be again classified into a joint transmission scheme and a dynamic cell selection scheme.

The joint transmission scheme means a scheme in which the signal is simultaneously transmitted through a plurality of points which are all or fractional points in the CoMP wise.

That is, data transmitted to a single terminal may be simultaneously transmitted from a plurality of transmission points. Through the joint transmission scheme, the quality of the signal transmitted to the terminal may be improved regardless of coherently or non-coherently and interference with another terminal may be actively removed.

The dynamic cell selection scheme means a scheme in which the signal is transmitted from the single point through the PDSCH in the CoMP wise. That is, data transmitted to the single terminal at a specific time is transmitted from the single point and data is not transmitted to the terminal at another point in the CoMP wise. The point that transmits the data to the terminal may be dynamically selected.

According to the CS/CB scheme, the CoMP wise performs beamforming through coordination for transmitting the data to the single terminal. That is, the data is transmitted to the terminal only in the serving cell, but user scheduling/beamforming may be determined through coordination of a plurality of cells in the CoMP wise.

In the case of the uplink, CoMP reception means receiving the signal transmitted by the coordination among a plurality of points which are geographically separated. The CoMP scheme which may be applied to the uplink may be classified into a joint reception (JR) scheme and the coordinated scheduling/beamforming (CS/CB) scheme.

The JR scheme means a scheme in which the plurality of points which are all or fractional points receives the signal transmitted through the PDSCH in the CoMP wise. In the CS/CB scheme, only the single point receives the signal transmitted through the PDSCH, but the user scheduling/beamforming may be determined through the coordination of the plurality of cells in the CoMP wise.

CA-based CoMP Operation

In post-LTE systems, cooperative multi-point (CoMP) transmission may be implemented using a carrier aggregation (CA) function in LTE.

FIG. 18 is a diagram illustrating a carrier aggregation-based CoMP system in a wireless communication system to which the present invention may be applied.

FIG. 18 illustrates a case where a primary cell (PCell) carrier and a secondary cell (SCell) carrier use the same frequency band in the frequency axis and are allocated to two eNBs that are geographically separated.

Various DL/UL CoMP operations, such as JT, CS/CB, and dynamic cell selection, may be possible by allocating a PCell to a UE1 through a serving eNB and allocating an SCell to a neighbor eNB that gives a lot of interference.

FIG. 18 shows an example in which a UE aggregates two eNBs as a PCell and an SCell, respectively. However, one UE may aggregate three or more cells, some of the cells may perform a CoMP operation in the same frequency band and other cells may perform a simple CA operation in another frequency band. In this case, the PCell does not need to essentially participate in the CoMP operation.

PDCCH Transmission

An eNB determines a PDCCH format based on DCI to be transmitted to a UE and attaches cyclic redundancy check (CRC) to control information. The CRC is masked with a unique identity (this is called a radio network temporary identifier (RNTI)) depending on the owner or use of a PDCCH. If a PDCCH is a PDCCH for a specific UE, CRC may be masked with a unique identify of the UE, for example, a cell-RNTI (C-RNTI). Alternatively, if a PDCCH is a PDCCH for a paging message, CRC may be masked with a paging indication identity, for example, a paging-RNTI (P-RNTI). If a PDCCH is a PDCCH for system information, more specifically, a system information block (SIB), CRC may be masked with a system information identity, a system information RNTI (SI-RNTI). In order to indicate a random access response, that is, a response to the transmission of random access preamble of a UE, CRC may be masked with a random access-RNTI (RA-RNTI).

Next, the eNB generates coded data by performing channel coding on the control information to which CRC has been added. In this case, channel coding may be performed at a code rate according to an MCS level. The eNB performs rate matching according to a CCE aggregation level allocated to a PDCCH format and generates modulation symbols by modulating the coded data. In this case, a modulation rank according to an MCS level may be used. In modulation symbols forming one PDCCH, a CCE aggregation level may be one of 1, 2, 4 and 8. Thereafter, the eNB maps the modulation symbols to a physical resource element (CCE to RE mapping).

A plurality of PDCCHs may be transmitted within one subframe. That is, the control region of one subframe consists of a plurality of CCEs having indices 0~N_(CCE, k)−1. In this case, N_(CCE, k) means a total number of CCEs within the control region of a k-th subframe. A UE monitors a plurality of PDCCHs every subframe.

In this case, the monitoring means that a UE attempts the decoding of each of PDCCHs according to a monitored PDCCH format. In an allocated control region within a subframe, an eNB does not provide information about the position of a PDCCH corresponding to the UE. The UE discovers its own PDCCH by monitoring a set of PDCCH candidates within a subframe because the UE is unaware that the PDCCH is transmitted in which CCE aggregation level at any position or according to which DCI format in order to receive a control channel from the eNB. This is called blind decoding/detection (BD). Blind decoding refers to a method for a UE to de-mask its own UE identity (UE ID) from a CRC part and to confirm whether a corresponding PDCCH is its own control channel by reviewing a CRC error.

In order for a UE to receive data transmitted thereto in the active mode, the UE monitors a PDCCH every subframe. In the DRX mode, the UE wakes up in the monitoring period of a DRX cycle and monitors a PDCCH in a subframe corresponding to the monitoring period. A subframe in which the monitoring of a PDCCH is performed is called a non-DRX subframe.

In order for a UE to receive a PDCCH transmitted thereto, the UE must perform blind decoding on all of CCEs present in the control region of a non-DRX subframe. The UE is unaware that which PDCCH format will be transmitted. Accordingly, the UE decodes all PDCCHs in a possible CCE aggregation level until the blind decoding of a PDCCH is successful within every non-DRX subframe. The UE must attempt detection in all of CCE aggregation levels until the blind decoding of a PDCCH is successful because it is unaware that a PDCCH for the UE uses how many CCEs. That is, the UE performs blind decoding for each CCE aggregation level. That is, the UE attempts decoding using a CCE aggregation level unit as 1. If decoding fully fails, the UE attempts decoding using a CCE aggregation level unit as 2. Thereafter, the UE attempts decoding using a CCE aggregation level unit as 4 and a CCE aggregation level unit as 8. Furthermore, the UE attempts blind decoding on all of four C-RNTI, P-RNTI, SI-RNTI and RA-RNTI. Furthermore, the UE attempts blind decoding on all of DCI formats to be monitored.

As described above, if a UE attempts blind decoding on each of all of CCE aggregation levels with respect to all of DCI formats to be monitored with respect to all of possible RNTIs, a detection attempt number excessively increased. Accordingly, in the LTE system, a search space (SS) concept is defined for the blind decoding of a UE. The search space means a PDCCH candidate set for monitoring and may have a different size depending on each PDCCH format.

The search space may include a common search space (CSS) and a UE-specific/dedicated search space (USS). In the case of a common search space, all of UEs may be aware of the size of a common search space, but a UE-specific/dedicated search space may be individually configured for each UE. Accordingly, the UE has to monitor both the UE-specific/dedicated search space and the common search space in order to decode a PDCCH. Accordingly, the UE performs a maximum of 44 times of blind decoding (BD) in one subframe. This does not include blind decoding performed based on different CRC values (e.g., C-RNTI, P-RNTI, SI-RNTI and RA-RNTI).

An eNB may not secure CCE resources for transmitting a PDCCH to all of UEs to which the PDCCH will be transmitted within a given subframe due to a small search space. The reason for this is that resources left after a CCE location is allocated may not be included in the search space of a specific UE. In order to minimize such a barrier that may continue in a next subframe, a UE-specific hopping sequence may be applied to the start point of a UE-specific/dedicated search space.

Table 5 shows the size of a common search space and a UE-specific/dedicated search space.

TABLE 5

| PDCCH format | Number of CCEs (n) | Number of candidates in common search space | Number of candidates in dedicated search space |
| --- | --- | --- | --- |
| 0 | 1 | — | 6 |
| 1 | 2 | — | 6 |
| 2 | 4 | 4 | 2 |
| 3 | 8 | 2 | 2 |

In order to reduce a computational load of a UE according to the number of times that blind decoding is attempted, the UE does not perform searches according to all of defined DCI formats at the same time. Specifically, the UE may always perform search for the DCI formats 0 and 1A in a UE-specific/dedicated search space. In this case, the DCI formats 0 and 1A have the same size, but the UE may distinguish between DCI formats using a flag used to distinguish between the DCI formats 0 and 1A included in a PDCCH (flag for format 0/format 1A differentiation). Furthermore, other DCI formats other than 0 and 1A may be necessary for the UE depending on a PDSCH transmission mode configured by an eNB. For example, other DCI formats include DCI formats 1, 1B and 2 are present.

In the common search space, a UE may search for the DCI formats 1A and 1C. Furthermore, the UE may be configured to search for the DCI format 3 or 3A. The DCI formats 3 and 3A have the same size as the DCI formats 0 and 1A, but the UE may distinguish between the DCI formats using CRC scrambled by another identity not a UE-specific identity.

A search space S_k^(L) means a PDCCH candidate set according to an aggregation level L∈{1,2,4,8}. A CCE according to the PDCCH candidate set m of a search space may be determined as follows according to Equation 4.

$$L \cdot \{(Y_k+m) \bmod \lfloor N_{CCE,k}/L \rfloor\}+i \qquad \text{[Equation 4]}$$

In this case, M_(L) indicates the number of PDCCH candidates according to a CCE aggregation level L to be monitored in the search space, and m=0~M^(L)-1. i is an index to designate an individual CCE in PDCCH candidates and is i=0~L-1.

As described above, in order to decode a PDCCH, a UE monitors both a UE-specific/dedicated search space and a common search space. In this case, the common search space (CSS) supports PDCCHs having an aggregation level of {4, 8}. The UE-specific/dedicated search space (USS) supports PDCCHs having an aggregation level of {1, 2, 4, 8}.

Table 6 shows PDCCH candidates monitored by a UE.

TABLE 6

| Type | Search space $S_k^{(L)}$ Aggregation level L | Size [in CCEs] | Number of PDCCH candidates $M^{(L)}$ |
|---|---|---|---|
| UE-specific | 1 | 6 | 6 |
|  | 2 | 12 | 6 |
|  | 4 | 8 | 2 |
|  | 8 | 16 | 2 |
| Common | 4 | 16 | 4 |
|  | 8 | 16 | 2 |

Referring to Equation 4, in the case of a common search space, Y_k is set to 0 with respect to a 2 aggregation level, L=4 and L=8. In contrast, Y_k is defined like Equation 5 in the case of a UE-specific/dedicated search space with respect to an aggregation level L.

$$Y_k = (A \cdot Y_{k-1}) \bmod D \quad \text{[Equation 5]}$$

In this case, $Y_{-1} = n_{RNTI} \neq 0$, and an RNTI value used for n_RNTI may be defined as one of the identifications of a UE. Furthermore, A=39827, D=65537, and $k = \lfloor n_s/2 \rfloor$. In this case, n_s indicates a slot number (or index) in a radio frame.

UE Procedure for PDSCH Reception

When a UE detects the PDCCH of a serving cell that forwards the DCI format 1, 1A, 1B, 1C, 1D, 2, 2A, 2B or 2C intended thereto within a subframe other than a subframe(s) indicated by an upper layer parameter 'mbsfn-Subframe-ConfigList', the UE is limited to the number of transport blocks defined in an upper layer and decodes the corresponding PDSCH in the same subframe.

The UE decodes a PDSCH based on a detected PDCCH having CRC scrambled by an SI-RNTI or P-RNTI that forwards the DCI format 1A, 1C intended thereto, and assumes that a PRS is not present in a resource block (RB) in which the corresponding PDSCH is forwarded.

A UE in which a carrier indicator field (CIF) for a serving cell is configured assumes that the carrier indicator field is not present in any PDCCH of a serving cell within a common search space.

If not, when PDCCH CRC is scrambled by a C-RNTI or SPS C-RNTI, a UE in which a CIF is configured assumes that a CIF for a serving cell is present in a PDCCH located within a UE-specific/dedicated search space.

If a UE is configured by an upper layer to decode a PDCCH having CRC scrambled by an SI-RNTI, the UE decodes the PDCCH and a corresponding PDSCH based on combinations defined in Table 7. A PDSCH corresponding to the PDCCH(s) is scrambling-initialized by the SI-RNTI.

Table 7 illustrates PDCCHs and PDSCHs configured by an SI-RNTI.

TABLE 7

| DCI format | Search space | PDSCH transmission method corresponding to PDCCH |
|---|---|---|
| DCI format 1C | Common | If the number of PBCH antenna ports is 1, a single antenna port, a port 0 is used. If not, transmit diversity |
| DCI format 1A | Common | If the number of PBCH antenna ports is 1, a single antenna port, a port 0 is used. If not, transmit diversity |

If a UE is configured by an upper layer to decode a PDCCH having CRC scrambled by a P-RNTI, the UE decodes the PDCCH and a corresponding PDSCH based on combinations defined in Table 8. A PDSCH corresponding to the PDCCH(s) is scrambling-initialized by the P-RNTI.

Table 8 illustrates PDCCHs and PDSCHs configured by a P-RNTI.

TABLE 8

| DCI format | Search space | PDSCH transmission method corresponding to PDCCH |
|---|---|---|
| DCI format 1C | Common | If the number of PBCH antenna ports is 1, a single antenna port, a port 0 is used. If not, transmit diversity |
| DCI format 1A | Common | If the number of PBCH antenna ports is 1, a single antenna port, a port 0 is used. If not, transmit diversity |

If a UE is configured by an upper layer to decode a PDCCH having CRC scrambled by an RA-RNTI, the UE decodes the PDCCH and a corresponding PDSCH based on combinations defined in Table 9. A PDSCH corresponding to the PDCCH(s) is scrambling-initialized by an RA-RNTI.

Table 9 illustrates PDCCHs and PDSCHs configured by an RA-RNTI.

TABLE 9

| DCI format | Search space | PDSCH transmission method corresponding to PDCCH |
|---|---|---|
| DCI format 1C | Common | If the number of PBCH antenna ports is 1, a single antenna port, a port 0 is used. If not, transmit diversity |
| DCI format 1A | Common | If the number of PBCH antenna ports is 1, a single antenna port, a port 0 is used. If not, transmit diversity |

A UE may be configured semi-statically through high layer signaling to receive PDSCH data transmission signaled through a PDCCH based on one of 9 transmission modes like a mode 1 to a mode 9.

In the case of a frame structure type 1,
  A UE does not receive a PDSCH RB transmitted in the antenna port 5 within any subframe in which the number of OFDM symbols for a PDCCH having a normal CP is 4.
  If any one of two physical resource blocks (PRBs) to which a virtual resource block (VRB) pair is mapped overlaps a frequency in which a PBCH or a primary or a secondary synchronization signal is transmitted within the same subframe, a UE does not receive a PDSCH RB transmitted in the antenna port 5, 7, 8, 9, 10, 11, 12, 13 or 14 within the corresponding two PRBs.

A UE does not receive a PDSCH RB transmitted in the antenna port 7 in which a distributed VRB resource allocation has been assigned.

A UE may skip the decoding of a transport block when it does not receive all of allocated PDSCH RBs. If the UE skips decoding, a physical layer indicates that a transport block has not been successfully decoded for an upper layer.

In the case of a frame structure type 2,

A UE does not receive a PDSCH RB transmitted in the antenna port 5 in any subframe in which the number of OFDM symbols for a PDCCH having a normal CP is 4.

If any one of two PRBs to which a VRB pair is mapped overlaps a frequency in which a PBCH is transmitted within the same subframe, a UE does not receive a PDSCH RB transmitted in the antenna port 5 in the corresponding two PRBs.

If any one of two PRBs to which a VRB pair is mapped overlaps a frequency in which a primary or secondary synchronization signal is transmitted within the same subframe, a UE does not receive a PDSCH RB transmitted in the antenna port 7, 8, 9, 10, 11, 12, 13 or 14 in the corresponding two PRBs.

If a normal CP is configured, a UE does not receive a PDSCH in the antenna port 5 in which a distributed VRB resource allocation has been assigned within a special subframe in the uplink-downlink configuration #1 or #6.

A UE does not receive a PDSCH in the antenna port 7 in which a distributed VRB resource allocation has been assigned.

A UE may skip the decoding of a transport block if it does not all of allocated PDSCH RBs. If the UE skips decoding, a physical layer indicates that a transport block has not been successfully decoded for an upper layer.

If a UE is configured by an upper layer to decode a PDCCH having CRC scrambled by a C-RNTI, the UE decodes the PDCCH and a corresponding PDSCH based on combinations defined in Table 10. A PDSCH corresponding to the PDCCH(s) is scrambling-initialized by the C-RNTI.

If a CIF for a serving cell is configured in a UE or the UE is configured by an upper layer to decode a PDCCH having CRC scrambled by a C-RNTI, the UE decodes a PDSCH of a serving cell indicated by a CIF value within the decoded PDCCH.

When the UE of the transmission mode 3, 4, 8 or 9 receives DCI format 1A assignment, the UE assumes that PDSCH transmission is related to a transport block 1 and a transport block 2 is disabled.

If a UE is configured as a transmission mode 7, a UE-specific reference signal corresponding to a PDCCH(s) is scrambling-initialized by a C-RNTI.

If an extended CP is used in the downlink, a UE does not support the transmission mode 8.

If a UE is configured as the transmission mode 9, when the UE detects a PDCCH having CRC scrambled by a C-RNTI that forwards the DCI format 1A or 2C intended thereto, the UE decodes a corresponding PDSCH in a subframe indicated by an upper layer parameter ('mbsfn-SubframeConfigList'). In this case, the UE is configured by an upper layer to decode a PMCH, a PRS occasion is configured only within an MBSFN subframe, a CP length used in a subframe #0 is a normal CP, and a subframe configured as part of the PRS occasion by an upper layer is excluded.

Table 10 illustrates PDCCHs and PDSCHs configured by a C-RNTI.

TABLE 10

| Transmission Mode | DCI format | Search space | PDSCH transmission method corresponding to PDCCH |
|---|---|---|---|
| Mode 1 | DCI format 1A | Common and UE-specific by C-RNTI | Single antenna port, port 0 |
|  | DCI format 1 | UE-specific by C-RNTI | Single antenna port, port 0 |
| Mode 2 | DCI format 1A | Common and UE-specific by C-RNTI | Transmit diversity |
|  | DCI format 1 | UE-specific by C-RNTI | Transmit diversity |
| Mode 3 | DCI format 1A | Common and UE-specific by C-RNTI | Transmit diversity |
|  | DCI format 2A | UE-specific by C-RNTI | Large delay CDD or transmit diversity |
| Mode 4 | DCI format 1A | Common and UE-specific by C-RNTI | Transmit diversity |
|  | DCI format 2 | UE-specific by C-RNTI | Closed-loop spatial multiplexing or transmit diversity |
| Mode 5 | DCI format 1A | Common and UE-specific by C-RNTI | Transmit diversity |
|  | DCI format 1D | UE-specific by C-RNTI | Multi-user MIMO |
| Mode 6 | DCI format 1A | Common and UE-specific by C-RNTI | Transmit diversity |
|  | DCI format 1B | UE-specific by C-RNTI | Closed-loop spatial multiplexing using single transmission layers |
| Mode 7 | DCI format 1A | Common and UE-specific by C-RNTI | If the number of PBCH antenna ports is 1, a single antenna port, a port 0 is used. If not, transmit diversity |
|  | DCI format 1 | UE-specific by C-RNTI | Single antenna port, port 5 |
| Mode 8 | DCI format 1A | Common and UE-specific by C-RNTI | If the number of PBCH antenna ports is 1, a single antenna port, a port 0 is used. If not, transmit diversity |

TABLE 10-continued

| Transmission Mode | DCI format | Search space | PDSCH transmission method corresponding to PDCCH |
|---|---|---|---|
| | DCI format 2B | UE-specific by C-RNTI | Dual layer transmission, a port 7 and 8 or a single antenna port, a port 7 or 8 |
| Mode 9 | DCI format 1A | Common and UE-specific by C-RNTI | Non-MBSFN subframe: if the number of PBCH antenna ports is 1, a single antenna port, a port 0 is used. If not, transmit diversity<br>MBSFN subframe: a single antenna port, a port 7 |
| | DCI format 2C | UE-specific by C-RNTI | Layer transmission up to a maximum of 8, ports 7-14 |

If a UE is configured by an upper layer to decode an SPS PDCCH having CRC scrambled by a C-RNTI, the UE decodes the PDCCH of a primary cell and the corresponding PDSCH of a primary cell based on each of combinations defined in Table 11. If a PDSCH is transmitted without a corresponding PDCCH, the same PDSCH-related configuration is applied. A corresponding PDSCH in a PDCCH and a PDSCH not having a PDCCH are scrambling-initialized by an SPS C-RNTI.

If a UE is configured as the transmission mode 7, a UE-specific reference signal corresponding to the PDCCH(s) is scrambling-initialized by an SPS C-RNTI.

If a UE is configured as the transmission mode 9, when the UE detects a PDCCH having CRC scrambled by an SPS C-RNTI that forwards the DCI format 1A or 2C intended thereto or a PDSCH configured without a PDCCH intended thereto, the UE decodes the corresponding PDSCH in a subframe indicated by an upper layer parameter ('mbsfn-SubframeConfigList'). In this case, the UE is configured by an upper layer to decode a PMCH, a PRS occasion is configured only within an MBSFN subframe, a CP length used in a subframe #0 is a normal CP, and a subframe configured as part of a PRS occasion by an upper layer is excluded.

Table 11 illustrates PDCCHs and PDSCHs configured by an SPS C-RNTI.

If a UE is configured by an upper layer to decode a PDCCH having CRS scrambled by a temporary C-RNTI and configured to not decode a PDCCH having CRC scrambled by a C-RNTI, the UE decodes the PDCCH and a corresponding PDSCH based on combinations defined in Table 12. A PDSCH corresponding to the PDCCH(s) is scrambling-initialized by a temporary C-RNTI.

Table 12 illustrates PDCCHs and PDSCHs configured by a temporary C-RNTI.

TABLE 12

| DCI format | search space | PDSCH transmission method corresponding to PDCCH |
|---|---|---|
| DCI format 1A | Common and UE-specific by temporary C-RNTI | If the number of PBCH antenna ports is 1, a single antenna port, a port 0 is used. If not, transmit diversity |
| DCI format 1 | UE-specific by temporary C-RNTI | If the number of PBCH antenna ports is 1, a single antenna port, a port 0 is used. If not, transmit diversity |

UE Procedure for PUSCH Transmission

A UE is semi-statically configured through high layer signaling to transmit PUSCH transmission signaled through

TABLE 11

| Transmission Mode | DCI format | Search space | PDSCH Transmission method corresponding to PDCCH |
|---|---|---|---|
| Mode 1 | DCI format 1A | Common and UE-specific by C-RNTI | Single antenna port, port 0 |
| | DCI format 1 | UE-specific by C-RNTI | Single antenna port, port 0 |
| Mode 2 | DCI format 1A | Common and UE-specific by C-RNTI | Transmit diversity |
| | DCI format 1 | UE-specific by C-RNTI | Transmit diversity |
| Mode 3 | DCI format 1A | Common and UE-specific by C-RNTI | Transmit diversity |
| | DCI format 2A | UE-specific by C-RNTI | Transmit diversity |
| Mode 4 | DCI format 1A | Common and UE-specific by C-RNTI | Transmit diversity |
| | DCI format 2 | UE-specific by C-RNTI | Transmit diversity |
| Mode 5 | DCI format 1A | Common and UE-specific by C-RNTI | Transmit diversity |
| Mode 6 | DCI format 1A | Common and UE-specific by C-RNTI | Transmit diversity |
| Mode 7 | DCI format 1A | Common and UE-specific by C-RNTI | Single antenna port, port 5 |
| | DCI format 1 | UE-specific by C-RNTI | Single antenna port, port 5 |
| Mode 8 | DCI format 1A | Common and UE-specific by C-RNTI | Single antenna port, port 7 |
| | DCI format 2B | UE-specific by C-RNTI | Single antenna port, port 7 or 8 |
| Mode 9 | DCI format 1A | Common and UE-specific by C-RNTI | Single antenna port, port 7 |
| | DCI format 2C | UE-specific by C-RNTI | Single antenna port, port 7 or 8 | a PDCCH based on any one of two uplink transmission modes of modes 1 and 2 defined in Table 13. If a UE is configured by an upper layer to decode a PDCCH having CRC scrambled by a C-RNTI, the UE decodes a PDCCH based on combinations defined in Table 13 and transmits a corresponding PUSCH. PUSCH transmission corresponding to the PDCCH(s) and PUSCH retransmission for the same transport block are scrambling-initialized by the C-RNTI. The transmission mode 1 is a default uplink transmission mode for a UE until an uplink transmission mode is assigned to the UE by high layer signaling.

If a UE is configured as the transmission mode 2 and receives a DCI format 0 uplink scheduling grant, the UE assumes that PUSCH transmission is related to a transport block 1 and a transport block 2 is disabled.

Table 13 illustrates PDCCHs and PUSCHs configured by a C-RNTI.

TABLE 13

| Transmission mode | DCI format | Search space | Transmission method of PUSCH corresponding to a PDCCH |
|---|---|---|---|
| Mode 1 | DCI format 0 | Common and UE-specific by C-RNTI | Single antenna port, port 10 |
| Mode 2 | DCI format 0 | Common and UE-specific by C-RNTI | Single antenna port, port 10 |
|  | DCI format 4 | UE-specific by C-RNTI | Closed-loop spatial multiplexing |

If a UE is configured by an upper layer to decode a PDCCH having CRC scrambled by a C-RNTI and configured to receive a random access procedure initiated by a PDCCH order, the UE decodes a PDCCH based on combinations defined in Table 14.

Table 14 illustrates a PDCCH configured by a PDCCH order for initiating a random access procedure.

TABLE 14

| DCI format | Search space |
|---|---|
| DCI format 1A | Common and UE-specific by C-RNTI |

If a UE is configured by an upper layer to decode a PDCCH having CRC scrambled by an SPS C-RNTI, the UE decodes a PDCCH based on combinations defined in Table 15 and transmits a corresponding PUSCH. PUSCH transmission corresponding to the PDCCH(s) and PUSCH retransmission for the same transport block are scrambling-initialized by the SPS C-RNTI. Minimum transmission of a PUSCH without a corresponding PDCCH and PUSCH retransmission for the same transport block are scrambling-initialized by an SPS C-RNTI.

Table 15 illustrates PDCCHs and PUSCHs configured by an SPS C-RNTI.

TABLE 15

| Transmission mode | DCI format | Search space | Transmission method of PUSCH corresponding to PDCCH |
|---|---|---|---|
| Mode 1 | DCI format 0 | Common and UE-specific by C-RNTI | Single antenna port, port 10 |
| Mode 2 | DCI format 0 | Common and UE-specific by C-RNTI | Single antenna port, port 10 |

If a is configured by an upper layer to decode a PDCCH scrambled y a temporary C-RNTI regardless of whether the UE has been configured to decode a PDCCH having CRC scrambled by a C-RNTI, the UE decodes a PDCCH based on combinations defined in Table 16 and transmits a corresponding PUSCH. A PUSCH corresponding to the PDCCH(s) is scrambling-initialized by a temporary C-RNTI.

If a temporary C-RNTI is set by an upper layer, PUSCH transmission corresponding to a random access response grant and PUSCH retransmission for the same transport block are scrambled by the temporary C-RNTI. If not, PUSCH transmission corresponding to the random access response grant and PUSCH retransmission for the same transport block are scrambled by a C-RNTI.

Table 16 illustrates a PDCCH configured by a temporary C-RNTI.

TABLE 16

| DCI format | Search space |
|---|---|
| DCI format 0 | Common |

If a UE is configured by an upper layer to decode a PDCCH having CRC scrambled by a TPC-PUCCH-RNTI, the UE decodes a PDCCH based on combinations defined in Table 17. In Table 13, the writing of 3/3A involves that a UE receives the reception of the DCI format 3 or a DCI format depending on the configuration.

Table 17 illustrates a PDCCH scrambled by a TPC-PUCCH-RNTI.

TABLE 17

| DCI format | Search space |
|---|---|
| DCI format 3/3A | Common |

If a UE is configured by an upper layer to decode a PDCCH having CRC scrambled by a TPC-PUSCH-RNTI, the UE decodes a PDCCH based on combinations defined in Table 18. In Table 14, the writing of 3/3A involves that a UE receives the reception of the DCI format 3 or a DCI format depending on the configuration.

Table 18 illustrates a PDCCH configured by a TPC-PUSCH-RNTI.

TABLE 18

| DCI format | search space |
|---|---|
| DCI format 3/3A | Common |

Buffer Status Reporting (BSR)

A buffer status reporting procedure may be used to provide information about the amount of data available (or valid) for transmission in the UL buffers of a UE to a serving eNB. RRC may control BSR reporting by configuring two timers. In this case, the two timers may correspond to periodicBSR-Timer and retxBSR-Timer. Furthermore, RRC may control BSR reporting by selectively signaling a logical channel group (LCG) that allocates a logical channel for a logical channel group (LCG).

For a BSR procedure, a UE needs to taken into consideration all of not-suspended radio bearers. Furthermore, in this case, the UE may take suspended radio bearers into consideration.

BSR may be triggered when any one of the following events occurs.

If UL data (for a logical channel belonging to an LCG) is transmittable in an RLC entity or PDCP entity and if data belonging to a logical channel having higher priority than a logical channel belonging to a specific LCG is already transmittable or transmittable data is not present in any place of logical channels belonging to an LCG (or through any logical channel) (i.e., if BSR corresponds to/is denoted as "Regular BSR" to be described later)

If UL resources are allocated and the number of padding bits is equal to or greater than the size of the sum of a buffer status report MAC control element and its subheader (i.e., if BSR corresponds to/is indicated by "Padding BSR" to be described later)

If retxBSR-Timer expires and a UE has data transmittable with respect to a logical channel belonging to an LCG (i.e., if BSR corresponds to/is indicated by "Regular BSR" to be described later)

If periodicBSR-Timer expires (i.e., BSR corresponds/is indicated by "Periodic BSR" to be described later)

In the case of Regular and Periodic BSR:

If one or more LCGs have data transmittable within a TTI in which BSR is transmitted: long BSR is reported.

Other cases, short BSR is reported.

In the case of Padding BSR:

1) If the number of padding bits is equal to or greater than the size of the sum of short BSR and its subheader and smaller than the size of the sum of long BSR and its subheader:

If one or more LCGs have data transmittable within a TTI in which BSR is transmitted: the truncated BSR of an LCG having a logical channel in which the transmittable data is transmitted and which has the highest priority is reported.

Other cases: short BSR is reported.

2) In other cases, if the number of padding bits is equal to or greater than the size of the sum of long BSR and its subheader: long BSR is reported.

If at least one BSR has been triggered in a BSR procedure and has not been cancelled:

1) If a UE has an UL resource allocated for new transmission in a corresponding TTI:

A multiplexing and assembly procedure is supported in order to generate a BSR MAC control element.

periodicBSR-Timer is started or restarted other than a case where all of generated BSRs are truncated BSRs.

retxBSR-Timer is started or restarted.

2) In other cases, if Regular BSR has been triggered:

If an UL grant is not configured or regular BSR is not triggered due to data to be transmitted through a logical channel (in this case, the logical channel is a channel in which SR masking (logicalChannelSR-Mask) has been configured by an upper layer): a scheduling request is triggered.

If regular BSR and periodic BSR has priority over padding BSR, although a plurality of events to trigger BSR has occurred until BSR is transmitted, a MAC PDU includes a maximum of one MAC BSR control element. When a UE receives approval for the transmission of new data of any UL-SCH, it may start or restart retxBSR-Timer.

If the UL grant of a subframe may accommodate all of pending transmission data, but is insufficient in additionally accommodating the sum of a BSR MAC control element and its subheader, all of triggered BSRs may be cancelled. All of triggered BSRs may be cancelled if BSR is included in a MAC PDU for transmission.

A UE may transmit a maximum of one Regular/Periodic BSR within one TTI. If a UE has received a request to transmit a plurality of MAC PDUs within one TTI, it may include padding BSR in any one of MAC PDUs not including Regular/Periodic BSR.

All of BSRs transmitted within one TTI may incorporate a buffer status after all of MAC PDUs configured for the TTI are transmitted. Each LCG may report a maximum of one buffer status value per TTI, and the value may be reported in all of BSRs reporting buffer status for such an LCG. Padding BSR is not permitted to cancel triggered Regular/Periodic BSR. Padding BSR is triggered for only a specific MAC PDU, and the trigger is cancelled when such a MAC PDU is configured.

Device-to-Device (D2D) Communication

Figure 19:
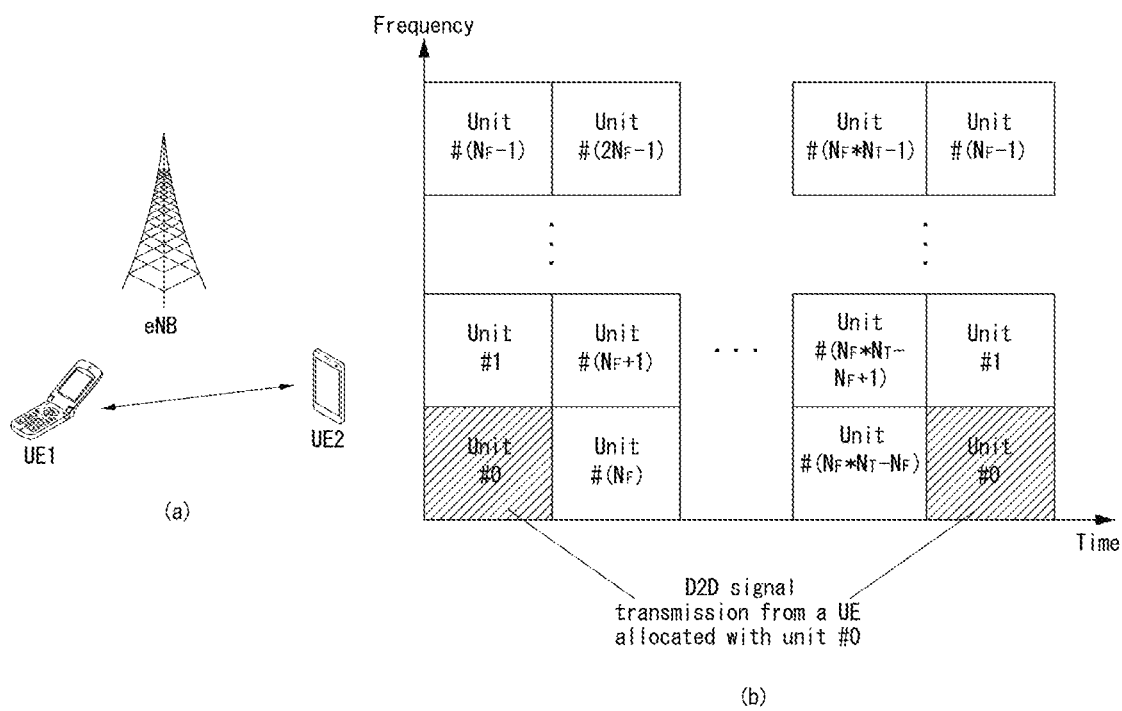
FIG. 19 is a diagram for illustrating elements for a device-to-device direct communication (D2D) scheme.

FIG. 19 is a diagram for illustrating elements for a device-to-device direct communication (D2D) scheme.

In FIG. 19(a), if a UE means the UE of a user, but network equipment, such as an eNB, transmits/receives a signal according to a communication method with the UE, the corresponding network equipment may also be considered to be a kind of UE. Hereinafter, a UE1 may operate to select a resource unit corresponding to a specific resource within a resource pool meaning an aggregation of a series of resources, and to transmit a D2D signal using the corresponding resource unit. A UE2, that is, a receiving UE for the UE1, receives a configuration for a resource pool in which the UE1 can transmit a signal, and detects the signal of the UE1 within the corresponding pool. In this case, the eNB may notify the UE1 of the resource pool if the UE1 is located in the connection range of the eNB or another UE may notify the UE1 of the resource pool if the UE1 is located in the connection range of the eNB or the resource pool may be determined as a predetermined resource. In general, the resource pool may include a plurality of resource units. Each UE may select one or a plurality of resource units and use it for its own D2D signal transmission.

FIG. 19(b) illustrates the configuration of resource units. All of frequency resources have been segmented in an N_F number, and all of time resources may be segmented in an N_T number to define a total of N_F*N_T resource units. In this case, a corresponding resource pool may be expressed to cyclically repeat an N_T subframe. Characteristically, one resource unit may appear periodically and repeatedly as shown in the drawing. Alternatively, in order to obtain a diversity effect in the time or frequency dimension, the index of a physical resource unit to which one logical resource unit is mapped may change in a predetermined pattern over time. In such a resource unit structure, a resource pool may mean a set of resource units that may be used by a UE that attempts to transmit a D2D signal for transmission.

The aforementioned resource pool may be subdivided into multiple types. First, the resource pool may be divided depending on the contents of a D2D signal transmitted in each resource pool. For example, the contents of the D2D signal may be divided as follows. A separate resource pool may be configured for each of the divided contents.

Scheduling assignment (SA): a signal including information, such as the location of a resource used for the transmission of a D2D data channel performed by each transmitting UE and a modulation and coding scheme (MCS) necessary for the demodulation of other data channels or a MIMO transmission method and/or timing advance. The signal may be multiplexed with D2D data on the same resource unit and transmitted. In this specification, a SA resource pool may mean a pool of resources in which SA is multiplexed with D2D data and transmitted, and may also be called a D2D control channel.

D2D data channel: a resource pool used for a transmitting UE to transmit user data using a designated resource through SA. If a D2D data channel can be multiplexed with D2D data and transmitted on the same resource unit, only a D2D data channel of a form other than SA information may be transmitted in a resource pool for the D2D data channel. In other words, a resource element used to transmit SA information on an individual resource unit within a SA resource pool may be used to transmit D2D data in the D2D data channel resource pool.

Discovery channel: a resource pool for a message which enables a transmitting UE to transmit information, such as its own ID, so that an adjacent UE can discover the transmitting UE.

On the contrary to the aforementioned case, although the contents of a D2D signal are the same, a different resource pool may be used depending on the transmission/reception attributes of a D2D signal. For example, the same D2D data channel or discovery message may be classified as a different resource pool depending on the transmission timing determination method of a D2D signal (e.g., whether it is transmitted at the reception timing of a synchronization reference signal or transmitted by applying specific timing advance at the corresponding timing) or a resource allocation method (e.g., whether an eNB designates the transmission resource of an individual signal for an individual transmitting UE or an individual transmitting UE selects an individual signal transmission resource), a signal format (e.g., the number of symbols occupied by each D2D signal in one subframe or the number of subframes used for the transmission of one D2D signal), signal intensity from an eNB, transmit power intensity of a D2D UE, etc.

In D2D communication, a method for an eNB to directly indicate a transmission resource of a D2D transmitting UE is denoted/defined as Mode 1, and a method in which a transmission resource region has been previously configured or an eNB designates a transmission resource region and a UE directly selects the transmission resource is denoted/defined as Mode 2. In the case of D2D discovery, a case where an eNB directly indicates a resource is denoted/defined as Type 2, and a case where a UE directly selects a transmission resource in a previously configured resource region or a resource region indicated by an eNB is denoted/defined as Type 1.

The aforementioned D2D may be called a sidelink. The SA may be called a physical sidelink control channel (PSCCH). The D2D synchronization signal may be called a sidelink synchronization signal (SSS). A control channel that transmits the most basic information prior to D2D communication may be called a physical sidelink broadcast channel (PSBCH) or a physical D2D synchronization channel (PD2DSCH) as another name. A signal for a specific UE to provide notification that it is located nearby may include the ID of the specific UE. Such a channel may be called a physical sidelink discovery channel (PSDCH).

In D2D of Rel. 12, only a D2D communication UE has transmitted a PSBCH along with an SSS, and thus the measurement of the SSS is performed using the DMRS of a PSBCH. An out-coverage UE measures the DMRS of a PSBCH, measures the reference signal received power (RSRP) of the signal, and determines whether it may become a synchronization source.

Quasi Co-located (QCL) Between Antenna Ports

A QCL relation is described. For example, regarding the relation between two antenna ports, if the large-scale property of a radio channel in which one symbol is forwarded through one antenna port can be inferred from a radio channel in which one symbol is forwarded through the other antenna port, the two antenna ports may be said to be a QCL relation (or QCL). In this case, the large-scale property includes one or more of delay spread, Doppler spread, a Doppler shift, an average gain and average delay.

That is, what the two antenna ports have a QCL relation means that the large-scale property of a radio channel from one antenna port is the same as the large-scale property of a radio channel from the other antenna port. If a plurality of antenna ports in which an RS is transmitted is taken into consideration, when antenna ports in which RSs of different two type are transmitted have a QCL relation, the large-scale property of a radio channel from one type of antenna port may be substituted with the large-scale property of a radio channel from the other type of antenna port.

According to the concept of the QCL, a UE cannot assume the same large-scale property between radio channels from corresponding antenna ports with respect to non-QCL antenna ports. That is, In this case, the UE must perform independent processing for each configured non-QCL antenna port with respect to timing acquisition and tracking, frequency offset estimation and compensation, and delay estimation and Doppler estimation.

There is an advantage in that a UE can perform the following operations between antenna ports capable of assuming QCL:

With respect to delay spread and Doppler spread, a UE may apply the power-delay profile, delay spread and a Doppler spectrum, and Doppler spread estimation results of a radio channel from any one antenna port to a Wiener filter used for the channel estimation of a radio channel from the other antenna port identically.

With respect to frequency shift and received timing, a UE may perform time and frequency synchronization on any one antenna port and then apply the same synchronization to the demodulation of the other antenna port.

With respect to average received power, a UE may average reference signal received power (RSRP) measurement for two or more antenna ports.

For example, if a DMRS antenna port for downlink data channel demodulation has been QCL with the CRS antenna port of a serving cell, a UE may identically apply the large-scale properties of a radio channel estimated from its own CRS antenna port upon channel estimation through a corresponding DMRS antenna port, thereby improving DMRS-based downlink data channel reception performance.

The reason for this is that a CRS can be acquired more stably from an estimated CRS regarding large-scale properties because it is a reference signal broadcasted with relatively high density every subframe and in a full band. In contrast, a DMRS is transmitted in a UE-specific manner with respect to a specific scheduled RB, the precoding matrix of a precoding resource block group (PRG) unit used for an eNB for transmission may be changed, and a valid channel received by a UE may be changed in a PRG unit. Although multiple PRGs have been scheduled, performance deterioration may occur if a DMRS is used for the large-scale property estimation of a radio channel in a wide band. Furthermore, the transmission cycle of a CSI-RS may be several~several tens of ms, and a CSI-RS has low density of 1 resource element per antenna port in average per resource block. Likewise, performance deterioration may occur if a CSI-RS is sued for the large-scale property estimation of a radio channel.

That is, a UE may use QCL assumption between antenna ports for the detection/reception of a downlink reference signal, channel estimation, and channel state reporting.

Multi-cell (or a Multi-transmission Point/Reception Point) Uplink/Downlink Data Transmission and Reception Method With respect to broadcast and/or multicast transmission in which a network transmits the same data to a plurality of UEs in the DL, broadcast and multicast may appear in a form in which one cell transmits data using an RS and format of a form similar to those of the existing unicast transmission or may appear in a form in which a plurality of cells transmits the same data using a separate RS and format (in particular, an RS and format in which signals from a plurality of cells are configured to be properly combined) different from unicast. The former may be called a single cell point-to-multipoint (SC-PTM), and the latter may be called a multicast and broadcast in single frequency network (MBSFN).

Multicast/broadcast is effective in rapidly forwarding data occurring at a specific location to multiple UEs around the corresponding location.

For example, a UE installed on a vehicle may notify a nearby UE installed on a vehicle of data including a series of related information (e.g., data providing notification that it has failed). Such data does not need to be forwarded to a UE distant from the UE that has generated the corresponding data, whereas it needs to be forwarded to many UEs within a specific area. Accordingly, it is preferred that cells belonging to a corresponding area broadcast/multicast the corresponding data.

In particular, in the case of data providing notification of the state of the aforementioned vehicle, it may be difficult for a network to confirm the accurate location of each UE because a vehicle moves at a high speed. In particular, in order to avoid frequent handover attributable to a high-speed movement, the UE of a vehicle not requiring communication with a network separately may participate in corresponding data transmission/reception in the RRC_Idle state. In this case, since RRM reporting from the UE of the vehicle is not received, it is further difficult for the network to confirm the location of the corresponding UE.

Meanwhile, a UE belonging to the reception area of one data may be distributed and located in a plurality of cells. This corresponds to a case where a transmitting UE is located in a cell edge or data is information (e.g., urgent information providing notification of the occurrence of a collision accident) that needs to be forwarded to UEs of a very wide area.

Figure 20:
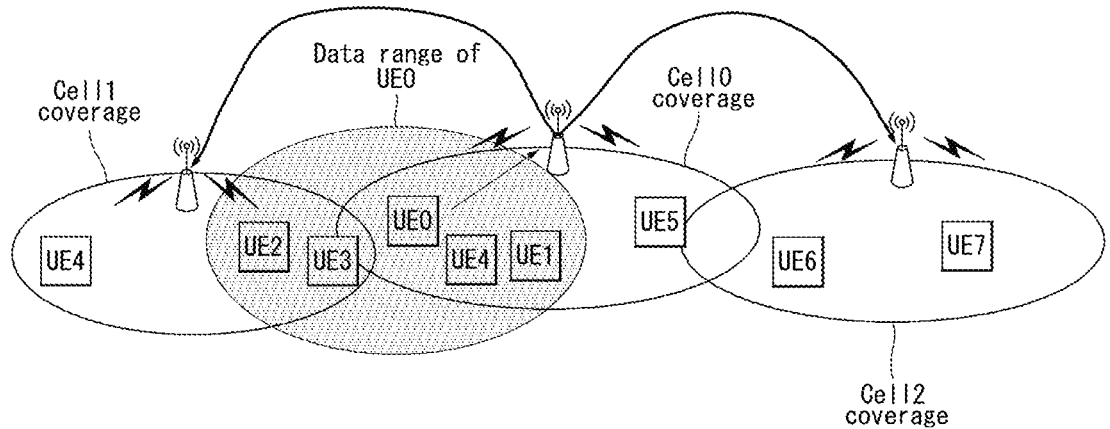
FIG. 20 is a diagram illustrating a multicast/broadcast transmission method according to an embodiment of the present invention.

FIG. 20 is a diagram illustrating a multicast/broadcast transmission method according to an embodiment of the present invention.

FIG. 20 illustrates a situation in which a UE0 belonging to the coverage of a cell 0 has data and the data is transmitted to adjacent UEs (UE1 to UE4).

The UE0 first transmits the eNB of a cell 0, that is, an eNB closest to the UE0. A network that has received the data is aware of the fact that the UE0 is located the coverage the cell 0 and may not be aware of an accurate location therein. In such a case, the network may perform broadcast/multicast transmission in a cell belonging to a sufficient wide area so that the range of the UE0 data can always be included by taking a more conservative operation.

In FIG. 20, a cell 1 and cell 2 neighboring the cell 0 may participate in broadcast/multicast transmission. Accordingly, all of UEs within the data range of the UE0 may receive broadcast/multicast transmission in which an eNB closest to the UEs participate.

Of course, a UE belonging to the same cell as a UE belonging to the data range of the UE0 and not belonging to the data range of the UE0 like the UE4 may be present. As in the cell 2 to which a UE6 and a UE7 belong, although the entire area does not overlap the data range of the UE0, a UE may have to participate in broadcast/multicast.

In order to effectively perform the aforementioned operation, to properly configure the cluster of each data is important.

In this case, the cluster means a set of cells (or an eNB(s) serving a corresponding cell) participating in the multicast/broadcast of specific data. eNBs belonging to one cluster may be synchronized and perform MBSFN transmission that transmits the same signal in the same resource, but may transmit the same data as different signals in different resources in an SC-PTM form.

If the size of a cluster is too small, a situation in which a UE belonging to a data range goes out of the cluster may occur. In particular, if data must be forwarded with a high level of reliability, the cluster of each data may have to sufficiently include a UE belonging to the range of each data.

In contrast, if the size of a cluster is too large, the resources of a network are wasted. Accordingly, the cluster of each data needs to be set in a proper level.

In a situation in which the data of one cell is transmitted in a cluster including a plurality of cells, if data generated from all of cells has respective clusters, as a result, a situation in which the clusters overlap and one cell belongs to a plurality of clusters occurs. This means that even the same cell may belong to a different cluster depending on the type of transmitted data, in particular, a cell in which transmitted data is generated. This is described with reference to a drawing below.

Figure 21:
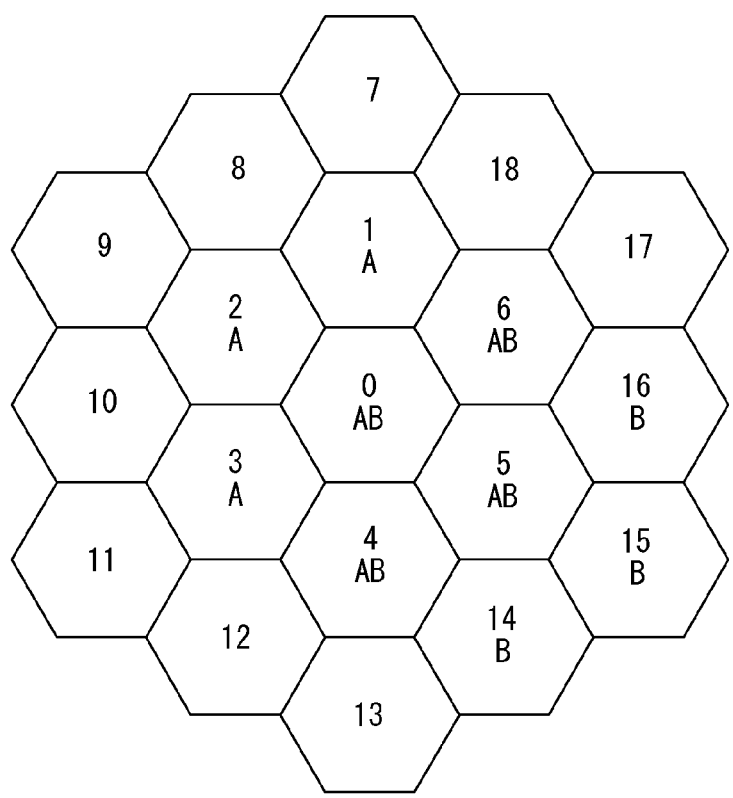
FIG. 21 is a diagram for illustrating a cluster according to an embodiment of the present invention.

FIG. 21 is a diagram for illustrating a cluster according to an embodiment of the present invention.

As in FIG. 21, it may be assumed that a cluster configured for data generated from one cell is a set of the corresponding cell and 6 neighboring cells surrounding the corresponding cell.

In this case, data generated from a cell 0 may be transmitted in a cluster including cells 0, 1, 2, 3, 4, 5 and 6, that is, cells marked by A. Data generated from the cell 5 may be transmitted in a cluster including cells 5, 6, 0, 4, 14, 15, 16, that is, cells marked by B. Accordingly, the cells 0, 4, 5 and 6 may be included in the cluster that transmits the data of the cell 0 and the cluster that transmits the data of the cell 5.

Meanwhile, a cluster size of a proper level may be determined by the size of the range of each data. Data having relatively narrow area is sufficient as a small cluster, whereas data having a wide area may require a cluster of a large size. This means that although the cluster of the same UE needs to be different depending on the type and area of data although the data is generated at the same location.

Meanwhile, in the 3GPP standard, the following QCL type A or QCL type B have been defined. In the transmission mode 10 (TM10), one of the two QCL type A and QCL type B may be configured for a UE by RRC signaling:

Antenna port(s) quasi co-location (QCL) for a PDSCH is described.

A UE in which the transmission modes 8-10 have been configured with respect to a serving cell may assume that the antenna ports 7-14 of the serving cell are quasi co-located (QCL) for a given subframe in relation to delay spread, Doppler spread, a Doppler shift, an average gain and average delay.

A UE in which the transmission modes 1-9 have been configured with respect to a serving cell may assume that the antenna ports 0-3, 5 and 7-22 of the serving cell are quasi co-located (QCL) in relation to a Doppler shift, Doppler spread, average delay and delay spread.

One of the two QCL types for the serving cell is configured by an upper layer parameter 'qcl-Operation' in a UE in which the transmission mode 10 has been configured with respect to a serving cell in order to decode a PDSCH based on a transmission scheme associated with the antenna ports 7-14:

Type A: a UE may assume that the antenna ports 0-3 and 7-22 of a serving cell is quasi co-located (QCL) in relation to delay spread, Doppler spread, a Doppler shift and average delay.

Type B: a UE may assume that the antenna ports 15-22 corresponding to a CSI resource configuration identified by an upper layer parameter 'qcl-CSI-RS-ConfigNZPId-r11' and the antenna ports 7-14 corresponding to a PDSCH are quasi co-located (QCL) in relation to a Doppler shift, Doppler spread, average delay, and delay spread.

The present invention takes into consideration a wireless communication environment in which vehicle-to-everything communication (V2X) is performed using a radio channel. V2X includes communication between a vehicle and all of entities, such as vehicle-to-vehicle (V2V) denoting communication between vehicles, vehicle to infrastructure (V2I) denoting communication between a vehicle and a stationary UE or a road side unit (RSU) implemented within an eNB, and vehicle-to-pedestrian (V2P) denoting communication between a vehicle and a UE owned by a person (pedestrian, bicycle rider, vehicle driver or passenger). In this case, the present invention is not necessarily limited to a UE performing V2X and may be identically applied to a common UE.

Figure 22:
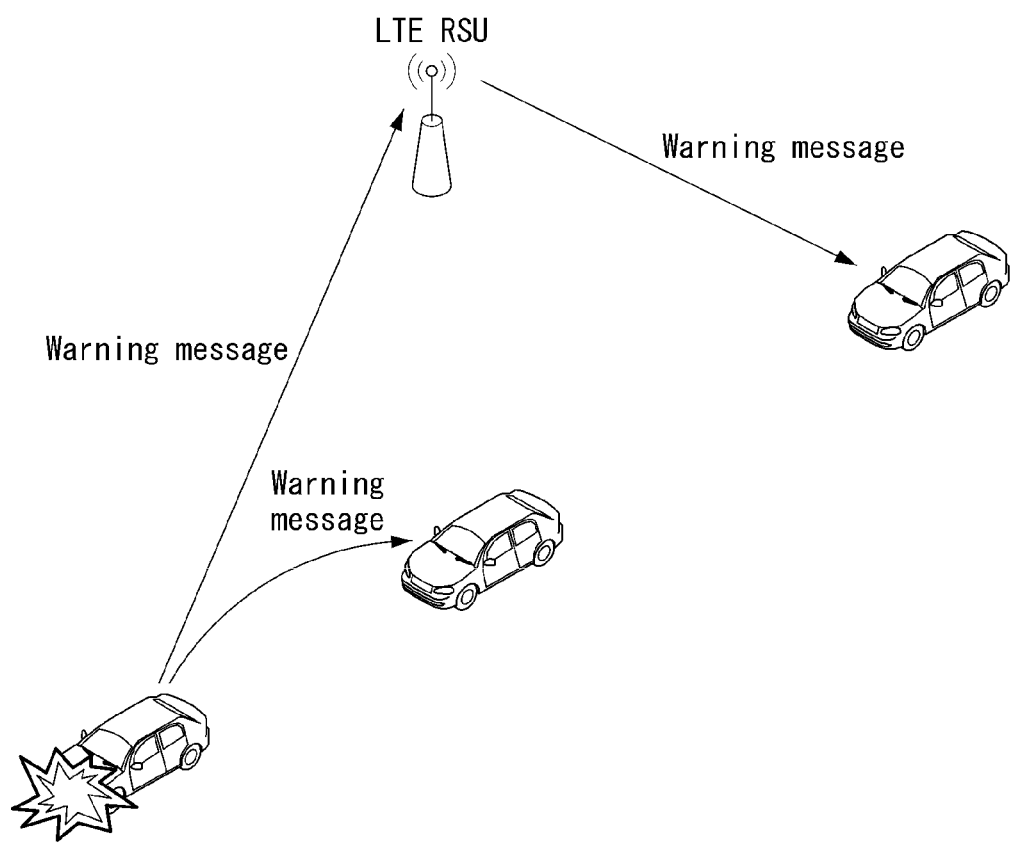
FIG. 22 is a diagram illustrating V2V communication and V2I communication in a wireless communication system to which the present invention may be applied.

FIG. 22 is a diagram illustrating V2V communication and V2I communication in a wireless communication system to which the present invention may be applied.

Referring to FIG. 22, a V2X message (e.g., a cooperative awareness message (CAM)/decentralized environmental notification message (DENM)) may be transmitted/received between vehicles through direct communication. Furthermore, communication may be performed through an infrastructure network, such as an RSU.

The storage of soft channel bits is described.

In FDD, TDD and FDD-TDD, when one or more serving cells are configured in a UE or a small cell group (SCG) is configured in a UE, when the decoding of code block of one transport block fails with respect to at least $K\_MIMO \cdot min(M\_DL\_HARQ, M\_limit)$ transport block for each serving cell, a UE stores a received soft channel bit (i.e., n_SB) corresponding to the range of at least w_k, w_k+1, ..., w_mod(k+n_SB−1,N_cb). In this case, n_SB is given as in Equation 6.

$$n_{SB} = \min\left(N_{cb}, \left\lfloor \frac{N'_{soft}}{C \cdot N_{cells}^{DL} \cdot K_{MIMO} \cdot \min(M_{DL\_HARQ}, M_{limit})} \right\rfloor\right)$$ [Equation 6]

In this case, C is the number of code blocks.

N_cb is min(floor(N_IR/C),K_w) in the case of a DL-SCH and PCH transport channel, and is K_w in the case of an UL-SCH, a multicast channel (MCH), a sidelink shared channel (SL-SCH) and a sidelink discovery channel (SL-DCH) transport channel. In this case, N_IR is a soft buffer size for a transport block. K_w is the length of a cyclic buffer and is K_w=3 k_Π.

K_MIMO is 2 if a UE is configured to receive PDSCH transmission based on the mode 3, 4, 8, 9 or 10 and is 1 if not.

M_limit is a constant and is 8.

M_DL_HARQ is a maximum number of DL HARQ processes.

If an SCG is configured in a UE, N^DL_cells are the number of serving cells configured over a master cell group (MCG) and SCG. If not, N^DL_cells are the number of configured serving cells.

When a UE signals 'ue-CategoryDL-r12', N'_soft is a total number of soft channel bits according to a UE category indicated by 'ue-CategoryDL-r12'. If a UE signals 'ue-Category-v1170' not 'ue-CategoryDL-r12', N'_soft is a total number of soft channel bits according to a UE category indicated by 'ue-Category-v1170'. If not, a UE signals 'ue-Category-v1020' not 'ue-Category-v1170' and 'ue-CategoryDL-r12', N'_soft is a total number of soft channel bits according to a UE category indicated by 'ue-Category-v1020'. If not, N'_soft is a total number of soft bits according to a UE category indicated by 'ue-Category' (without a suffix).

In determining k, a UE assigns priority to the storage of a soft channel bit corresponding to a low value of k. w_k corresponds to a received soft channel bit. The range of w_k, w_k+1, ..., w_mod(k+n_SB−1,N_cb) may include a subset not including a received soft channel bit.

The present invention proposes a communication technology for a next-generation communication system that high reliability and low latency, such as V2X.

For example, a block error rate (BLER) commonly taken into consideration in a conventional communication system has an object of 10^-2, whereas a next-generation communication system has an object of BLER<<10^-2, for example, BLER of 10^-5 and thus requires very high reliability. As a representative example, a case where the V2X service evolves into autonomous vehicle service may be taken into consideration. Furthermore, such a service requires very low latency and the successful transmission/reception of data/signal must be able to be completed within a short time.

First, as a simple method, in order to satisfy high reliability, the application of robust transmission by applying multiple repeated transmission (e.g., using repeated transmission or repetition coding) or a high cording rate may be taken into consideration. In this case, the multiple repeated transmission may follow a method for a transmitter (or sender) to receive ACK/NACK feedback from a receiver (or recipient) with respect to each transmission and to determine a repeated transmission number. As a result, such methods may be considered to be methods operating in a form that consumes time-domain transmission resources until successful reception in a receiver is completed. In other words, in order to satisfy a relatively low target BLER (e.g., 10^-5) in a next-generation communication compared to a conventional transmission type for satisfying a relatively high target BLER (e.g., 10^-2), the target may be achieved by consuming relatively greater time-domain transmission resources by applying the above methods. In this case, such a method has a disadvantage in that performance is greatly deteriorated in the latency aspect because the time when successful reception is completed becomes late compared to a conventional technology.

Accordingly, the present invention proposes a scheme in which performance is not deteriorated even in the latency aspect (or performance can be further improved even in the latency aspect) by overcoming such a disadvantage.

As a representative scheme, the aforementioned repeated transmission form may be applied for each frequency-domain (e.g., a method of transmitting the same data for each specific RB (or RB group) unit) not the time-domain.

Furthermore, there is proposed a method capable of applying the transmission of the same data from an initial transmission step using multiple carriers by extending and applying the aforementioned repeated transmission form to a multi-carrier domain.

Furthermore, in this case, the application to multiple carriers may also be generalized, extended and applied to an application to the same carrier, but multi-transmission point (TP) or reception points (RP) (e.g., distributed antenna system) as another application. That is, the same downlink data may be transmitted from multiple TPs to a receiver, and may be transmitted from a receiver to the same uplink data multi-RP.

A transmission point/reception point described in this specification may be used as a general term, including an access network node, a base station (e.g., an eNB), a remote radio head (RRH) and a relay.

Furthermore, the mixture of methods using such a frequency domain resource and a specific spatial domain resource may be applied.

In this case, there are advantages in that reliability can be improved due to a macro diversity effect by applying the repeated transmission form using multiple communication paths from geographically distant multiple TPs or RPs and low latency can be achieved by applying the repeated transmission form from an initial transmission step.

Furthermore, in the case of a spatial domain resource, in the case of the point of the same location like the same TP/RP, the present invention may be applied to a case where virtual resources/TPs/RPs/cells are divided due to virtual sectorization by applying specific beamforming.

Furthermore, the present invention may be applied in a form in which virtual resources/TPs/RPs/cells are divided by applying specific coding to a transmission sequence.

In summary, resources, that is, the subject of the repeated transmission (i.e., resources in which the same data is transmitted), may be defined or configured in a form in which one or one or more of time/frequency/space/code domains have been combined.

Hereinafter, for convenience of description, a method proposed by the present invention is described by taking some specific resource domains of the time/frequency/space/code domain as examples, but the present invention may be generalized and applied to a specific resource region.

Hereinafter, for convenience of description, a resource unit in which downlink data is transmitted (e.g., a resource unit in which repeated transmission (i.e., same data transmission) is performed) may be assumed to be a cell1, a cell2, a cell3 and so on. In this case, each cell may correspond to each component carrier (CC). In this case, each CC (or some CCs) may belong to different carriers or the same carrier. Furthermore, each cell may correspond to a TP/RP. That is, if different cells are used in different TPs, in the following description of the present invention, a 'cell' may be interpreted as the 'TP/RP of the corresponding cell'. In this case, each TP may be connected through ideal backhaul or non-ideal backhaul in a specific level or less.

Furthermore, in the following description of the present invention, for convenience of description, a case where uplink/downlink data transmitted/received in cells is the same data (packet) is basically described, but the present invention is not limited thereto. The present invention may be applied to a case where uplink/downlink data transmitted/received in cells is different data (packet).

For example, as will be described later, an operation of transmitting/receiving the same uplink/downlink data within multiple resources/cells or between multiple TPs/RPs and a UE may be configured through control signaling. In other words, if an operation of transmitting/receiving the same uplink/downlink data within multiple resources/cells or between multiple TPs/RPs and a UE is not configured by control signaling, different uplink/downlink data may be transmitted/received independently within each resource/cell or between each TP/RP and a UE.

1. Uplink (UL)-related Operation

First, from the UL transmission viewpoint of a UE, in a conventional communication system, if a message (or data) generated from an upper layer and to be transmitted is transmitted through one specific cell1, the corresponding data (or packet, for example, a PUSCH, a transport block (TB)) is not transmitted through another cell2. In this case, if a receiver does not successfully receive the corresponding data (packet), retransmission is accompanied by an HARQ procedure with respect to the cell1. An operation of transmitting the corresponding data (packet) through the cell1 until the successful reception of the corresponding data (packet) by the receiver is completed.

However, in a new operation proposed in the present invention, a message (data) (e.g., TB) generated from an upper layer and to be transmitted to a receiver is not transmitted through only a specific cell, but may be transmitted through multiple specific cells. In other words, a UE may transmit the same uplink data to multiple cells (or RPs).

Furthermore, a message (data) (e.g., TB) generated from an upper layer and to be transmitted may be (duplicated) transmitted through multiple specific cells from an initial transmission step.

Accordingly, there is an advantage in that reliable communication can be performed because a UE can establish multiple connectivity with multiple cells in order to transmit the same data (or the data of the same object) as a specific service (e.g., V2X) of the same type and can transmit the same data (or the data of the same object) (or selectively transmit the data of the same object from among multiple cells) with respect to two or more cells. That is, the operation proposed in the present invention may be applied to only a limited condition, such as a specific service (e.g., V2X). In other cases, the operation may be selectively applied along with a different operation for each service so that a transmission/reception operation based on a conventional configuration is performed.

More characteristically, an identity, such as a separate "packet identifier (packet ID)", may be assigned for each data (packet) for such an operation.

In this case, packet IDs that may be construed according to a first layer (L, physical layer), a second layer (L2, data link layer) and/or a third layer (L3, network layer) with respect to corresponding data (packets) transmitted in two or more cells may be configured/indicated.

1.1. ACK/NACK Procedure

An ACK message to confirm successful reception for at least one cell may be successfully received by a corresponding UE or the successful transmission completion of a corresponding packet may be confirmed by a UE according to other different method. In this case, the UE may terminated/cancel all of additional retransmission operations with respect to other cells transmitted in association with a corresponding packet ID. Furthermore, the UE may perform an operation of initializing an (HARQ) process so that another initial transmission having a new packet ID is initiated.

In this case, the ACK message may operate in such a manner that the message is individually transmitted over the air in each cell. For example, the ACK message may be transmitted in an individual PHICH form or another transmission format may be used. That is, to this end, a sender (e.g., UE) that has transmitted data (packet) to multiple cells may expect the individual reception of a corresponding ACK/NACK message from each cell over the air. Accordingly, an operation for a sender (e.g., UE) to perform the monitoring of an individual ACK/NACK message with respect to each cell may be defined or configured.

A resource in which such an ACK/NACK message is transmitted may be allocated to an integrated specific resource. In this case, an individual ACK/NACK message for each cell may be generated by a receiver, may be mapped to a specific location of the corresponding allocated resource within each cell, and may be transmitted. There is an advantage in that transmission latency of a corresponding ACK/NACK message can be minimized through such a process. In particular, transmission latency can be minimized if a UE receives ACK/NACK/DTX from each cell compared to a method of transmitting ACK/NACK messages for respective cells at once through a specific cell by forwarding the ACK/NACK messages to the specific cell.

An operation of a UE when the UE receives ACK/NACK/ discontinuous transmission (DTX) from each cell is described:

When ACK is received from at least one cell, the retransmission of corresponding data (packet) may be terminated/cancelled with respect to all of cells as described above. Furthermore, an operation of initializing an (HARQ) process may be defined or configured so that the initial transmission of another data (packet) having a packet ID is initialized.

To this end, an operation may be defined or configured, which enables a UE to transmit (over the air to an individual cell) notification that initializes (e.g., requests the transmission of an UL grant by toggling a new data indicator (NDI) when a next UL grant is transmitted) to other cells (e.g., target cells to which the UE have first transmitted packet) other than a cell that has transmitted the ACK (and successfully received by the UE) without requesting the retransmission of a packet ID (e.g., it may be the ID of an upper layer (e.g., RLC layer)) and/or an HARQ ID because the UE has received ACK from at least one cell.

As a result, in such an operation process, each corresponding cell may provide a first UL grant to a corresponding UE individually/independently. Alternatively, a specific representative cell(s) may provide the UL grant.

In this case, if the UL grant is transmitted in a plurality of cells, additional restriction may be set so that all HARQ IDs indicated by the UL grant are the same. Alternatively, a UE may be notified in such a manner that a physical layer HARQ ID is independent, but all of the specific packet IDs of an upper layer indicate the same data packet. Furthermore, in this case, the UL grant may indicate that an NDI is initial transmission in a toggled state. Accordingly, the UE may perform (individual) uplink transmission with respect to corresponding cells.

In this case, as described above, a subsequent UL grant (provided for each cell) may correspond to an UL grant that enables a UE to trigger retransmission or may correspond to an UL grant that schedules new data transmission, such as that an NDI is toggled, depending on the feedback of ACK/NACK transmitted from individual cells.

In this case, a situation in which the retransmission of a UE may be indicated through a subsequent UL grant may occur because a specific cell that has not transmitted the ACK is unaware that the uplink data of the UE has been successfully transmitted through another cell (i.e., the UE receives the ACK within another cell. Accordingly, in order to prevent this, a specific transmission method or condition may be defined/configured so that the UE can transmit signaling that provides notification that it has separately received the ACK from another cell. And/or if an UL grant indicative of such retransmission is subsequently received within any one cell, an operation for a UE to provide notification of related information about the state in which the UE has already received ACK from other cell with respect to the corresponding packet (along with the retransmission of uplink data) may be defined or configured. In this case, a corresponding cell that has received the related information may schedule a new data packet not retransmission in a subsequent UL grant although NACK has occurred in the corresponding cell.

Alternatively, for higher reliability communication, an operation of initializing an (HARQ) process so that a UE terminates/cancels all of retransmission regarding corresponding data (packets) as described above only when it successfully receives ACK from target cells that have transmitted the corresponding uplink data (packets) and another initial transmission regarding data (packet) having a new packet ID is initiated may be defined or configured.

Alternatively, for higher reliability communication, an operation for a UE to not terminate/cancel retransmission regarding corresponding data (packet) (although it has received ACK from another cell) when it receives the ACK from at least one cell and to (continuously) perform the retransmission regarding corresponding data (packet) to a corresponding target cell if the retransmission is required may be defined or configured.

In this case, more specifically, a UE may be configured to (continuously) perform retransmission to all of target cells to which the UE first transmitted a corresponding packet when NACK is received from at least one cell. As a result, an operation of performing the retransmission of previous uplink data (packet) to a cell that has transmitted ACK (with respect to a subsequent UL grant (with a toggled NDI) of a corresponding cell) without transmitting new uplink data when data is subsequently transmitted may be defined or configured.

Alternatively, an operation for a UE to transmit new data (packet) to a cell to which a corresponding UL grant (with a toggled NDI) has been transmitted according to UL grant indication, but to (also) transmit a request/notification message that requests the scheduling of the retransmission of corresponding data (packet) in a subsequent UL grant because NACK has occurred in a cell having a different previous specific data (packet) may be defined or configured.

Alternatively, more specifically, a UE may be configured to (continuously) perform retransmission on cells that have transmitted corresponding NACK (only if NACK is successfully received from the corresponding cells) when NACK is received from at least one cell. In this case, an operation for the UE to transmit new data (packet) based on the indication of an UL grant in a corresponding cell if the UL grant (with a toggled NDI) has been received from other cells that have perform NACK transmission, but to (also) transmit a request/notification message that requests the scheduling of the retransmission of corresponding data (packet) in a subsequent UL grant because NACK has occurred in a cell having a different previous specific data (packet) may be defined or configured.

And/or when each cell transmits ACK/NACK/DTX, the ACK/NACK/DTX itself is transmitted within each cell, but when a corresponding ACK/NACK/DTX message is generated and transmitted, the following specific restriction may be set (i.e., a UE expects ACK/NACK/DTX reception under the following restriction):

- When at least one cell receives uplink data (packet) successfully transmitted by a UE, each cell may transmit ACK (e.g., although a specific cell has generated NACK, all of cells transmit ACK if at least one cell is ACK).
- Alternatively, for more reliable communication, when at least M (e.g., M>1) cell receives uplink data (packet) successfully transmitted by a UE, each cell may transmit ACK (e.g., although a specific cell has generated NACK, all of cells transmit ACK if at least M cell is ACK).
- Alternatively, for more reliable communication, each cell may transmit ACK only when all of corresponding cells receive uplink data (packet) successfully transmitted by a UE.

1.2. UL Scheduling

In an upper layer viewpoint, in a conventional technology, the transmission of uplink data was initiated as data scheduling is performed on a specific cell in a specific data packet unit (e.g., a transport block (TB)) generated by an upper layer. In contrast, in the present invention, a one-to-many packet path may be formed so that data scheduling is performed on the same data packet unit (e.g., TB) generated by an upper layer through two or more cells.

For example, the same TB may be forwarded from an upper layer to a lower layer so that a specific data packet is transmitted fully (initially) within a cell1, a cell2, and a cell3 and thus fully transmitted in the cell1, cell2 and cell3. In this case, in a physical layer, the following method may be applied using a method of scheduling them:

1) Method According to Dynamic (i.e., L1) Scheduling Grant

Method 1) Self-scheduling for Each Cell

In accordance with the method, individual scheduling grants may be transmitted to the cell 1, cell2 and cell3, respectively, through a specific control channel (e.g., a PDCCH or an enhanced PDCCH (EPDCCH). A transmitter (i.e., UE) may detect the grants and transmit data for a scheduling grant whose detection is successful.

Such a control channel may be a control channel in which a cross-carrier scheduling grant is transmitted by a carrier indicator field (CIF) if a carrier aggregation (CA) has been configured in a corresponding UE.

For example, a case where a UE has successfully received scheduling grants within respective cells because reception quality of a control channel associated with the cell1 and a control channel associated with the cell3 is excellent, but does not receive a scheduling grant from a control channel associated with the cell2 due to reception quality may occur. In this case, the UE may transmit corresponding data through the cell1 and the cell3.

In this case, a configuration/indication may be performed so that the transmitter (i.e., UE) can be aware that the same data packet must be practically transmitted through the cell1 and the cell3.

In this case, the same data packet may be the fully same data packet or may be a data packet in which different redundancy versions (RVs) are divided and transmitted after channel coding is applied on the same information message. In this case, an RV that may be applied to a transport block (or DL-SCH) is signaled to a UE within a DCI. Furthermore, the RV provides notification of a puncturing pattern applied to a channel-coded transport block to be transmitted within a resource block allocated to the UE.

Such a transmission type may be previously configured in the transmitter regardless of the same data packet of any form.

For the above operation, the individual scheduling grant may include specific implicit or explicit indication capable of identifying that the same data is at the same time scheduled from multiple cells for such an object.

In other words, if such implicit or explicit indication is not included in the individual scheduling grant, the transmitter does not transmit the same data from the multiple cells, and may transmit different data within the multiple cells.

For example, scheduling grants transmitted by such multiple cells, respectively, are masked with a specific separate RNTI and transmitted. Accordingly, the UE may recognize that the same data packet has been scheduled with respect to all of scheduling grant(s) for different cells detected in the same occasion/subframe (or within a specific time interval).

And/or a separate identifier (ID) (e.g., it may correspond to the aforementioned specific "packet ID") having a property similar to that of a conventional HARQ process identifier (ID) is included in a specific field within a corresponding scheduling grant and transmitted so that the UE can recognize that the same data is transmitted when a scheduling grant including the same packet ID is detected in a different cell.

Alternatively, a UE may recognize whether the same data packet is scheduled by a scheduling grant in a different cell while (together) operating in conjunction with the existing HARQ process ID. In this case, this operation may be applied to only a scheduling grant masked with a specific separate RNTI.

Method 2) a Scheduling Grant Using One Cell in Order to Schedule Data Transmission Through a Multi-Cell What a scheduling grant for scheduling data transmission through a multi-cell is transmitted by a specific one pre-defined (or pre-indicated) cell may be previously defined or configured. For example, the scheduling grant may be defined in a primary cell (PCell) (or pre-defined/configured cell) in a CA system or may be defined/configured in a serving cell in a CoMP viewpoint.

In this case, the detailed operation proposed in the aforementioned method 1) may be partially applied. For example, a scheduling grant for scheduling data transmission through a multi-cell may be masked with a specific separately-defined RNTI.

When such a scheduling grant is detected from a corresponding cell, information about a set of cell(s) in which the same data is transmitted may be indicated through a specific field within the scheduling grant.

That is, assuming that 4 cells of a cell1, cell2, and cell3 and cell4 have been configured in a corresponding receiver (i.e., if a connection has been established), if a field is 2 bits, for example, the following four types of different cell(s) sets may be indicated by bit values. In this case, information about the cell(s) set may be configured previously (e.g., through RRC signaling):

'00': {cell1}
'01': {cell1, cell2}
'10': {cell2, cell3, cell4}
'11': {cell1, cell2, and cell3, cell4}

That is, for example, when a receiver receives a scheduling grant in which '01' is indicated, a transmitter may transmit the same data within the cell1 and cell2.

In this case, such an operation corresponds to scheduling for multiple cells by a single scheduling grant. Which resource is used for uplink data transmission for each cell may be individually configured or reserved in advance. Alternatively, resource allocation information indicated by a scheduling grant may be applied in common. Furthermore, even in other pieces of information within a corresponding scheduling grant, such as other MCS, some of the pieces of information may be individually configured in advance for each cell or information indicative in a scheduling grant may be applied in common.

Method 3) a Scheduling Grant Using a Multi-Cell in Order to Schedule Data Transmission Through the Multi-Cell This is the same as the aforementioned method 2). In this case, the same contents of a scheduling grant (i.e., duplicated) may be transmitted through multiple cells in addition to only one cell that transmits a corresponding scheduling grant and that has been determined in advance.

Accordingly, there is an advantage in that an operation for a transmitter to transmit the same data through multiple cells when it successfully receives a corresponding scheduling grant from at least one control channel because channel quality of the control channels associated with respective cells is different is successfully applied.

2) Method According to Semi-Persistent Scheduling (SPS)

A transmitter may periodically transmit a corresponding data packet within a multi-cell based on an SPS configuration resource previously configured by high layer signaling (e.g., RRC signaling) without following a dynamic (i.e., L1) scheduling grant with respect to at least one of the above-proposed method1) to method3).

That is, the transmitter may be configured to always transmit the same data packet through a specific resource region in a corresponding predetermined cycle within the cell1, cell2 and cell3 as in the example according to an SPS configuration. In this case, the transmitter may transmit the corresponding transmission data packet within the cell1, cell2 and cell3 in the corresponding cycle.

3) Additionally Proposed Method

An operation for a transmitter to selectively initiate transmission with respect to only a specific cell(s) (e.g., having channel quality of a specific level or more (this value itself may be separately set)) according to a specific condition predefined or set from among the cells if the specific cell(s) to be transmitted has been determined with respect to at least one of the above-proposed methods (e.g., by a dynamic L1 grant or SPS) may be additionally defined or configured.

In the above-proposed methods, in the case of an environment in which timing (e.g., time synchronization) between multiple cells is synchronized in a specific level or more, transmission may be initiated along with almost the same timing in the repeated transmission form (i.e., the same data transmission) from an initial transmission step as in the above descriptions.

However, the present invention is not limited to be applied to only an environment in which multiple cells have been synchronized as described above, and may be efficiently applied/utilized even in an environment in which multiple cells are not synchronized in a specific level or less. For example, the environment in which multiple cells are not synchronized may mean an environment in which subframe/slot edges are not aligned or a subframe/slot offset is present and/or an asynchronous network environment.

For example, the repeated transmission (i.e., the same packet transmission) from a specific cell2 may be performed on a packet, transmitted to a specific cell1 in a subframe (SF) #n, in an SF #n+a before HARQ-ACK transmitted by an eNB in an SF #n+k is received by a UE, and the UE may be defined/configured to receive it.

In other words, it may be construed as a form in which a transmitter does not transmit a new transport block (TB) in the SF #n+a, but transmits a specific data packet (e.g., tB1) transmitted in the SF #n again.

Such an operation may be identified by the aforementioned specific "packet ID" and may also be identified by the aforementioned specific implicit indication (e.g., a scheduling grant is masked with a specific RNTI). Alternatively, an operation for a UE to autonomously determine and perform repeated transmission may be defined or configured.

If such an operation occurs in the same carrier (e.g., distributed antenna system), this may be construed as being an operation of dynamically applying TTI bundling characteristically. For example, such an operation may be intentionally scheduled by a transmitter depending on the condition of traffic different for each cell or the above operation may occur or may be applied depending on various situations, such as an asynchronous environment or when there is a difference in timing advance (TA) for each cell and/or if an (individual) UL grant occasion from each cell is different (for the flexible utilization of a control channel resource).

In the case of an environment in which the cells correspond to different RPs, such as a distributed antenna system, such different RPs may be indicated by different specific QCL assumptions with respect to a UE.

That is, a definition or configuration may be performed so that the reception of UL data in each RP is performed based on a radio channel obtained by applying a specific QCL assumption to a specific RS (e.g., a sounding reference signal (SRS) or a scheduled PUSCH DMRS) being transmitted by a UE. In other words, QCL may be assumed between an antenna port for uplink data transmitted in a specific first RP and an antenna port for a specific reference signal transmitted by a UE. Likewise, QCL may be assumed between an antenna port for uplink data transmitted in another second RP and an antenna port for a specific reference signal transmitted by a UE.

For example, an operation for a UE to transmit uplink data to an RP1 in an SF #n (e.g., based on a specific RS related to the corresponding RP1 (e.g., an SRS or a scheduled PUSCH DMRS) and QCL) (e.g., it may be incorporated into transmission power control (TPC) or TA) and to transmit uplink data to an RP2 in an SF #n+1 (e.g., based on a specific RS related to the corresponding RP1 (e.g., an SRS or a scheduled PUSCH DMRS) and QCL) (e.g., it may be incorporated into TPC or TA) may be defined or configured.

Figure 23:
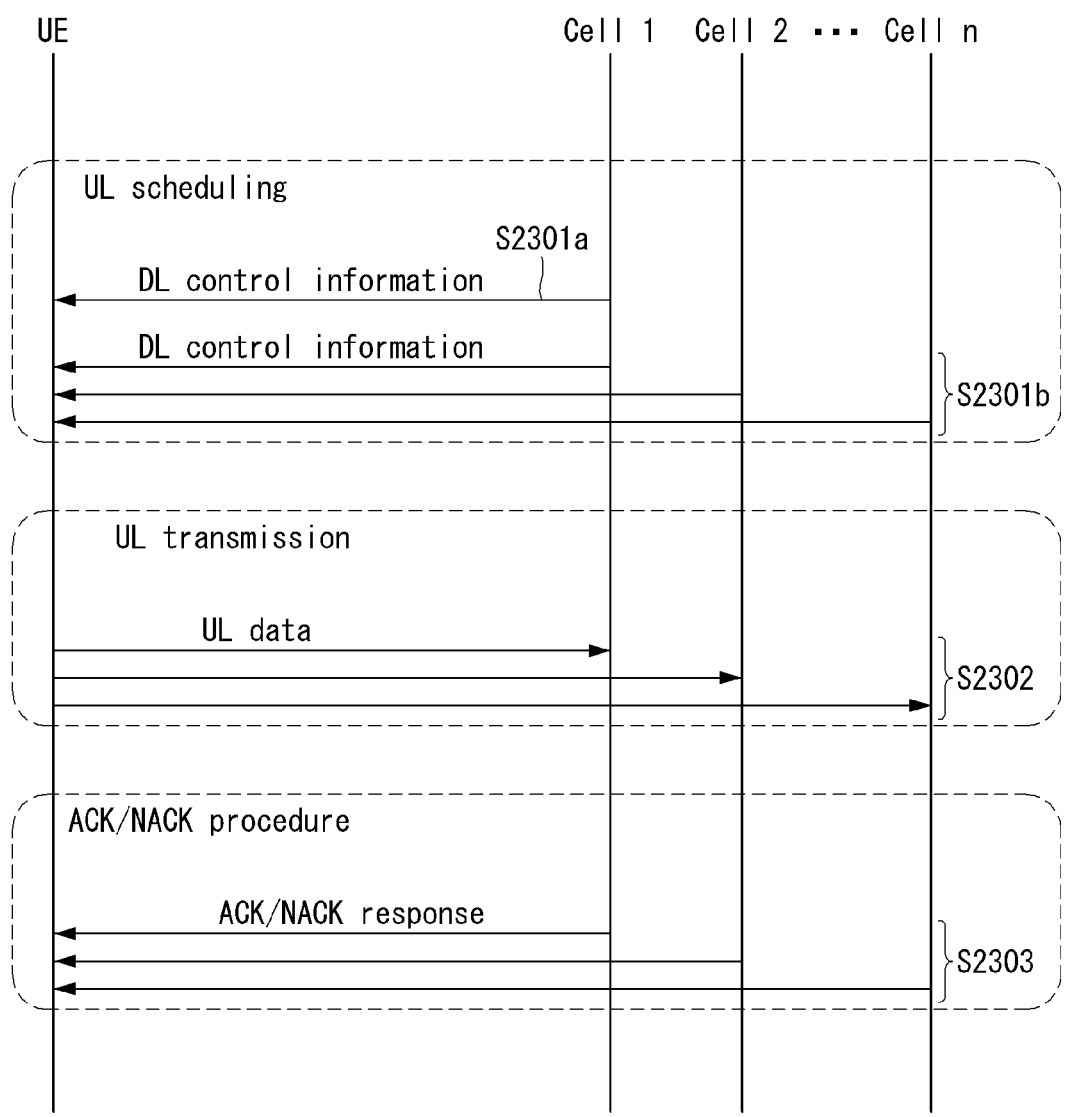
FIG. 23 is a diagram illustrating an uplink data transmission method according to an embodiment of the present invention.

FIG. 23 is a diagram illustrating an uplink data transmission method according to an embodiment of the present invention.

FIG. 23 illustrates uplink transmission using a multi-cell, but the present invention is not limited thereto. For example, if a different cell is used in each reception point (RP), in FIG. 23, each 'cell may correspond to the 'RP of a corresponding cell'. In this case, RPs may be connected through ideal backhaul in a specific level or less or may be connected through non-ideal backhaul. Furthermore, in FIG. 23, each 'cell' may correspond to a 'component carrier (CC)'. In this case, each CC (or some CCs) may belong to a different carrier or belong to the same carrier.

A UE receives downlink (DL) control information through one or more of cells (cell 1, cell 2, . . . , cell n) configured in a UE (connection with the UE established) (S2301) (e.g., downlink (DL) control information reception from one or more of a first RP and a second RP).

In this case, the UE may receive the downlink (DL) control information from any one of the cells (cell 1, cell 2, . . . , cell n) (S2301a) (e.g., the downlink (DL) control information reception from one of the first RP and the second RP).

Alternatively, the UE may (individually) receive the downlink (DL) control information from the respective cells (cell 1, cell 2, . . . , cell n) (S2301b) (e.g., first downlink (DL) control information from the first RP and second downlink (DL) control information reception from the second RP).

The method described in '1.2 UL scheduling' may be applied to the method for the UE to receive the downlink (DL) control information, and a detailed description is omitted.

The UE transmits downlink (DL) data (or packet) to the cells (cell 1, cell 2, . . . , cell n) based on the downlink (DL) control information (S2302) (e.g., first uplink data transmission to the first RP and second downlink (DL) data transmission to the second RP).

In this case, the UE may transmit the same data (or packet or data stream) to all the cells (cell 1, cell 2, . . . , cell n) and may transmit different data (or packets or data streams) to the cells (cell 1, cell 2, . . . , cell n).

The UE may receive ACK/NACK responses from the respective cells (cell 1, cell 2, . . . , cell n) (S2403) (e.g., first ACK/NACK response reception for the first uplink data from the first RP and second ACK/NACK response reception for the second uplink data from the second RP).

The method described in '1.1 ACK/NACK procedure' may be applied to the method for the UE to receive the ACK/NACK responses, and a detailed description is omitted.

2. Downlink (DL)-related Operation

Hereinafter, a DL viewpoint in which a UE receives a message (or data) is described.

In a conventional communication system, if a message (data) generated by an upper layer of a transmitter, such as an eNB, and to be transmitted is transmitted through one specific cell1, the corresponding data (or packet, for example, a PDSCH, a transport block (TB)) is not transmitted through another cell2. In this case, if a receiver does not successfully receive the corresponding data (packet), an operation of accompanying retransmission by an HARQ procedure and transmitting the corresponding data (packet) through the cell1 until the reception of the corresponding data (packet) is successfully completed by the receiver is performed.

However, in a new operation proposed in the present invention, a message (data) (e.g., TB) generated by an upper layer and to be transmitted to a receiver is not transmitted through only one specific cell, but may be transmitted through multiple specific cells. In other words, the same downlink data may be transmitted from multiple cells (or TPs) to a receiver (e.g., UE).

Furthermore, a message (data) (e.g., TB) generated by an upper layer and to be transmitted may be (duplicated) transmitted through multiple specific cells from an initial transmission step.

Accordingly, there is an advantage in that reliable communication can be performed because a UE establishes multiple connectivity with multiple cells in order to receive the same type of a specific service (e.g., V2X) and the same data (or the data of the same object) and receives the same data (or the data of the same object) (or selectively receive from among multiple cells) with respect to two or more cells. That is, an operation proposed in the present invention may be applied to only a limited condition, such as a specific service (e.g., V2X). In other cases, a different operation may be selectively applied for each service so that a transmission/reception operation based on a conventional configuration is performed.

More characteristically, identity, such as a separate "packet identifier (packet ID)", may be additionally assigned for each data (packet) for such an operation. In this case, the "packet ID" may be separated and configured or indicated as use for UL and DL.

In this case, packet IDs that may be interpreted based on a first layer (L, a physical layer), a second layer (L2, data link layer) and/or a third layer (L3, a network layer), respectively, with respect to corresponding data (packet) transmitted in two or more cells are configured/may be indicated.

2.1. ACK/NACK Procedure

An eNB may confirm the completion of the successful transmission of corresponding data (packet) based on a method for a UE to successfully receive data (packet) and transmit ACK with respect to at least one cell and for the eNB to successfully receive the ACK or other different methods. In this case, the eNB may terminate/cancel all of additional retransmission operations with respect to other cells transmitted in association with a corresponding packet ID. Furthermore, the eNB may perform an operation of initializing an (HARQ) process so that another initial transmission having a new packet ID is initialized. An operation for a UE to also initialize the corresponding process may be defined/configured.

In this case, the ACK message may operate in a form in which the UE individually performs transmission to each cell over the air. That is, to this end, a receiver (e.g., UE) that has received data (packet) from multiple cells may be defined or configured to individually transmit an ACK/NACK message on each cell over the air.

A resource in which such an ACK/NACK message is transmitted may be allocated as an integrated specific resource. In this case, a corresponding UE may generate an individual ACK/NACK message for each cell, may map the ACK/NACK messages to corresponding assigned integrated resources (i.e., by aggregating and/or joint-encoding the individual ACK/NACK messages for the respective cells), and may transmit them. There is an advantage in that the transmission latency of a corresponding ACK/NACK message can be minimized through such a process. In particular, transmission latency can be minimized compared to a method for a UE to transmit an ACK/NACK message to a specific cell (e.g., a serving cell or specific designated cell of the corresponding UE) for each cell and for a corresponding reception cell to forward the ACK/NACK message to other cells.

Alternatively, a separate/independent specific uplink resource (e.g., PUCCH or PUSCH) for each cell may be previously configured/allocated to the individual ACK/NACK message. In this case, a UE may individually transmit an ACK/NACK message on a corresponding resource for each cell. Such an individual uplink resource may correspond to a separate/independent resource in the time/frequency/code domain.

If a UE receives ACK/NACK/discontinuous transmission (DTX) for each cell:

When at least one cell receives ACK, the retransmission of corresponding data (packet) to all of cells may be terminated/cancelled as described above. Furthermore, an operation of initializing an (HARQ) process may be defined or configured so that the initial transmission of another data (packet) having a new packet ID is initialized.

Alternatively, for higher reliability communication, retransmission regarding data (packet) may be fully terminated/cancelled as described above only when all of corresponding cells (that first transmitted the corresponding data (packet)) successfully ACK. Furthermore, an operation of initializing an (HARQ) process may be defined or configured so that the initial transmission of data (packet) having a new packet ID is initialized.

Alternatively, for higher reliability communication, retransmission regarding corresponding data (packet) may not be terminated/cancelled when at least one cell of corresponding cells (that first transmitted data (packet)) receives NACK (although other cells have received ACK). Furthermore, (if retransmission is required) corresponding target cells may (continuously) perform retransmission.

In this case, when the at least one cell receives the NACK, all of the corresponding cells (that first transmitted data (packet)) may (continuously) may perform retransmission.

Alternatively, when the at least one cell receives the NACK, only cells that have received the corresponding NACK may (continuously) perform retransmission.

Hereinafter, a method of generating an ACK/NACK/DTX message is described. The method of generating an ACK/NACK/DTX message may be applied along with the aforementioned process of transmitting ACK/NACK/DTX or may be independently applied.

When a UE transmits an ACK/NACK/DTX message to each cell, it may transmit the ACK/NACK/DTX message itself to each cell. However, when the UE generates and transmits the corresponding ACK/NACK/DTX message, the following specific restriction may be set:

When a UE successfully receives data (packet) from at least one cell, it may transmit ACK to all of cells (that first transmitted data (packet)).

For example, although NACK (i.e., reception failure) has been generated with respect to data (packet) transmitted by a specific cell, if data (packet) transmitted by at least one cell is ACK (i.e., reception success), a UE may transmit ACK to all of cells (that first transmitted data (packet)).

Alternatively, for more reliable communication, when data (packet) is successfully received from at least N (e.g., N>1) cells, a UE may transmit ACK to all of cells (that first transmitted data (packet)).

For example, although NACK (i.e., reception failure) has been generated with respect to data (packet) transmitted by a specific cell), if data (packet) transmitted by at least N cell is ACK (i.e., reception success), a UE may transmit ACK to all of (that first transmitted data (packet)).

Alternatively, for more reliable communication, a UE may transmit ACK to all of cells (that first transmitted data (packet)) when it successfully receives data (packet) from all of the cells that first transmitted the data (packet)).

2.2. DL Scheduling

In an upper layer viewpoint, in a conventional technology, the transmission of downlink data was initiated as data scheduling is performed on a specific cell in a specific data packet unit (e.g., a transport block (TB) generated by an upper layer. In contrast, in the present invention, a one-to-many packet path may be formed so that data scheduling is performed on a specific data packet unit (e.g., TB) generated from an upper layer through multiple cells (TPs).

For example, the same TB may be forwarded from an upper layer to a lower layer (i.e., a physical layer) so that a specific data packet is subjected to full transmission (or the first transmission) from a cell1, cell2 and cell3, and all of TBs received in the cell1, cell2, and cell3 may be transmitted.

The following method may be applied as a method of scheduling this:

1) Method According to Dynamic (i.e., L1) Scheduling Grant

Method 1) Self-Scheduling for Each Cell

In accordance with this method, scheduling grants may be individually transmitted to the cell1, cell2 and cell3, respectively, through a specific control channel (e.g., PDCCH or EPDCCH). A receiver (i.e., UE) may detect the grants and receive downlink data in a resource indicated in a scheduling grant whose detection is successful.

Such a control channel may be a control channel in which a cross-carrier scheduling grant is transmitted by a carrier indicator field (CIF) if a carrier aggregation (CA) has been configured in a corresponding UE.

For example, a case where a receiver has successfully received scheduling grants because reception quality of a control channel associated with a cell1 and a control channel associated with a cell3, but the UE has not received a scheduling grant because reception quality from a control channel associated with a cell2 is low may occur. In this case, the receiver may receive corresponding downlink data transmitted through the cell1 and cell3.

In this case, the receiver may be aware that the downlink data transmitted through the cell1 and cell3 is practically the same data packet (or this may be configured/indicated in the receiver).

In this case, the same data packet may be fully the same data packet or may be a data packet in which different redundancy versions (RVs) are divided and transmitted after channel coding is applied on the same information message.

Such a transmission type may be previously configured in the receiver regardless of the same data packet of any form. Reception quality of the same data can be increased through selective reception or combining in the former case and can be improved through combining after a different RV is received in the latter case.

As a result, in an V2X communication environment in which the mobility of a receiver is great and latency and reliability are absolutely important, for example, the receiver may have set up multiple connectivity with multiple cells. Accordingly, although data reception from some cells is impossible, data reception has only to be successful with respect to at least one cell. Accordingly, there is an advantage in that communication link reliability can be improved without time-domain latency according to a conventional HARQ procedure.

For the above operation, specific implicit or explicit indication capable of identifying that the same data is simultaneously scheduled from multiple cells for such an object may be included in an individual scheduling grant.

In other words, if such implicit or explicit indication is not included in the individual scheduling grant, the same data is not transmitted by multiple cells and different data may be transmitted from the multiple cells (i.e., a UE may recognize that different data is transmitted).

For example, scheduling grants transmitted by multiple cells, respectively, are masked with a specific separate RNTI and transmitted. Accordingly, a UE may recognize that the same data packet has been scheduled with respect to a scheduling grant(s) for different cells detected in the same timing/subframe (or within a specific time interval).

And/or a separate identifier (ID) (e.g., it may correspond to the aforementioned specific "packet ID") having a property similar to that of a conventional HARQ process identifier (ID) is included in a specific field within a corresponding scheduling grant and transmitted. Accordingly, when a scheduling grant including the same packet ID is detected in a different cell, a UE may recognize that the same data is transmitted.

Alternatively, a UE may recognize whether the same data packet is scheduled by a scheduling grant in a different cell while operating in conjunction with (together with) the existing HARQ process ID. In this case, such a operation may be applied to only a scheduling grant masked with a specific separate RNTI.

Method 2) a Scheduling Grant Using One Cell in Order to Schedule Data Reception Through a Multi-Cell What a scheduling grant to schedule data transmission through a multi-cell is transmitted from a specific one pre-defined (or pre-indicated) cell may be previously defined or configured. For example, this may be defined as a primary cell (PCell) (or pre-defined/configured cell) in a CA system or may be defined/configured as a serving cell in a CoMP viewpoint.

In this case, the detailed operation proposed in the aforementioned method1) may be partially applied. For example, a scheduling grant to schedule data transmission through a multi-cell may be masked with a specific separately-defined RNTI.

When such a scheduling grant is detected from a corresponding cell, information about a set of cell(s) in which the same data is together transmitted through a specific field within the scheduling grant may be indicated.

That is, assuming that 4 cells of a cell1, cell2, and cell3, cell4 have been configured in a corresponding receiver (i.e., connection established), if a field is 2 bits, for example, the following four types of different cell(s) sets may be indicated by bits values. In this case, information about the cell(s) set may be configured in advance (e.g., through RRC signaling):

'00': {cell1}
'01': {cell1, cell2}
'10': {cell2, cell3, cell4}
'11': {cell1, cell2, and cell3, cell4}

That is, for example, when a receiver receives a scheduling grant in which '01' is indicated, the receiver may receive the same data in the cell1 and cell2.

In this case, this operation corresponds to scheduling for multiple cells based on a single scheduling grant. Which resource is used for downlink data transmission for each cell may be individually configured or reserved in advance or resource allocation information indicated in the scheduling grant may be applied in common. Furthermore, even in other pieces of information within the corresponding scheduling grant, such as other MCS, some of the pieces of information may be individually configured in advance for each cell or information indicated in the scheduling grant may be applied in common.

Method 3) a Scheduling Grant Using a Multi-Cell in Order to Schedule Data Reception Through a Multi-Cell This is the same as the aforementioned method 2). In this case, a cell that transmits a corresponding scheduling grant is not one cell that is predetermined, but is a multi-cell. A scheduling grant of the same contents may be (i.e., duplicated) and may be transmitted through the multi-cell.

Accordingly, there is an advantage in that an operation for a receiver to receive the same data through multiple cells when it successfully receives a corresponding scheduling grant from at least one of control channels associated with respective cells because channel quality of control channels are different is successfully applied.

2) Method According to Semi-Persistent Scheduling (SPS)

With respect to at least one of the above-proposed method1) to method3), a receiver may periodically receive a corresponding data packet from a multi-cell based on an SPS configuration resource previously configured by high layer signaling (e.g., RRC signaling) without following a dynamic (i.e., L1) scheduling grant.

That is, the receiver may be configured to always attempt to receive the same data packet through a specific resource region in a corresponding predetermined cycle within the cell1, cell2, and cell3 based on an SPS configuration as in the example. In this case, the receiver attempts to receive the corresponding transmission data packets of the cell1, cell2, and cell3 in the corresponding cycle and may selectively receive a data packet(s) whose detection is successful or may receive the data packet(s) through specific combining.

3) Additionally Proposed Method

In the above-proposed methods, in the case of an environment in which timing (e.g., time synchronization) between multiple cells is synchronized in a specific level or more, as in the above descriptions, the repeated transmission form (i.e., same data transmission) may be initiated from the eNB almost at the same timing from an initial transmission step.

However, the present invention is not limited to be applied to only an environment in which multiple cells have been synchronized as described above, and may be efficiently applied/utilized in an environment in which synchronization has not been performed between multiple cells in a specific level or less. For example, the environment in which synchronization has not been performed between multiple cells may mean an environment in which subframe/slot edge are not aligned, an environment in which a subframe/slot offset is present and/or an asynchronous network environment.

For example, the repeated transmission (i.e., same packet transmission) may be performed by a specific cell2 again in an SF #n+a before HARQ-ACK transmitted by a UE in an SF #n+k is received by an eNB in a packet transmitted by a specific cell1 in an SF #n. Furthermore, the UE may be defined or configured to receive the same packet in the SF #n and SF #n+a.

In other words, it may be construed in a form in which a transmitter does not transmit a new transport block (TB) in the SF #n+a and transmits a specific data packet (e.g., tB1) transmitted in the SF #n again.

Such an operation may be identified by the aforementioned specific "packet ID" and may also be identified by the aforementioned specific implicit indication (e.g., a scheduling grant is masked with a specific RNTI).

If such an operation occurs in the same carrier (e.g., distributed antenna system), this may be construed as being an operation of dynamically applying TTI bundling characteristically. For example, a transmitter may intentionally schedule such an operation depending on the condition of traffic different for each cell or the above operation may occur or may be applied depending on various situations, such as an asynchronous environment and/or if (individual) DL grant timing from each cell is different (for the flexible utilization of a control channel resource). In this case, a UE may be defined/configured to perform downlink data reception based on such scheduling.

In the case of an environment corresponding to TPs having different cells, such as a distributed antenna system, what the TPs are different may appear for a UE based on a different specific QCL assumption.

That is, DL data reception from a different TP may be defined or configured based on a radio channel obtained by applying a specific QCL assumption for a specific RS (e.g., a CSI-RS or CRS) transmitted by the corresponding TP. In other words, QCL may be assumed between an antenna port for downlink data transmitted by a specific first TP and an antenna port for a specific reference signal transmitted by the corresponding first TP. Likewise, QCL may be assumed between an antenna port for downlink data transmitted by another second TP and an antenna port for a specific reference signal transmitted by the corresponding second TP.

For example, if a specific UE is located somewhere the boundary of a TP1 and TP2 or a network is unaware of the best accurate TP, joint transmission between the two TP1 and TP2 may be one method. In this case, in a situation (e.g., V2X environment) in which the joint transmission is determined to be difficult, a method for the TP1 to transmit downlink data in an SF #n and for the TP2 to transmit the same downlink data in an SF #n+1 may be applied. Such twice transmissions may be scheduled by the same "packet ID" (e.g., the same HARQ process identity (ID)).

In a different viewpoint, this may be construed as being a TTI bundling form (i.e., a resource for downlink data transmission in the SF #n and a resource for downlink data transmission in the SF #n+1 are bundled). In this case, a specific TP (or corresponding specific QCL) may vary for each ITI.

In the above proposed methods, if the same data packet (e.g., the same TB) is transmitted by a multi-cell in different RVs, what the corresponding TB has been coupled to the HARQ process of which cell and/or the soft buffer of which cell may be previously defined or may be configured by high layer signaling (e.g., RRC or MAC signaling).

In other words, for example, if the method is applied in a form in which the same data packet is (repeatedly) transmitted in different RVs through a cell1 and a cell2 or configured in a UE, what the corresponding TB has been coupled to the HARQp of which (e.g., HARQ1(p=1) for the cell1 and HARQ2(p=2) for the cell2) (e.g., related to an HARQ operation including an aspect I which an ACK/NACK resource is associated) may be defined/configured. And/or what the corresponding TB has been coupled to the soft buffer of which cell may be defined/configured.

As described above, a specific cell coupled to a corresponding operation is hereinafter called a "reference cell"

for convenience of description. The reference cell may be determined depending on at least one of the following options:

Option 1 (semi-static configuration): reference cell information may be configured in a UE through a high layer signal (e.g., RRC or MAC signaling).

In such a configuration, one reference cell may be configured for each UE or multiple reference cell information may be configured for each UE.

If multiple reference cell information is configured, in the state in which the multiple reference cell information has been configured, specific reference cell information may be indicated in association with a specific information/parameter (e.g., an RNTI, a DCI format, a control channel Type (e.g., PDCCH or enhanced PDCCH), a search space and/or a subframe Type (e.g., a common subframe, MBSFN subframe)/index) related to a (DL) scheduling grant according to DCI.

Option 2 (dynamic configuration): when (DL) DCI is transmitted, reference cell information may be dynamically indicated by adding a new specific DCI field (explicit indication) or interpreting the existing field again (implicit indication).

For example, the reference cell information may be implicitly indicated as (possibly) the lowest (or highest)-index cell (i.e., from among configured cells).

Alternatively, if a specific RVx (e.g., RV0 (when x=0)) is indicated by scheduling information from a (DL) DCI, it may be implicitly indicated that a cell in which the corresponding DCI has been transmitted is a reference cell.

This is further generalized. In general, a pattern in which RVx is transmitted upon retransmission in order of an RV0, RV2, RV3 and RV1 may be taken into consideration. It may be assumed that priority is assigned in this order (i.e., in order of x=0, 2, 3 or 1). In this case, an operation of implicitly indicating that a cell in which DCI indicative of the highest priority value for (possible) x is transmitted is a reference cell may be defined or may be configured in a UE.

For example, if an RV0, RV2 and RV3 are indicated in DCI within respective cell1, cell2, and cell3, when a UE fails in the reception of DCI to schedule the RV0, the cell2 in which the RV2 has been transmitted from among the RV2 and the RV3 may be determined to correspond to a reference cell based on the specific priority order.

Alternatively, it may be implicitly indicated that the corresponding reference cell is determined to be a "cell having minimum (or a maximum of) n_SB (i.e., a soft channel bit, refer to Equation 6)." To this end, a UE may calculate n_SB for each cell, may compare them, and may determine/apply the reference cell. In this case, if cells having the same calculated n_SB is two or more, the different reference cell determination condition (e.g., a condition for determining a cell in which DCI indicative of the lowest (highest) index cell or the highest priority value x is transmitted to be a reference cell) may be applied between corresponding cells.

The aforementioned soft buffer-related operation is described more specifically.

It is assumed that the repeated-transmitted TB has been coupled to the soft buffer (i.e., HARQ1) of the cell1. In this case, if downlink data is transmitted within the cell1 and cell2 and retransmission is performed on downlink data within the cell1 and cell2 due to the NACK of a UE, this may be interpreted that retransmission for the cell1 (in a DL scheduling situation) is performed through the cell2. In this case, this may be different from conventional retransmission timing, such as that the cell1 and cell2 transmit corresponding downlink data upon the first transmission depending on the method proposed in the present invention.

In this case, an n_SB value set in a pre-defined/configured specific reference cell (e.g., cell1) not the cell2 may be defined to be applied to a (minimum) soft channel bit number n_SB that needs to be stored by a UE with respect to downlink data received through the cell2 or the (minimum) soft channel bit number n_SB may be configured in the UE. For example, a case where the state in which data corresponding to (a maximum of) HARQ processes of all of cells including the cell1 and cell2 has been filled in a reception buffer is taken into consideration may be applied.

More characteristically, only Option 1 (semi-static) may be limited to be applied to a form in which an HARQ for the broadcast transmission is performed in unicast. Alternatively, Option 2 (dynamic) may be applied. In this case, only the method2 and/or method3 may be limited to be applied. That is, in the case of at least method1), the DCI is individually transmitted within each cell. If a UE receives a reception failure for DCI, a problem may occur in correctly confirming reference cell information. The reason for this is that if mis-understanding with an eNB occurs with respect to this problem, severe deterioration may occur in retransmission quality.

Furthermore, with respect to a form in which an HARQ for the broadcast transmission is performed in broadcast, retransmission may always be performed in broadcast. Accordingly, regarding an n_SB value to be assumed by a UE, a specific UE-common value n_SB' and a UE-common parameter(s) for generating n_SB' may be fixedly defined in advance or an eNB may configure a common value/parameter in a corresponding UE(s) through high layer signaling (e.g., RRC or MAC signaling).

This means that a UE does not assume n_SB for a corresponding reference cell by checking a reference cell as described above and should assume a UE-common n_SB' value.

For example, an eNB may notify a UE(s) of such a UE-common n_SB' value itself.

Alternatively, an eNB may notify a UE(s) of one or more of constituent factors (N_cb, N'_soft, N^DL_cells, M_DL_HARQ, w_k, C, N_cb, K_MIMO and M_limit) that generate n_SB' as in Equation 7 in a UE-common manner. Accordingly, a definition or configuration may be performed so that the UE(s) generates the n_SB' according to Equation 7 and apply it to a soft buffer and HARQ-related operation.

$$n'_{SB} = \min\left(N_{cb}, \left\lfloor \frac{N'_{soft}}{C \cdot N^{DL}_{cells} \cdot K_{MIMO} \cdot \min(M_{DL\_HARQ}, M_{limit})} \right\rfloor\right)$$ [Equation 7]

A description of the factors used in Equation 7 is the same as that of Equation 6 and is thus omitted.

That is, such a new n_SB' parameter may be limited to be applied upon downlink data reception for broadcast or regarding a specific service (e.g., V2X). In this case, this is used independently/selectively from the n_SB value applied when a common unicast packet is received.

Figure 24:
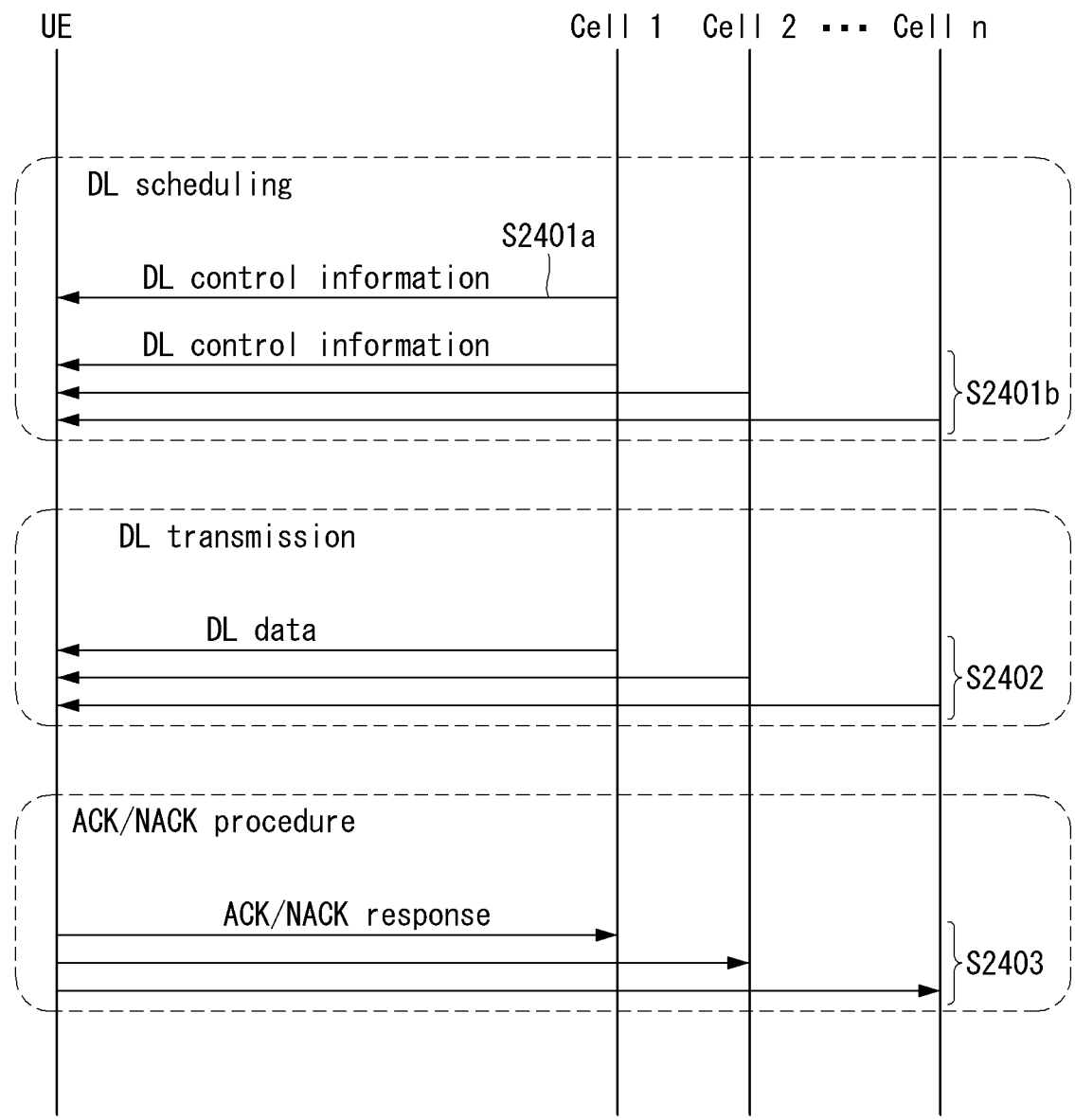
FIG. 24 is a diagram illustrating a downlink data transmission method according to an embodiment of the present invention.

FIG. 24 is a diagram illustrating a downlink data transmission method according to an embodiment of the present invention.

FIG. 24 illustrates downlink transmission using a multi-cell, but the present invention is not limited thereto. For example, if a different cell is used in each transmission point (TP), in FIG. 24, each 'cell' may correspond to the 'TP of a corresponding cell'. In this case, TPs may be connected through ideal backhaul or non-ideal backhaul in a specific level or less. Furthermore, in FIG. 24, each 'cell' may correspond to a 'component carrier (CC)'. In this case, each CC (or some CCs) may belong to a different carrier or may belong to the same carrier.

A UE receives downlink control information from one or more of cells (cell 1, cell 2, . . . , cell n) configured in the UE (or connection with the UE established) (S2401) (e.g., downlink control information reception from one or more of a first TP and a second TP).

In this case, the UE may receive the downlink control information from any one of the cells (cell 1, cell 2, . . . , cell n) (S2401a) (e.g., downlink control information reception from one of the first TP and the second TP).

Alternatively, the UE may receive the downlink control information from the respective cells (cell 1, cell 2, . . . , cell n) independently (individually) (S2401b) (e.g., first downlink control information from the first TP and second downlink control information reception from the second TP).

The method described in '2.2 DL scheduling' may be applied to a method for the UE to receive the downlink control information, and a detailed description thereof is omitted.

The UE receives downlink data (or packet) from the respective cells (cell 1, cell 2, . . . , cell n) based on the downlink control information (S2402) (e.g., first downlink data reception from the first TP and second downlink data reception from the second TP).

In this case, the UE may receive all the same data (or packets or data streams) from the cells (cell 1, cell 2, . . . , cell n) or may receive different data (or packets or data streams) from the respective cells (cell 1, cell 2, . . . , cell n).

The UE may transmit an ACK/NACK responses to the respective cells (cell 1, cell 2, . . . , cell n) (S2403) (e.g., first ACK/NACK response transmission for first downlink data to the first TP and second ACK/NACK response transmission for second downlink data to the second TP).

The method described in '2.1 ACK/NACK procedure' may be applied to a method for the UE to transmit the ACK/NACK responses, and thus a detailed description is omitted.

General Apparatus to which the Present Invention May be Applied

Figure 25:
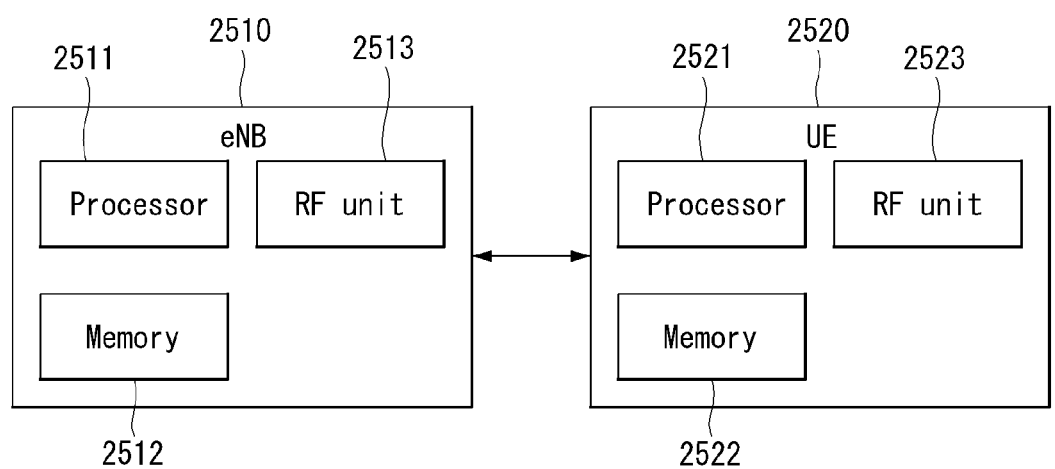
FIG. 25 illustrates a block diagram of a wireless communication apparatus according to an embodiment of the present invention.

FIG. 25 illustrates a block diagram of a wireless communication apparatus according to an embodiment of the present invention.

Referring to FIG. 25, the wireless communication system includes an eNB 2510 and multiple UEs 2520 located the eNB 2510 area.

The eNB 2510 includes a processor 2511, memory 2512 and a radio frequency (RF) unit (2513). The processor 2511 implements the functions, processes and/or methods proposed in FIGS. 1 to 24. The layers of a radio interface protocol may be implemented by the processor 2511. The memory 2512 is connected to the processor 2511 and stores a variety of types of information for driving the processor 2511. The RF unit 2513 is connected to the processor 2511 and transmits and/or receives radio signals.

The UE 2520 includes a processor 2521, memory 2522 and an RF unit 2523. The processor 2521 implements the functions, processes and/or methods proposed in FIGS. 1 to 24. The layers of a radio interface protocol may be implemented by the processor 2521. The memory 2522 is connected to the processor 2521 and stores a variety of types of information for driving the processor 2521. The RF unit 2523 is connected to the processor 2521 and transmits and/or receives radio signals.

The memory 2512, 2522 may be present inside or outside the processor 2511, 2521 and connected to the processor 2511, 2521 by various well-known means. Furthermore, the eNB 2510 and/or the UE 2520 may have a single antenna or multiple antennas.

In the aforementioned embodiments, the elements and characteristics of the present invention have been combined in specific forms. Each of the elements or characteristics may be considered to be optional unless otherwise described explicitly. Each of the elements or characteristics may be implemented in a form to be not combined with other elements or characteristics. Furthermore, some of the elements and/or the characteristics may be combined to form an embodiment of the present invention. Order of the operations described in the embodiments of the present invention may be changed. Some of the elements or characteristics of an embodiment may be included in another embodiment or may be replaced with corresponding elements or characteristics of another embodiment. It is evident that an embodiment may be constructed by combining claims not having an explicit citation relation in the claims or may be included as a new claim by amendments after filing an application.

The embodiment according to the present invention may be implemented by various means, for example, hardware, firmware, software or a combination of them. In the case of an implementation by hardware, the embodiment of the present invention may be implemented using one or more application-specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In the case of an implementation by firmware or software, the embodiment of the present invention may be implemented in the form of a module, procedure or function for performing the aforementioned functions or operations. Software code may be stored in the memory and driven by the processor. The memory may be located inside or outside the processor and may exchange data with the processor through a variety of known means.

It is evident to those skilled in the art that the present invention may be materialized in other specific forms without departing from the essential characteristics of the present invention. Accordingly, the detailed description should not be construed as being limitative, but should be construed as being illustrative from all aspects. The scope of the present invention should be determined by reasonable analysis of the attached claims, and all changes within the equivalent range of the present invention are included in the scope of the present invention.

INDUSTRIAL APPLICABILITY

The present invention has been described based on an example in which it is applied to the 3GPP LTE/LTE-A systems, but may be applied to various wireless communication systems in addition to the 3GPP LTE/LTE-A systems.

What is claimed is:

1. A method for a user equipment to receive downlink data from a multi-transmission point (TP) in a wireless communication system, the method comprising:
receiving first downlink scheduling information related with a first downlink data from a first TP;
receiving second downlink scheduling information related with a second downlink data from a second TP;
receiving the first downlink data from the first TP based on the first downlink scheduling information;
receiving the second downlink data from the second TP based on the second downlink scheduling information;
determining the first downlink data and the second downlink data are the identical, based on a first radio network temporary identifier (RNTI) masking the first downlink scheduling information and a second RNTI masking the second downlink scheduling information being identical; and
transmitting a first acknowledgment/non-acknowledgement (ACK/NACK) response for the first downlink data to the first TP and a second ACK/NACK response for the second downlink data to the second TP, respectively, based on determination of whether the first downlink data and the second downlink data are identical.

2. The method of claim 1, wherein based on any one of the first downlink data and the second downlink data being successfully received, both the first ACK/NACK response and the second ACK/NACK response correspond to ACK.

3. The method of claim 1, wherein based on both the first downlink data and the second downlink data being successfully received, both the first ACK/NACK response and the second ACK/NACK response correspond to ACK.

4. The method of claim 1, wherein the first ACK/NACK and the second ACK/NACK are subjected to joint encoding and transmitted on an identical resource.

5. The method of claim 1, wherein the first ACK/NACK and the second ACK/NACK are individually transmitted on independent resources.

6. The method of claim 1, wherein:
quasi co-located (QCL) is assumed between an antenna port in which the first downlink data is transmitted and an antenna port of a reference signal transmitted from the first TP, and
quasi co-located (QCL) is assumed between an antenna port in which the second downlink data is transmitted and an antenna port of a reference signal transmitted from the second TP.

7. The method of claim 1, wherein if the first downlink data is transmitted within a first cell, the second downlink data is transmitted within a second cell, and different redundancy versions (RVs) are applied to the first downlink data and the second downlink data, retransmission of the first downlink data and the second downlink data is associated with a hybrid automatic repeat request (HARQ) process of a reference cell of any one of the first cell and the second cell.

8. The method of claim 7, wherein the reference cell is indicated by high layer signaling.

9. The method of claim 7, wherein a cell in which downlink data to which an RV having a highest priority is applied based on priority previously assigned to an RV is transmitted is determined as the reference cell.

10. The method of claim 7, wherein a value set in the reference cell is applied to a soft channel bit stored in the user equipment regardless of a cell on which the retransmission of the first downlink data or the second downlink data is performed.

11. A user equipment receiving downlink data from a multi-transmission point (TP) in a wireless communication system, the user equipment comprising:
a transceiver for transmitting and receiving radio signals; and
a processor controlling the transceiver,
wherein the processor is configured to:
receive first downlink scheduling information related with a first downlink data from a first TP, receive second downlink scheduling information related with a second downlink data from a second TP, receive the first downlink data from the first TP based on the first downlink scheduling information, receive the second downlink data from the second TP based on the second downlink scheduling information, determine the first downlink data and the second downlink data are the identical, based on a first radio network temporary identifier (RNTI) masking the first downlink scheduling information and a second RNTI masking the second downlink scheduling information being identical; and transmit a first acknowledgment/non-acknowledgement (ACK/NACK) response for the first downlink data to the first TP, and a second ACK/NACK response for the second downlink data to the second TP, respectively, based on determination of whether the first downlink data and the second downlink data are identical.

* * * * *